United States Patent
Baarman et al.

(10) Patent No.: US 10,530,188 B2
(45) Date of Patent: Jan. 7, 2020

(54) WIRELESS POWER CONTROL

(71) Applicant: Philips IP Ventures B.V., Eindhoven (NL)

(72) Inventors: David W. Baarman, Fennville, MI (US); Colin J. Moore, Grand Rapids, MI (US); Joshua B. Taylor, Rockford, MI (US); Matthew J. Norconk, Grand Rapids, MI (US); Thomas J. Leppien, Grand Haven, MI (US); Scott A. Mollema, Rockford, MI (US); Joshua K. Schwannecke, Grand Rapids, MI (US); Benjamin C. Moes, Wyoming, MI (US); A. Esai Umenei, Grand Rapids, MI (US); John James Lord, Springfield, IL (US); Robert D. Gruich, Copley, OH (US)

(73) Assignee: Philips IP Ventures B.V., Eindhoven (NL)

( * ) Notice: Subject to any disclaimer, the term of this patent is extended or adjusted under 35 U.S.C. 154(b) by 0 days.

(21) Appl. No.: 15/873,183

(22) Filed: Jan. 17, 2018

(65) Prior Publication Data
US 2018/0226835 A1   Aug. 9, 2018

Related U.S. Application Data

(62) Division of application No. 14/421,901, filed as application No. PCT/US2013/031137 on Mar. 14, 2013, now Pat. No. 9,912,166.
(Continued)

(51) Int. Cl.
*H01F 27/42* (2006.01)
*H02J 50/12* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01); *H02J 50/60* (2016.02); *H02J 50/80* (2016.02)

(58) Field of Classification Search
CPC .. H02J 50/12; H02J 50/80; H02J 5/005; H02J 17/00
See application file for complete search history.

(56) References Cited

U.S. PATENT DOCUMENTS

| 4,802,080 A | 1/1989 | Bossi et al. |
| 5,374,930 A | 12/1994 | Schuermann |

(Continued)

FOREIGN PATENT DOCUMENTS

| CN | 102113195 | 6/2011 |
| EP | 2 670 023 | 12/2014 |

(Continued)

OTHER PUBLICATIONS

International Search Report and Written Opinion of the International Searching Authority for International Application No. PCT/US2013/031137 dated Apr. 11, 2014.

*Primary Examiner* — Sibin Chen

(57) ABSTRACT

A remote device in accordance with the present invention includes an adaptive power receiver that receives wireless power from the wireless power supply by induction. The adaptive power receiver may be switched among two or more modes of operation, including, for example, a high-Q mode and a low-Q mode. By controlling the switching between modes, the amount of energy received by the adaptive receiver may be controlled. This control is a form of adaptive resonance control or Q control.

13 Claims, 38 Drawing Sheets

Related U.S. Application Data

(60) Provisional application No. 61/699,643, filed on Sep. 11, 2012.

(51) Int. Cl.
  *H02J 7/02* (2016.01)
  *H02J 50/60* (2016.01)
  *H02J 50/80* (2016.01)
  *H02J 5/00* (2016.01)
  *H02J 17/00* (2006.01)

(56) References Cited

U.S. PATENT DOCUMENTS

| | | |
|---|---|---|
| 5,565,846 A | 10/1996 | Geiszler et al. |
| 2004/0218406 A1 | 11/2004 | Jang et al. |
| 2006/0082324 A1 | 4/2006 | Boys et al. |
| 2009/0015075 A1 | 1/2009 | Cook et al. |
| 2009/0174263 A1 | 7/2009 | Baarman et al. |
| 2009/0257259 A1 | 10/2009 | Leibovitz |
| 2010/0244580 A1* | 9/2010 | Uchida .................. H02J 5/005 307/104 |
| 2010/0320962 A1 | 12/2010 | Sekita et al. |
| 2011/0057607 A1 | 3/2011 | Carobolante |
| 2011/0133569 A1 | 6/2011 | Cheon et al. |
| 2011/0221277 A1 | 9/2011 | Boys |
| 2011/0241436 A1 | 10/2011 | Furukawa |
| 2011/0304216 A1 | 12/2011 | Baarman |
| 2011/0316347 A1 | 12/2011 | Endo et al. |
| 2012/0038220 A1* | 2/2012 | Kim .................. H02J 7/025 307/104 |
| 2012/0262004 A1 | 10/2012 | Cook et al. |
| 2012/0280575 A1* | 11/2012 | Kim .................. H02J 17/00 307/104 |
| 2013/0043737 A1 | 2/2013 | Yeo et al. |

FOREIGN PATENT DOCUMENTS

| | | |
|---|---|---|
| JP | H08-340650 | 12/1996 |
| JP | 2000-270501 | 9/2000 |
| JP | 2010-051137 | 3/2011 |
| JP | 2012-010586 | 1/2012 |
| JP | 2012-019603 | 1/2012 |
| WO | 2012/101907 | 8/2012 |

\* cited by examiner

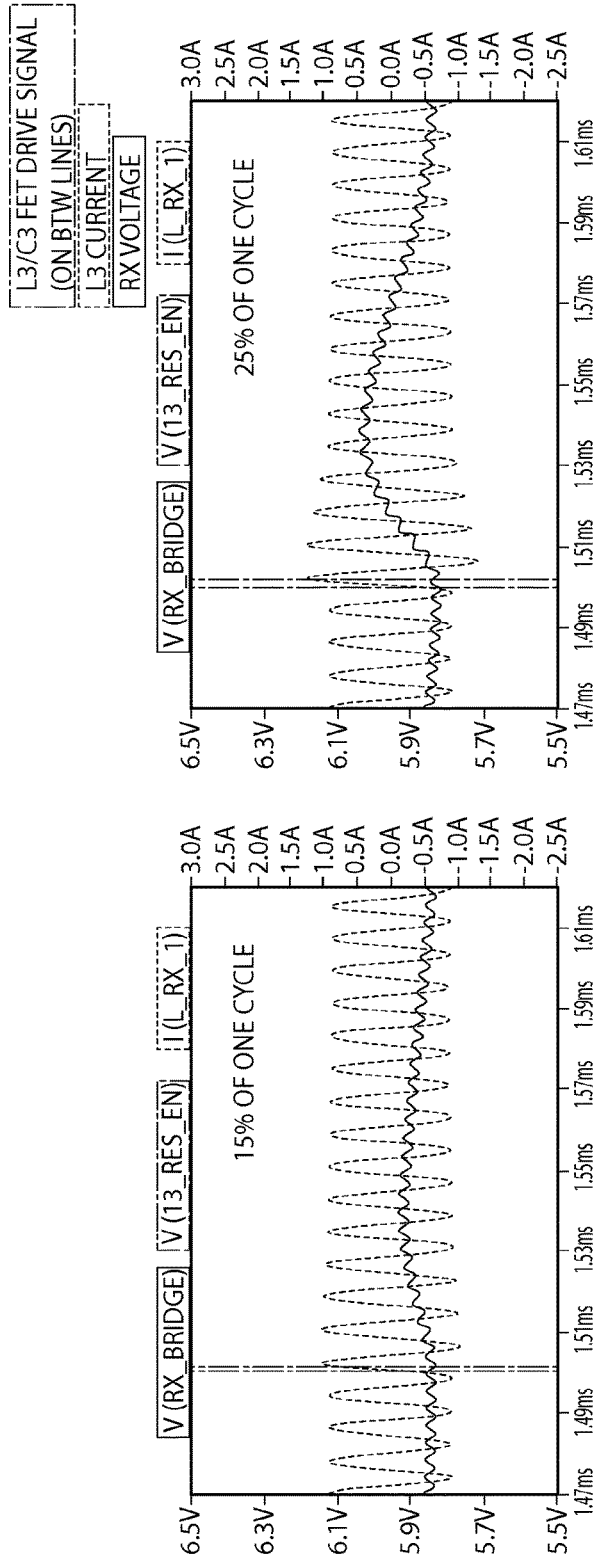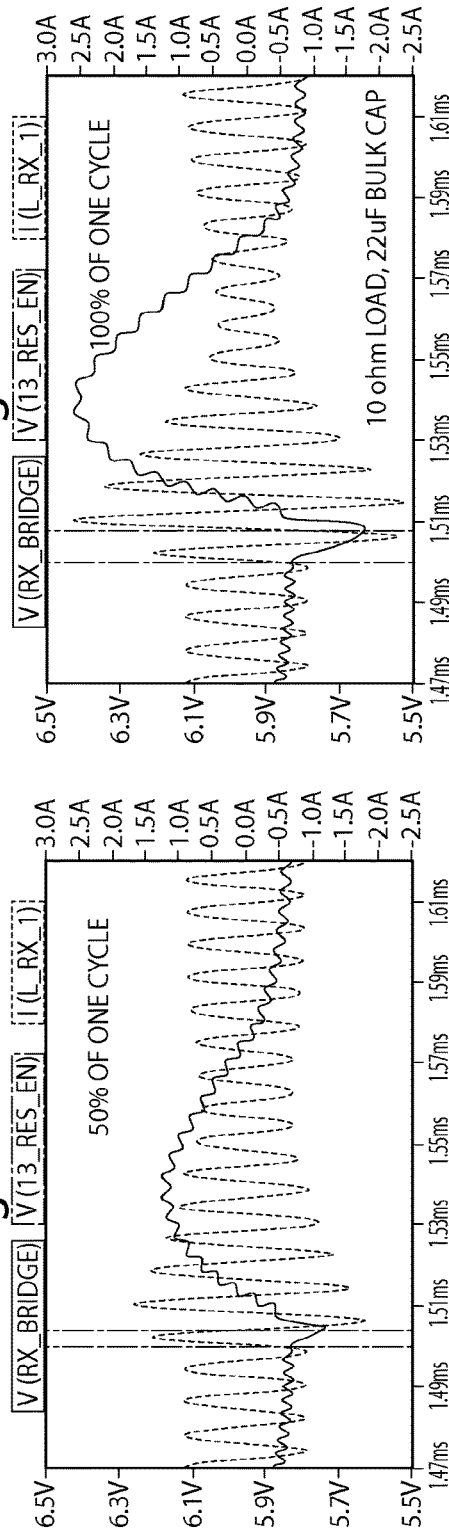
Fig. 13A Fig. 13B Fig. 13C Fig. 13D

| RESONANT DUTY CYCLE (%) | PEAK VOLTAGE (V) | MINIMUM VOLTAGE (V) | PEAK TO PEAK VOLTAGE (V) | SETTLING TIME (μS) |
|---|---|---|---|---|
| 0 | 5.86 | 5.83 | 0.03 | 0 |
| 25 | 6.11 | 5.80 | 0.31 | 200 |
| 100 | 6.45 | 5.62 | 0.83 | 220 |
| 200 | 6.73 | 5.43 | 1.29 | 300 |
| 400 | 6.52 | 5.05 | 1.47 | 400 |

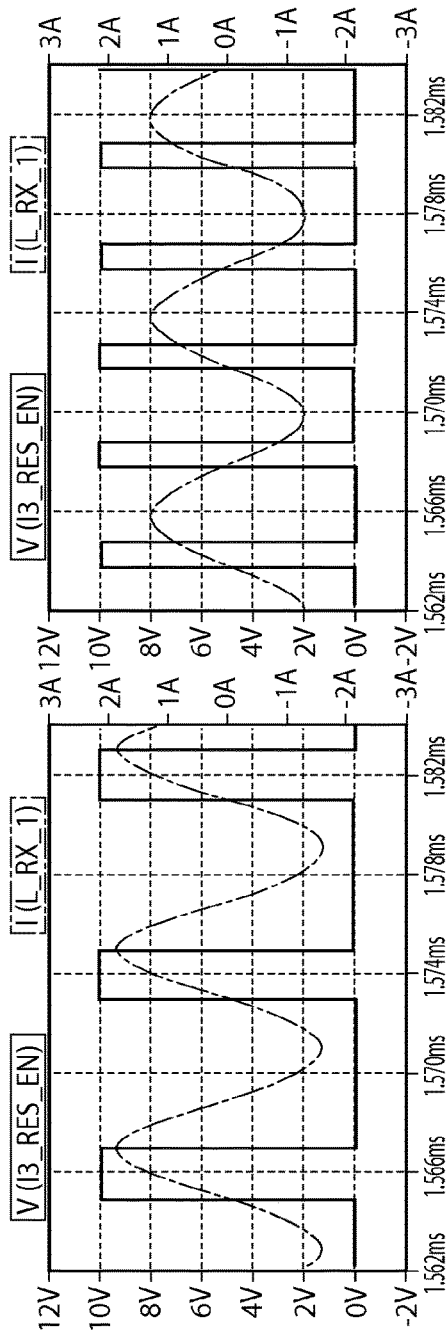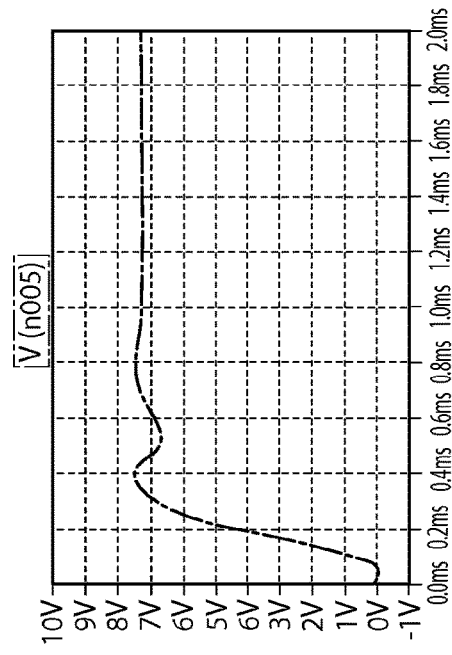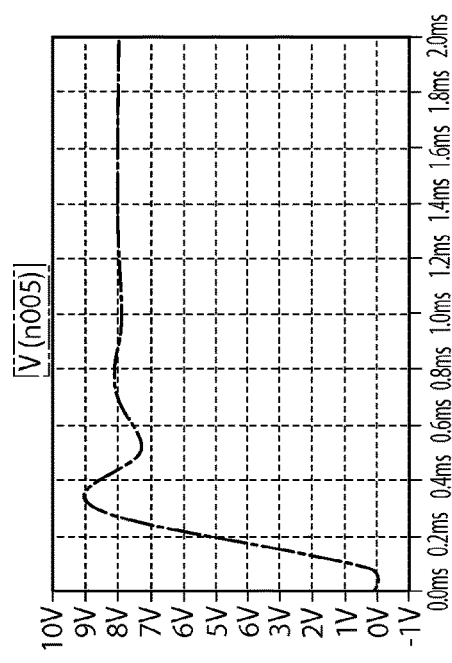
Fig. 20A
Fig. 20C
Fig. 20B
Fig. 20D

NON-ZERO-CROSS SWITCHING EVALUATION. THE GRAPHS SHOW PROGRESSIVE PHASE DELAYS IN INCREMENTS OF 500NS (PHASE DELAY OF 6.2%, 12.4%, 18.6%, 24.8%, RESPECTIVELY)

L3 RESONANCE ENABLE

TOP PANE: RECTIFIER DIODE CURRENT.
MIDDLE PANE: L3 CURRENT
BOTTOM PANE: RESONANT SWITCH CONTROL INCREASING IN DUTY CYCLE FROM 0 TO 60% WITH THE EXAMPLES TURNING ON AT THE SAME TIME AND TURNING OFF AT 10% INCREMENTS

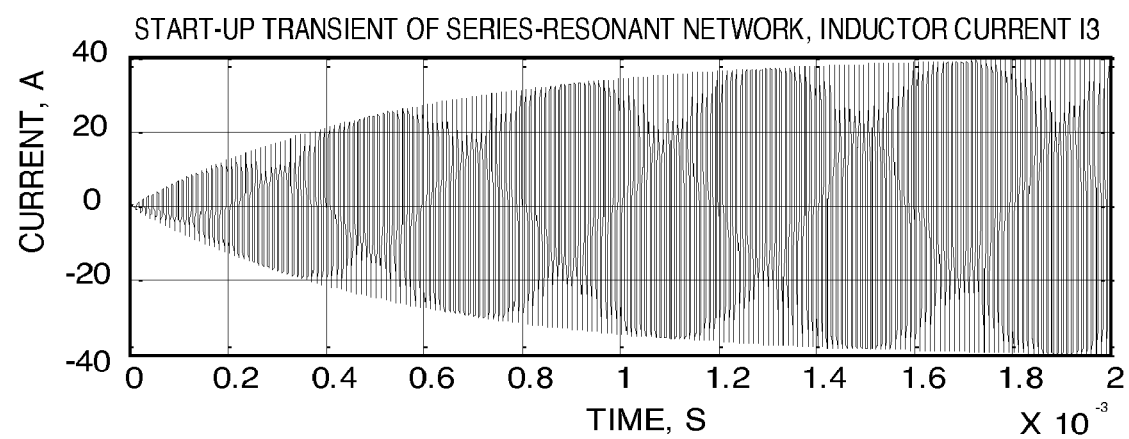
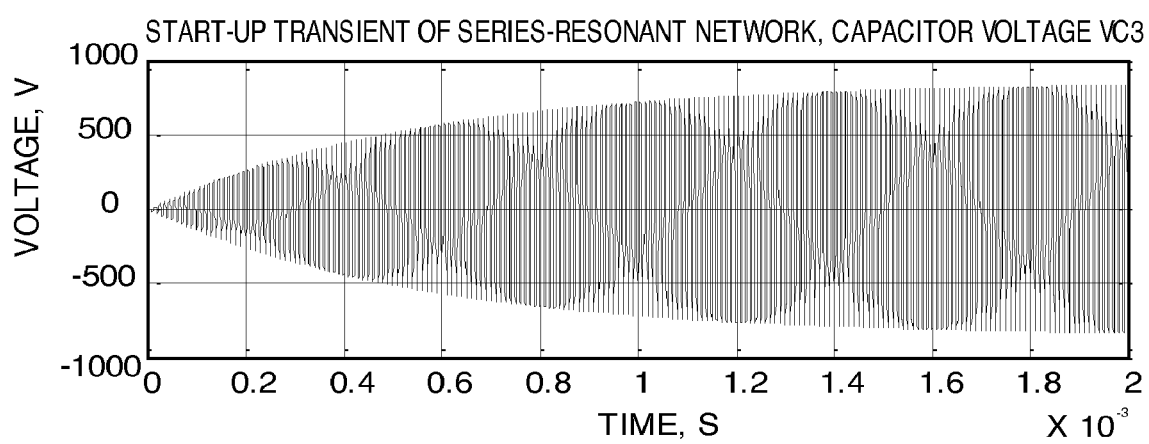
Fig. 56

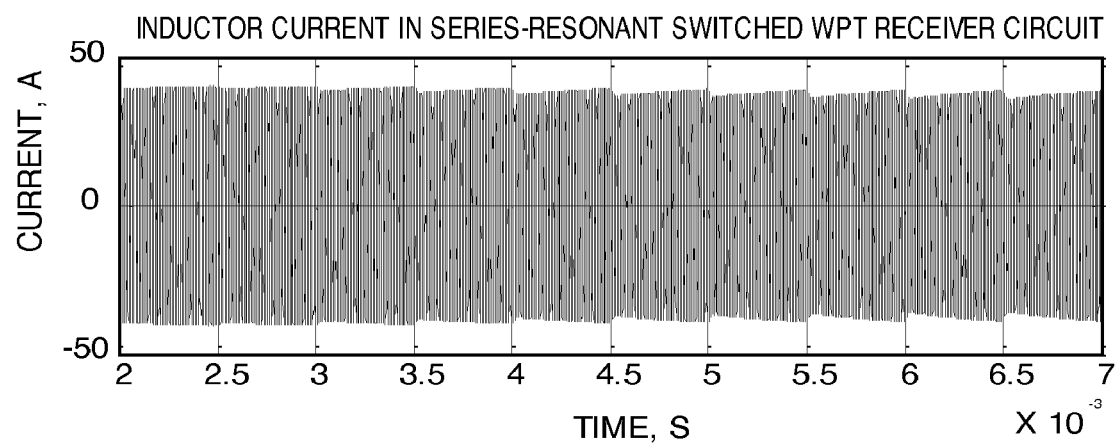
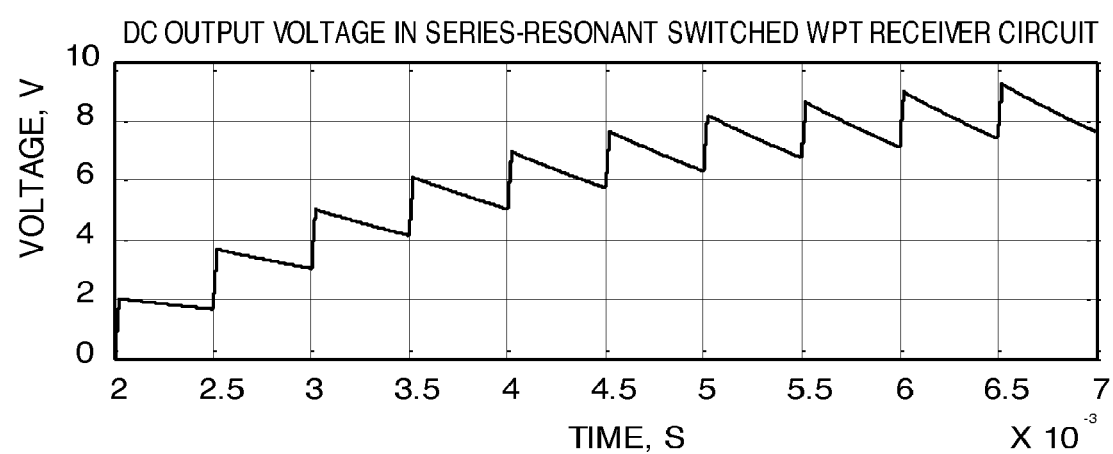
Fig. 58

WIRELESS POWER CONTROL

CROSS-REFERENCE TO RELATED APPLICATIONS

This application is a divisional of U.S. Nonprovisional application Ser. No. 14/421,901, entitled "WIRELESS POWER CONTROL", filed Feb. 16, 2015, now U.S. Pat. No. 9,912,166, which is a 371 National Stage Entry of International Application No. PCT/US2013/031137, entitled "WIRELESS POWER CONTROL", filed Mar. 14, 2013, which claims the benefit of U.S. Provisional Application No. 61/699,643, filed Sep. 11, 2012, entitled "WIRELESS POWER CONTROL", each of which is incorporated by reference in its entirety.

BACKGROUND OF THE INVENTION

The present invention relates to wireless power transfer.

Wireless power supply systems allow power to be transferred to an electronic device, such as a portable device, without the need for direct electrical connections. Wireless power transfer may be achieved using inductors, which produce magnetic fields when current flows through them. Conversely, current may be induced in an inductor when in the presence of a magnetic field, such as the magnetic field produced by another inductor. If two inductors are placed in proximity and one inductor is driven with a current, then the other inductor will produce a current even though the two inductors are not directly connected. This interrelationship between the two inductors is generally called inductive coupling, and many have used this phenomenon to transfer power without electrical connections.

In fact, many of the fundamental principles of wireless power transfer have been known for 100 years or more. Nicola Tesla, who is widely regarded as the father of wireless power transfer, is reputed to have demonstrated a system for wirelessly powering a light bulb as early as 1893. Tesla spent many years conducting research and development in the field, and amassed a significant portfolio of patents relating to wireless power transfer. As we see a resurgence of interest in wireless power, some of his early inventions are being used by those developing wireless power systems today. For example, U.S. Pat. Nos. 649,621 and 685,012 to Tesla disclose that inductive power transfer between a primary coil and a secondary coil may be improved by incorporating an additional set of intermediate coils that function as "resonating" coils to magnify the oscillations and communicate power between a primary unit and a secondary unit. More specifically, the primary unit includes a pair of coils that work together to transmit power to the secondary unit and the secondary unit includes a pair of coils that work together to receive the power. The primary unit includes a primary coil that is electrically connected to and directly receives power from the power source, as well as a resonating coil that is coupled inductively to the directly-powered coil. The resonating coil receives power inductively from the primary coil, magnifies the oscillations, and generates an electromagnetic field to communicate the power to the secondary unit. Tesla also demonstrated that capacitance used in combination with the resonating coil may produce even larger oscillations than the resonating coil by itself. The secondary unit includes another resonating coil that receives the electromagnetic field generated by the primary unit resonating coil and a secondary coil that is inductively coupled to the secondary resonating coil to directly transmit power to the secondary load. So, as can be seen, the concept of using a separate set of intermediate coils to provide an inductive coupling with improved performance has been known for over a century.

Although the basic concepts of wireless power transfer have been around for many years, there has been a relatively recent resurgence in interest in the technology, and widespread efforts are being made to implement practical and efficient wireless power transfer systems. There are a variety of factors that complicate development of efficient systems. For example, operating characteristics (i.e., conditions under which the system is operating) can have a significant impact on the quality and efficiency of the power transfer. Mutual inductance can also have an impact on the efficiency of the power transfer between the primary unit and the secondary unit. Mutual inductance depends on a number of circuit parameters, including the distance between the primary unit and the secondary unit. As the distance between the primary unit and the secondary unit is minimized, the mutual inductance increases. This inverse relationship between the distance and the mutual inductance may impose restrictions on the operating parameters of the system.

Past designs, including Tesla's four coil construction shown for example in FIG. 1, utilizing resonant coils driven by an inductive coil have been used for transferring power over larger distances. FIG. 2 is a schematic diagram incorporating the Tesla four coil construction. This type of configuration has been referred to by various names, such as highly resonant or magnetic resonance. This system may gain some efficiency due to the utilization of additional coils in order to maintain an uncoupled resonant condition that is not dampened by the load, but may lose efficiency when coupling is tightened or the coils become physically closer.

Conventional solutions have also been designed to use additional coils for inductive coupling to induce the magnetic field in either highly resonant configurations or tightly coupled configurations. But when additional coils are used in these configurations, cost may increase due to the added wire, and size may increase proportional to the added material. Efficiency may also be lower due to the added equivalent series resistance (ESR) of the additional coils.

SUMMARY OF THE INVENTION

The present invention provides a remote device having an adaptive power receiver for wirelessly receiving power that can be supplied to a load. The adaptive power receiver is energized by a wireless power supply for a portion of a power receiving cycle and discharged for a portion of the power receiving cycle. In one embodiment, the adaptive power receiver is electrically decoupled from the load during the energizing portion of the cycle to function as a high-Q resonating circuit that may be more readily energized. The adaptive power receiver may be electrically coupled to the load during the discharge portion to provide a direct electrical path for transferring electrical power from the energized adaptive power receiver to the load.

In one embodiment, the remote device includes a controller capable of varying the lengths of the energize and discharge portions of the power receiving cycle to control the amount of power supplied to the load. For example, the controller may increase the length of the energize portion and decrease the length of the discharge portion to increase power supplied to the load. The adaptive power receiver may be energized for more than one portion of the cycle and may be discharged for more than one portion of the cycle. For example, the adaptive power receiver may be energized for a portion of the positive half of the cycle and a portion of the bottom half of the cycle.

In one embodiment, the remote device may include an adaptive power receiver, a load, and a controller. The adaptive power receiver may be capable of receiving power from a wireless power supply through inductive coupling, and may be configurable to a first mode and configurable to a second mode. The load may receive electrical power generated in the adaptive power receiver such that in the first mode, the adaptive power receiver is capable of storing energy received from the wireless power supply, and such that in the second mode, the adaptive power receiver releases the stored energy to the load. The controller may be operably coupled to the adaptive power receiver, and may be capable of controlling power received from the wireless power supply by selectively configuring the adaptive power receiver between the first mode and the second mode.

In one embodiment, the first mode is a high-Q mode and the second mode is a low-Q mode, between which the controller may selectively choose. For example, the controller may control the duration at which the adaptive power receiver is in the high-Q mode in order to maintain the effective Q of the adaptive power receiver above or below a threshold, thereby improving efficiency of power transfer between the wireless power supply and the remote device.

In one embodiment, the controller selectively configures the adaptive power receiver from the first mode to the second mode at least once per wavelength of the power received in the adaptive power receiver. For example, the adaptive power receiver may be configured from the first mode to the second mode once or twice per wavelength of the power. By controlling the duty cycle of this switching between two modes, power received by the adaptive power receiver may be controlled. Specifically, increasing the duty cycle may increase a duration of time over which the adaptive power receiver is in the first mode for each wavelength, and decreasing the duty cycle may decrease the duration of time over which the adaptive power receiver is in the first mode for each wavelength. Longer durations may allow the adaptive power receiver to increase its effective Q while shorter durations may allow the effective Q to be decreased.

In one embodiment, the remote device may include a supplemental receiver capable of receiving power from the wireless power supply through inductive coupling. With the adaptive power receiver in the first mode, the adaptive power receiver may relay power to the supplemental receiver from the wireless power supply and bypass providing power directly to the load. With the adaptive power receiver in the second mode, the adaptive power receiver may provide power directly to the load, instead of or in addition to the supplemental receiver providing power to the load.

In one embodiment, the adaptive power receiver includes a single inductor capable of inductively coupling with the wireless power supply, thereby reducing and in some situations minimizing the number of components for inductively coupling with the power supply.

In one aspect, a method for controlling power received from a wireless power supply in a remote device includes receiving power in an adaptive power receiver via inductive coupling with the wireless power supply. The method may also include selectively configuring the adaptive power receiver in a first mode in which the adaptive power receiver is capable of storing energy received from the wireless power supply, and selectively configuring the adaptive power receiver in a second mode in which the adaptive power receiver releases the stored energy to a load. The first mode and the second mode may be a high-Q mode and a low-Q mode, respectively, in one embodiment.

In one embodiment, the method for controlling power also includes cycling between the first mode and the second mode at a duty cycle to control the amount of power received by the adaptive power receiver. For example, the power received from the wireless power supply may have a power wavelength, and the cycling may occur at least once per power wavelength.

In one embodiment, a remote device in accordance with the present invention includes an adaptive power receiver that receives wireless power from a wireless power supply by induction. The adaptive power receiver may be switched among two or more modes of operation, including, for example, a high-Q mode and a low-Q mode. By controlling the switching between modes, the amount of energy received by the adaptive receiver may be controlled. This control is a form of adaptive resonance control or quality factor (Q) control.

The present invention provides a simple and effective system for simplifying the construction of a remote device while providing adaptive control of power reception. For example, the remote device may control the amount of power it receives without additional circuitry.

In another aspect of the present invention, a wireless power supply is provided with an adaptive power transmitter that wirelessly transmits power to a remote device. The adaptive power transmitter may include a resonating circuit that may be switched among two or more modes of operation, including, for example, between a higher Q mode and a lower Q mode, or between two different resonant frequencies, to vary the amount of power relayed through the resonating circuit. By controlling the switching between modes, the amount of energy transmitted by the adaptive transmitter may be controlled. This control is a form of adaptive resonance control or Q control.

In one embodiment, the wireless power supply may include an adaptive power transmitter, an impedance element, and a controller. The adaptive power transmitter may be capable of transmitting power to a remote device through inductive coupling, and may be configurable to a first mode and configurable to a second mode.

The adaptive power transmitter is configurable in a first mode by switching in an impedance element into the circuit and configurable in a second mode by switching out the impedance element. The controller may be operably coupled to the adaptive power transmitter, and may be capable of controlling power transmitted to the remote by selectively configuring the adaptive power transmitter between the first mode and the second mode by selectively configuring the adaptive power transmitter from the first mode to the second mode at least once per wavelength of the power transmitted. For example, the adaptive power transmitter may be configured from the first mode to the second mode once or twice per wavelength of the current waveform. By controlling the duty cycle of this switching between two modes, power transmitted by the adaptive power transmitter may be controlled. Specifically, increasing the duty cycle may increase a duration of time over which the adaptive power transmitter is in the first mode for each wavelength, and decreasing the duty cycle may decrease the duration of time over which the adaptive power transmitter is in the first mode for each the wavelength. Longer durations may allow the adaptive power transmitter to increase its effective Q while shorter durations may allow the effective Q to be decreased. In one embodiment, the impedance element in the adaptive power transmitter is an inductive element or capacitive element, such as a supplemental inductor or supplemental capacitor separate from the primary inductor and primary capacitor. In another embodiment, the impedance element in the adaptive power transmitter is a resistive element, such as a resistor or a rectification circuit. The characteristics of the impedance element can provide different functionality for the adaptive power transmitter.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIGS. 13A-D show single power receiving cycle adaptive resonance waveforms.

FIG. 20A shows a graph of the Q-control drive signal switching once per power receiving cycle at 50% duty cycle per half cycle and the adaptive receiver current.

FIG. 20B shows the rectified DC voltage resulting from switching as shown in FIG. 20A.

FIG. 20C shows a graph of the Q-control drive signal switching twice per power receiving cycle at 25% duty cycle per half cycle and the adaptive receiver current.

FIG. 20D shows the rectified DC voltage resulting from switching as shown in FIG. 20C.

FIG. 56 shows graphs of current and voltage for start-up transients of the series-resonant network.

FIG. 58 shows graphs of inductor current and output voltage for the switched series-resonant wireless power transfer network with a switch cycle of 20 µs closed followed by 480 µs open.

DESCRIPTION OF THE CURRENT EMBODIMENTS

Figure 4:
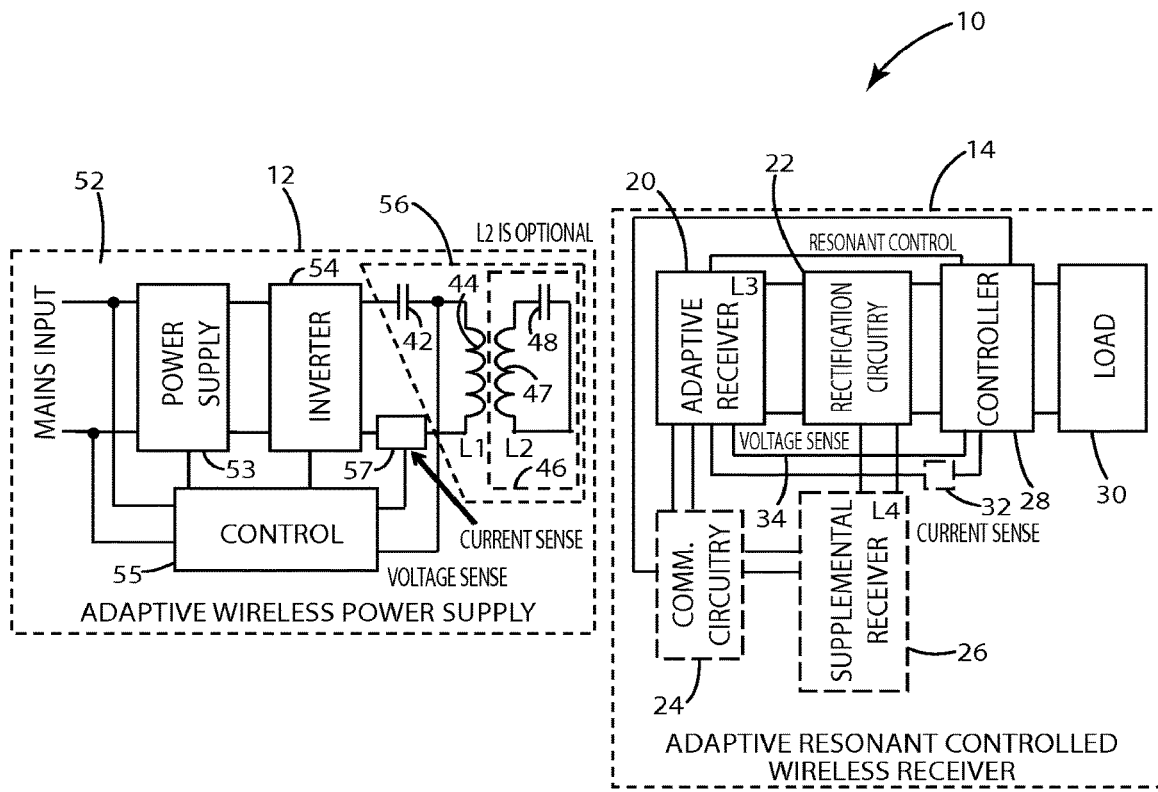
FIG. 4 shows a wireless power supply and remote device with an adaptive receiver.

A wireless power supply system in accordance with an embodiment of the present invention is shown in FIG. 4 and designated 10. A remote device in accordance with one embodiment of the present invention can enable flexible power transfer, for example to allow the remote device to control the amount of power it receives. The wireless power supply system 10 includes a remote device 14 configured to receive wireless power and a wireless power supply 12 configured to transmit power. Although described in connection with a single remote device 14, the present invention is not limited to power transfer to just one remote device 14 and is well suited for supplying power to multiple remote devices, such as by supplying power sequentially or simultaneously. One or more of the remote devices 14 in this circumstance may be conventional remote devices.

The present invention is described in connection with a wireless power supply system that implements a form of adaptive resonance control. Among other things, adaptive resonance control allows the system to adapt to a variety of potentially variable parameters, such as the power supply limitations of the wireless power supply, the number of remote devices, the power requirements of the remote devices, the presence of foreign objects (parasitic metal) and the coupling coefficients between the wireless power supply, the remote devices and/or any intermediate coils (e.g., angle, orientation and distance). For example, the wireless power supply may have the ability to control its output power by adjusting the resonant frequency of the transmitter, the rail voltage of the drive signal, the duty cycle of the drive signal, the operating frequency of the drive signal or phase of the drive signal. The wireless power supply may vary its output power to correspond with the power requirements of the remote devices or to improve the power transfer efficiency of the system. The power requirements of the remote devices may be communicated to the wireless power supply by the remote devices prior to or during operation. In addition or as an alternative, the wireless power supply may include sensors that allow it to determine operating parameters without communication from the remote devices. For example, the wireless power supply may include voltage, current and/or power sensors that allow the wireless power supply to monitor the system and adjust operating parameters. As part of the adaptive resonance control, each remote device may also be capable of controlling the amount of power drawn from the wireless power supply. For example, each remote device may include an adaptive power receiver in accordance with an embodiment of the present invention. Each remote device may control the amount of power drawn from the wireless power supply based on information communicated to that remote device by the wireless power supply and/or the other remote devices. In addition or as an alternative to communications, the remote device may include sensors that allow it to determine operating parameters. For example, the remote device may include voltage, current and/or power sensors that allow the remote device to monitor aspects of the system and adjust its power draw. When the wireless power supply is not capable of providing sufficient power for all of the remote devices, one or more of the remote devices may reduce its power draw. For example, a remote device capable of operating on less power may reduce its power draw to leave more power for other remote devices. The wireless power supply and/or the remote devices may determine how to allocate the power among the various remote devices. As a further part of the adaptive resonance control, the wireless power supply may include adaptable intermediate coils (e.g., a resonating coil in the wireless transmitter or in a field extender) that are capable of being adjusted to control the amount of power relayed through the intermediate coils.

The remote device 14 may include a generally conventional electronic device, such as a cell phone, a media player, a handheld radio, a camera, a flashlight or essentially any other portable electronic device. The remote device 14 may include an electrical energy storage device, such as a battery, capacitor or a super capacitor, or it may operate without an electrical energy storage device. The components associated with the principle operation of the remote device 14 (and not associated with wireless power transfer) are generally conventional and therefore will not be described in detail. Instead, the components associated with the principle operation of the remote device 14 are generally referred to as a principle load 30. For example, in the context of a cell phone, no effort is made to describe the electronic components associated with the cell phone itself, such as a battery or a display.

Figure 6:
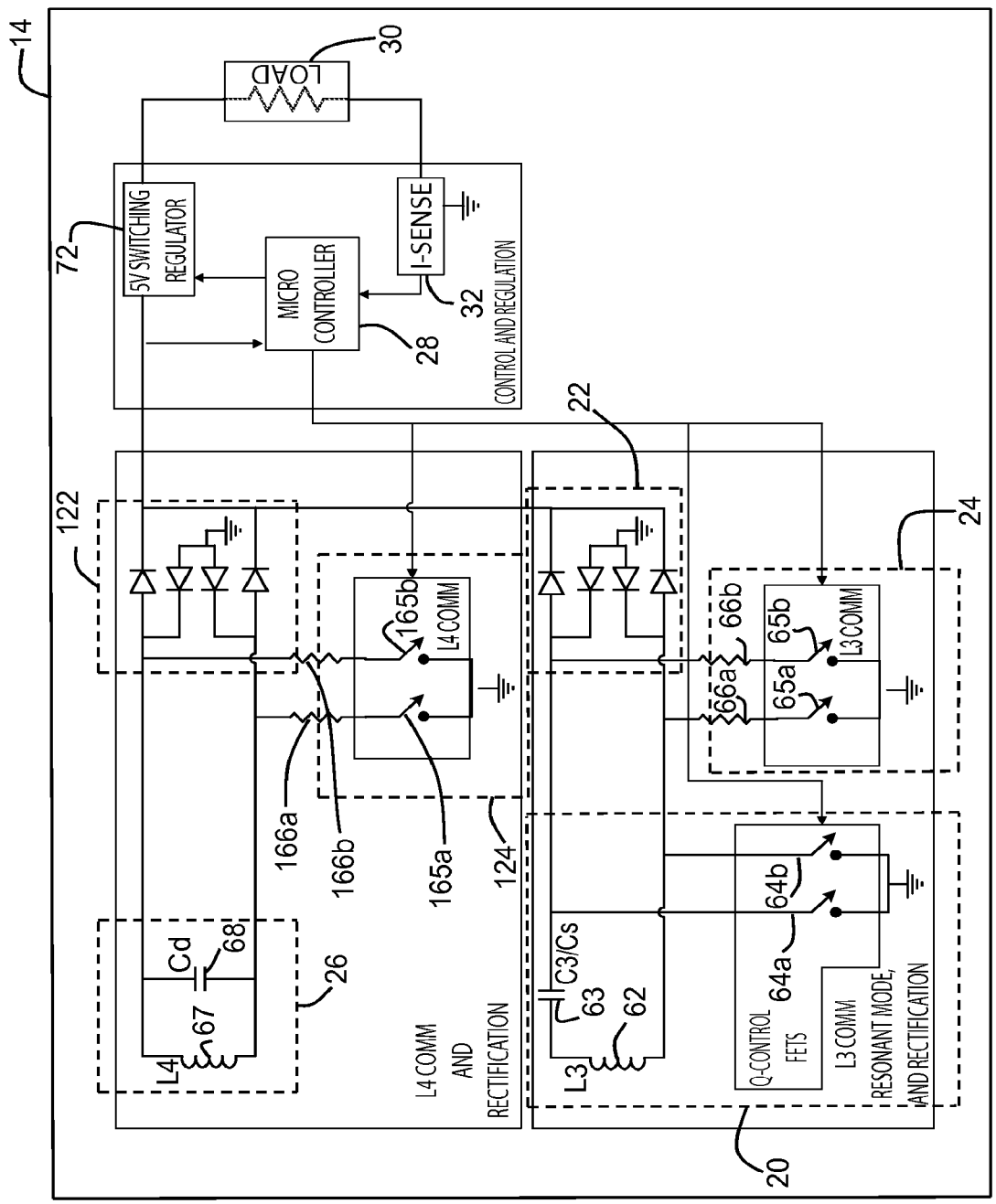
FIG. 6 shows a remote device circuit including an adaptive receiver and a supplemental receiver.
Figure 7:
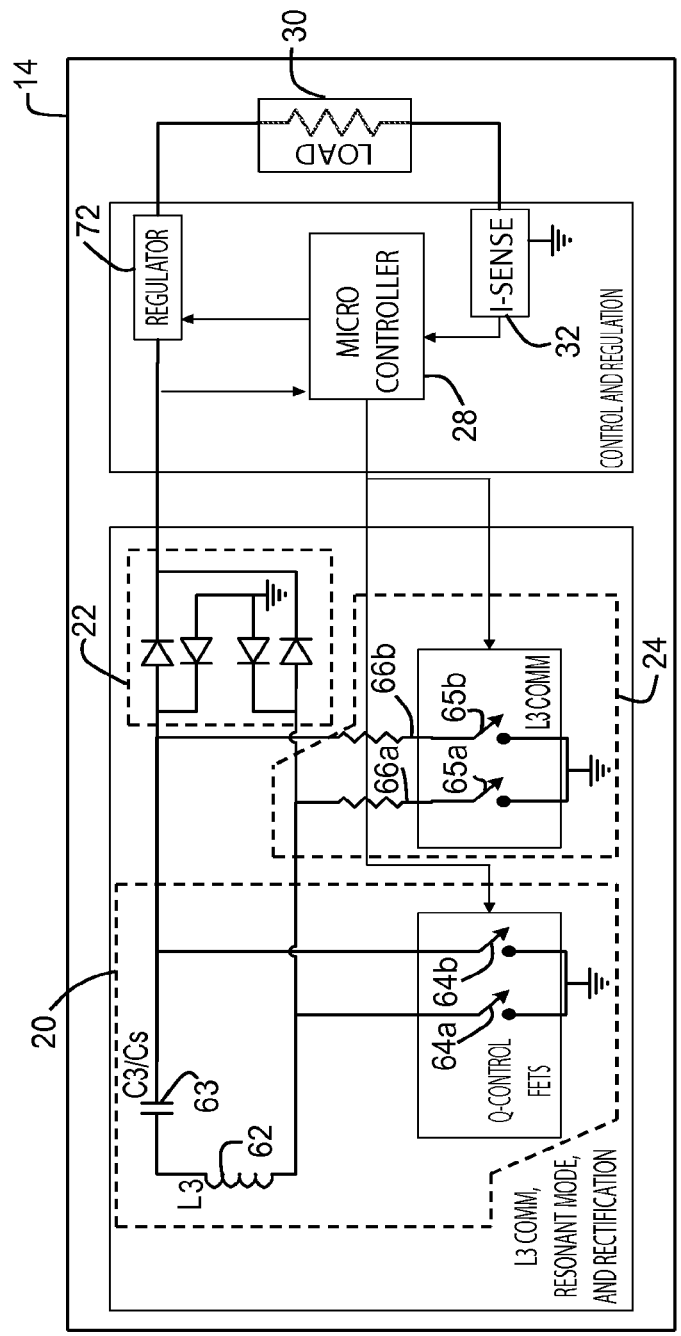
FIG. 7 shows a remote device circuit including an adaptive receiver.

The remote device in accordance with the illustrated embodiments of FIGS. 6 and 7 includes an adaptive power receiver 20 that receives wireless power from the wireless power supply by induction. The remote device 14 also includes a controller 28 capable of controlling the adaptive power receiver 20 in order to control the reception of wireless power. The controller 28 in the illustrated embodiment may switch the adaptive power receiver 20 between two or more modes of operation, including, for example, a high-Q mode and a low-Q mode. By controlling the switching between modes, the controller 28 may control the amount of energy received by the adaptive power receiver 20. This control is a form of adaptive resonance control or Q control.

Q factor, sometimes just referred to as Q, can describe a resonator's bandwidth relative to its center frequency. Q can be defined in terms of the ratio of the energy stored in a resonator to the energy supplied by a generator, per cycle, to keep signal amplitude constant, at a frequency where the stored energy is constant with time. The stored energy is the sum of energy stored in any inductors and capacitors and the lost energy is the sum of the energy dissipated in resistors per cycle. Resistors can be equivalent series resistances or designed load.

Figure 1:
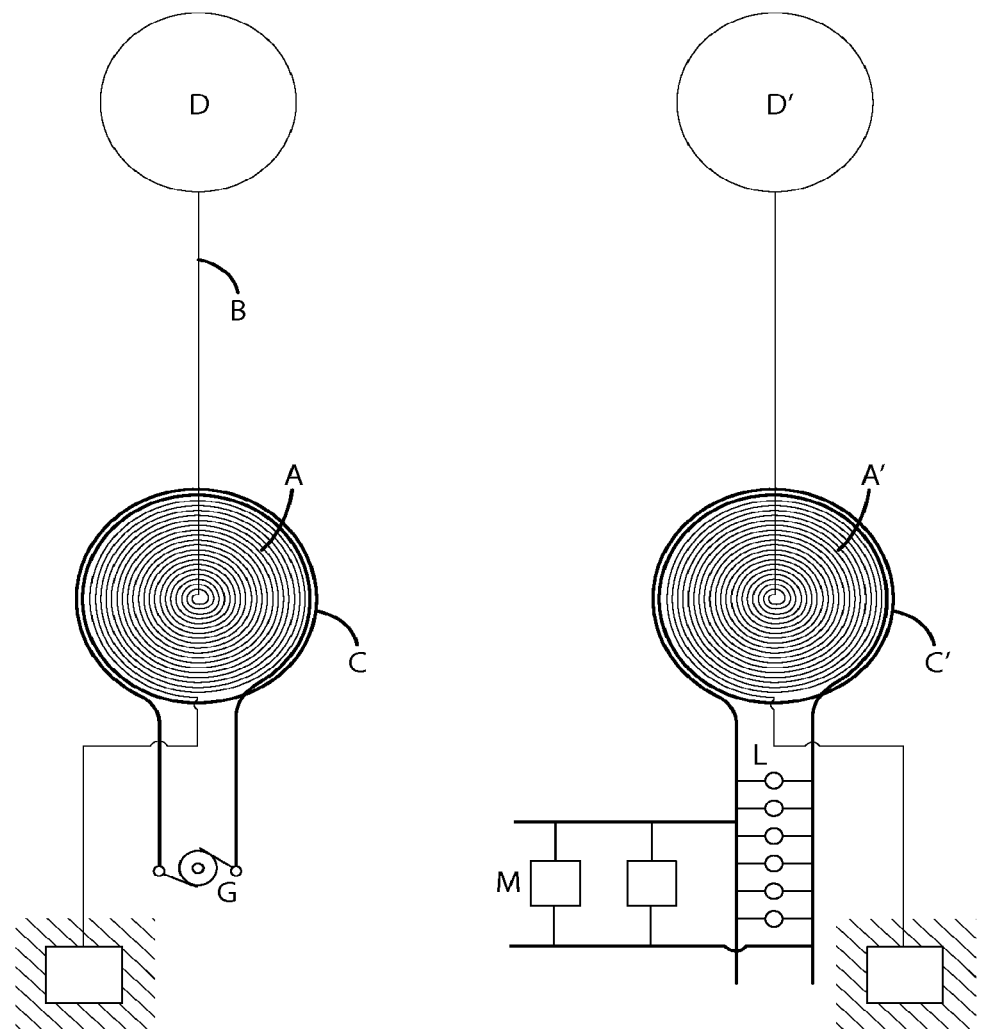
FIG. 1 shows a prior art Tesla system using a dual coil resonant drive wireless power system.
Figure 2:
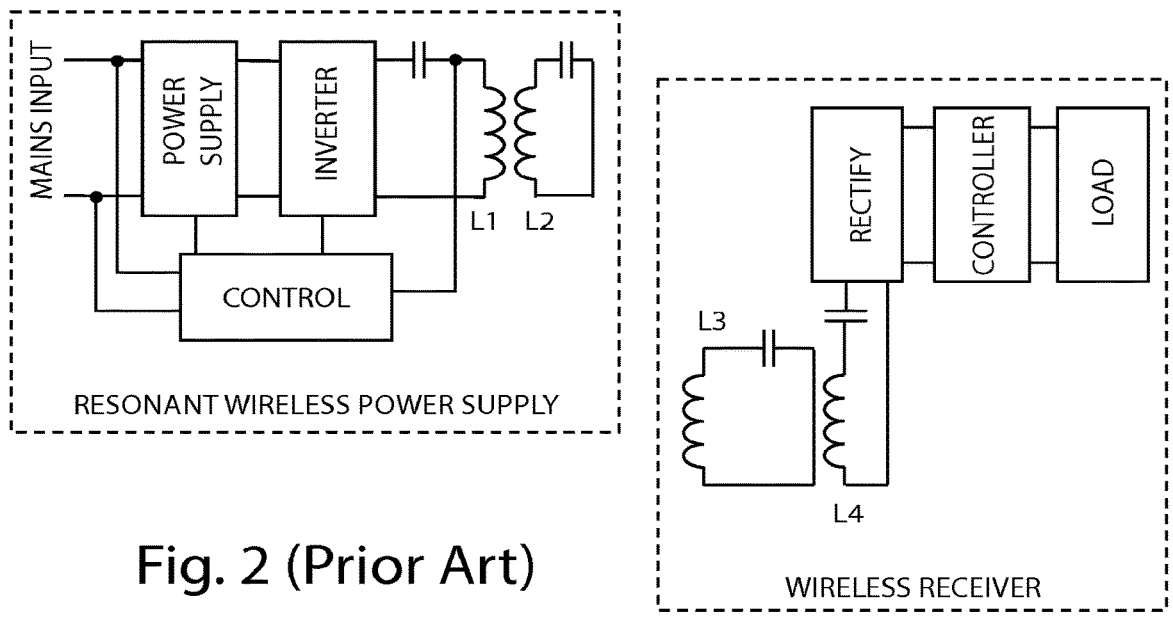
FIG. 2 shows a prior art four coil inductive wireless power system.

In a conventional four coil wireless power supply receiver, such as the one illustrated in FIG. 2, the L4 coil is typically used to harvest the field generated when L3/C3 resonates. Because L3/C3 is electrically isolated, its high Q factor allows it to generate field at lower coupling factors, enabling the remote device to receive power at greater distances. In some circumstances, high Q can allow a current to be induced in L3 that is not dissipated by its ESR. This induced current can then regenerate, extend, focus, or continue the magnetic field.

In the depicted embodiments of the present invention, L4 can be removed from the circuit and L3/C3 can be selectively electrically decoupled from the load at certain times, and at other times electrically coupled to the load. Energy generated when L3/C3 are electrically decoupled can be harvested by electrically coupling L3/C3 to the load. Changing the rate at which L3/C3 is electrically decoupled vs. electrically coupled to the load can control the amount of power delivered to the load—this is a form of adaptive resonance control or Q-control.

The remote device 14 may also include a controller 28 capable of controlling the adaptive power receiver 20. For example, the controller 28 may couple to one or more switches of the adaptive power receiver 20 (described in further detail herein) to select whether the adaptive power receiver 20 is operating in a high-Q mode or a low-Q mode. The controller 28 may control cycling between various modes of operation in accordance with the power waveform received in the adaptive power receiver 20. For example, as will be described in further detail herein, the controller 28 may operate the adaptive power receiver 20 in a high-Q mode for one or more portions of each period of the current waveform and operate the adaptive power receiver 20 in a low-Q mode for the remainder of each period.

Figure 5:
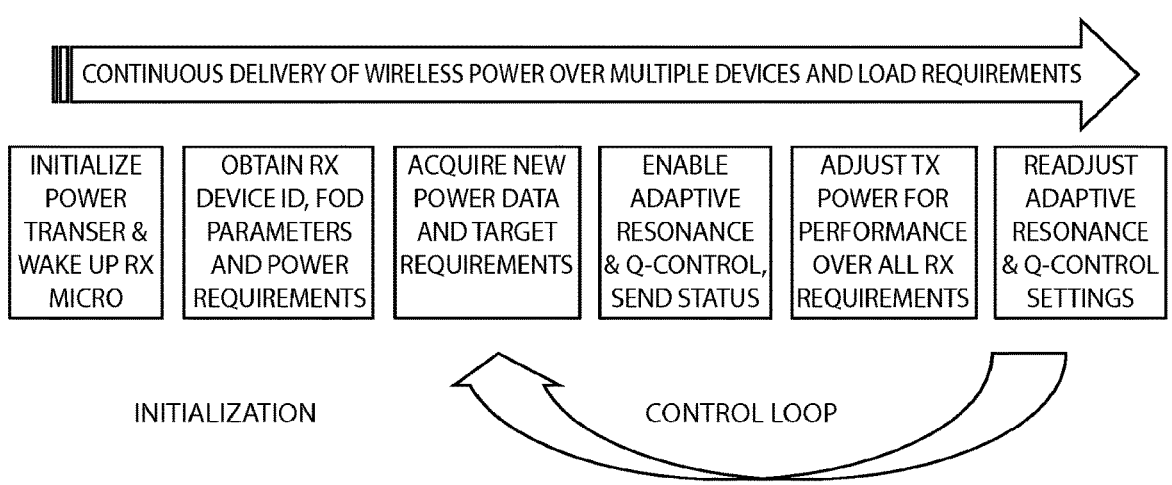
FIG. 5 shows a block diagram of a method of providing wireless power using an adaptive resonance receiver.

The controller can be programmed with a variety of control algorithms. One embodiment of a control algorithm is illustrated in FIG. 5, which can accommodate continuous delivery of wireless power over multiple devices and load requirements. The method of providing adaptive resonance power includes an initialization phase and a control loop phase. In the initialization phase, the method includes initializing power transfer and waking up the receiver controller, obtaining the receiver device ID, foreign object detection parameters, and power data (i.e., power requirements, current/voltage/power measurements, and target values) from the remote device. The control loop phase may include acquiring new power data, enabling adaptive resonance (i.e., controlling the duty cycle (or other parameter) of the Q-control FETs control signal), sending status updates, adjusting transmitter power for performance based on all of the power data collected from the remote devices, and readjusting adaptive resonance and Q-control settings.

The control loop phase of the control algorithm illustrated in FIG. 5 includes foreign object detection where each remote device provides information about parasitic losses for reconciliation in an overarching foreign object detection scheme.

The control loop phase may include Rx load control and regulation, as well as requests for Tx optimization. For example, the remote device may be able to use adaptive resonance to increase the power transfer efficiency. Accordingly, the remote device may request that the amount of power being transmitted be lowered because its needs can be met by adaptive resonance control of the adaptive power receiver 20.

In the illustrated embodiment, the remote device 14 also includes rectification circuitry 22 to rectify power received in the adaptive power receiver 20—e.g., converting alternating current output from the adaptive power receiver 20 to direct current used by the remote device 14. Such circuitry may comprise diodes, switches, or any combination thereof to provide one or more modes of rectification, including for example diode rectification, semi-synchronous rectification, discontinuous mode rectification, and full-synchronous rectification. In one embodiment, all or part of the rectification circuitry 22 may be incorporated into the adaptive power receiver 20, enabling the incorporated rectification circuitry 22 to both rectify received power and switch between various modes of the adaptive power receiver 20. In configurations in which the rectification circuitry 22 is capable of synchronous (or active) rectification, the controller 28 or self-driven synchronous rectification circuitry may control rectification.

With the adaptive power receiver 20 being configurable between various modes, it allows the system to implement a form of adaptive resonance control or Q control. Use of adaptive resonance in one embodiment may allow for use of a highly resonant adaptive power receiver 20 (e.g., a high-Q receiver) at certain times in order to adapt to a wide variety of configurations, including variations in the load and coupling between the adaptive power receiver 20 and a transmitter 56 of the wireless power supply 12 described in detail below. This control methodology may allow for versatile control for configurations ranging from close or tightly coupled (higher k coefficient) configurations and loosely coupled (lower k coefficient) configurations. This methodology may also enable higher efficiency by storing energy in the adaptive power receiver 20 for periods of time, and then releasing the energy into the remote device 14. Accordingly, an extended range of power transfer may be achieved, as well as potential elimination of additional ESR (equivalent series resistance) within the adaptive power receiver 20. For example, using this configuration, the benefits of a two coil receiver (e.g., an electrically isolated resonant circuit and a resonant circuit connected to the load), which can receive power at a distance from a wireless power supply, can be realized with a single coil that can switch between two modes—one mode where it is configured as an electrically decoupled resonant circuit and a second mode where it is a resonant circuit electrically coupled to the load. The benefits can be enhanced when the switching between the two modes is executed within a power receiving cycle. That is, once or more per cycle of a current waveform in the adaptive power receiver.

In operation, if the transmitter 56 is a high-Q transmitter and the adaptive power receiver 20 is configured in a high-Q mode, energy may be transferred between the two with low coupling due to the shared magnetic field in the coils and low damping. When both the transmitter 56 and the adaptive power receiver 20 are resonant at the same frequency, reactive impedance is reduced and the ESR, which is typically small in this configuration, may become a limited impediment to current developing in the adaptive power receiver 20. However, with both the transmitter 56 and the adaptive power receiver 20 being in a high-Q configuration, the wireless power system 10 may be unstable due to the low damping factor, resulting in large fluctuations of received power for very small changes in the system's parameters or configuration.

If the transmitter is a high-Q transmitter and the adaptive power receiver 20 is configured in a low-Q mode, energy may be transferred from the transmitter 56 to adaptive power receiver 20 in a loosely coupled situation, but the amount of energy that can be received as well as the efficiency of the power transfer may be reduced due in part to the damping of the adaptive power receiver 20 as well as the reduced coupling between the transmitter 56 and the adaptive power receiver 20.

By using adaptive resonance, such as by using an adaptive power receiver 20 configurable between various modes, the present invention may use a high-Q and low-Q configuration in conjunction with each other so that a remote device 14 may achieve the benefits of both configurations. Energy transferred into adaptive power receiver 20 in a high Q resonator mode is stored therein. In one embodiment, if the stored energy reaches a pre-determined or threshold point, the energy may be transferred to a separate tank circuit (such as a supplemental receiver) through close coupling or to the load 30 by coupling the load 30 to the circuit, or both. The adaptive power receiver may also provide power directly to the load by coupling to the rectification circuitry 22, which may be included in the load 30 or may be electrically connected to the load. Further, the load 30 in one embodiment may include a DC to DC converter that provides an appropriate level of energy to other circuitry within the load 30.

The remote device 14 in the illustrated embodiment of FIG. 4 may include, in one configuration, communication circuitry 24. This communication circuitry can form a separate communication channel with the wireless power supply or it can share the power channel. In one embodiment, the communication circuitry is capable of applying one or more communication loads 66a-b via one or more respective switches 65a-b to create data communications using backscatter modulation. For example, the communication load may be selectively applied to modulate the power signal from the transmitter 56 to the adaptive power receiver 20. In operation, the controller 28 may be operatively coupled to the communication circuitry 24 and be configured to selectively couple the communication load 66a-b to the adaptive power receiver 20 at appropriate timing to create desired data communications. The communication load 66a-b may be a resistor or other circuit component or components capable of selectively varying the overall impedance of the remote device to modulate the power signal. For example, as an alternative to a resistor, the communication load 66a-b may be a capacitor or an inductor (not shown). As another example, the remote device may incorporate a communication system in accordance with an embodiment of U.S. application Ser. No. 13/425,841 entitled SYSTEM AND METHOD FOR IMPROVED CONTROL IN A WIRELESS POWER SUPPLY, which was filed Mar. 21, 2012, and which is incorporated herein by reference in its entirety.

In an alternative embodiment similar to the illustrated embodiment of FIG. 4, the remote device 14 may include a supplemental receiver 26, shown in dashed lines as an optional component of the remote device 14. The supplemental receiver 26 may inductively couple with the adaptive power receiver 20 to receive power from the transmitter 56. In this alternative embodiment, when the adaptive power receiver 20 is configured in a high-Q mode, the supplemental receiver 26 couples with the adaptive power receiver 20 to receive and deliver energy to the load 30. But when the adaptive power receiver 20 is configured in a low-Q mode, the adaptive power receiver 20 may directly power the load 30, rather than coupling the energy to the supplemental receiver 26.

Turning now to FIG. 7, a remote device 14 according to one embodiment of the present invention is shown. FIG. 7 shows one embodiment of a remote device with an adaptive power receiver circuit. In operation, the microprocessor may have an initialization algorithm. Sufficient field or energy from a storage element can be used to turn on the microprocessor and operate the Q-Control FETs. The Q-control FETs can be operated to make L3/C3 an electrically decoupled resonant circuit. The remote device may synchronize the duty-cycle of the Q-control FETs control signal with the current waveform. For example, the remote device may detect zero crossings of the current waveform and use them to turn on the Q-control FETs. In the event that it is desirable to maintain a consistent duty cycle as the frequency of the current waveform changes, the remote device may make adjustments based on the frequency of the current waveform. For example, the remote device may detect the frequency of the current waveform, may receive the frequency from the power transmitter, or may look it up in a table stored in memory based on other parameters. Alternatively, although the timing of the switches may be controlled digitally, it is also possible to control the Q-control FETs using analog control. For example, the remote device may include a sensor and the timing of the Q-control FETs may be adjusted based on output from the sensor. For example, the sensor may detect the rectified voltage and a voltage controlled oscillator can control a portion of the timing of the Q-control FETs by dictating when the Q-control FETs are open.

Figure 62:
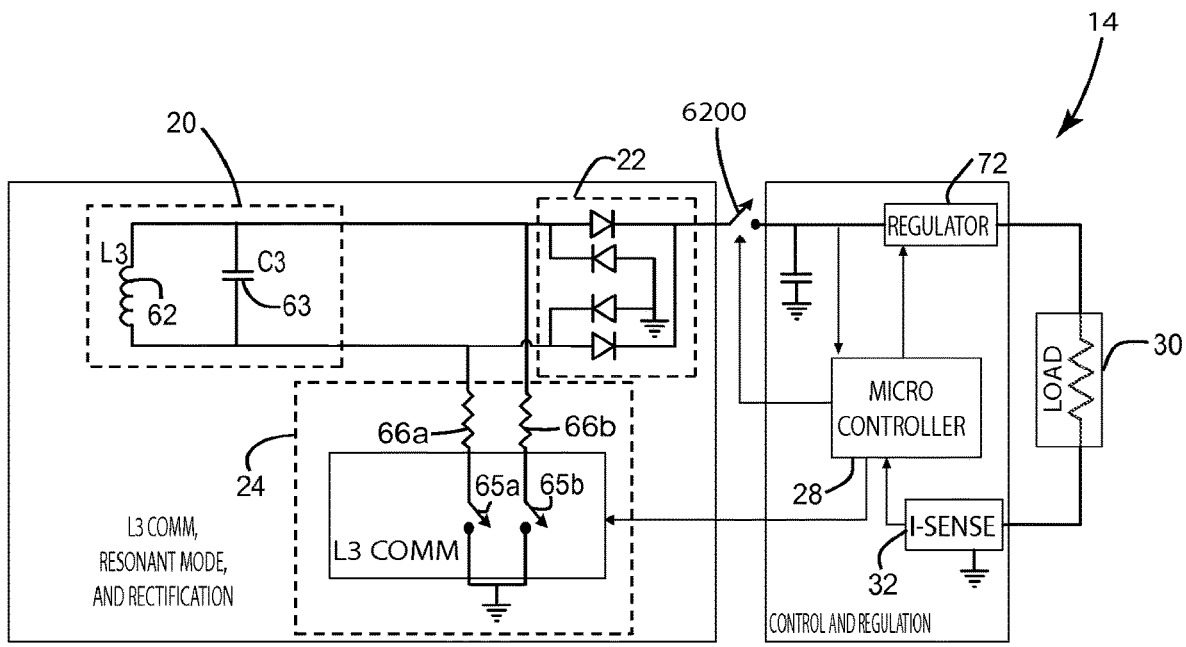
FIG. 62 shows a remote device including a parallel resonant capacitor.

In the illustrated embodiment, the remote device 14 includes an adaptive power receiver 20 configurable between two modes: a high-Q mode and a low-Q mode. The adaptive power receiver 20 in this embodiment includes a secondary 62, a resonant capacitor 63, and one or more switches 64a-b arranged to form a series resonant tank circuit capable of being switched between a high-Q mode and a low-Q mode. The present invention is not limited to use with series resonant tank circuits and may instead be used with other types of resonant tank circuits and even with non-resonant tank circuits, such as a simple inductor without a matching capacitance, or parallel resonant tank circuits. For example, as shown in FIG. 62, the remote device 14 may include a parallel resonant capacitor C3 and a switch 6200 located between the rectification circuitry 22 and the regulator 72. The switch 6200 can decouple the rectification circuitry 22 from the regulator 72. In embodiments without a regulator 72, the switch 6200 can decouple the rectification circuitry 22 from the load 30.

In the illustrated embodiment, the switches 64a-b may be controlled by the controller 28 to selectively configure the adaptive power receiver 20 between a high-Q mode and a low-Q mode. As shown, there are two switches 64a-b coupled to the controller 28. The switches 64a-b may be controlled separately or together by the controller 28 to configure the adaptive power receiver 20 in a high-Q mode. More specifically, the switches may be closed to complete a circuit path between the secondary 62 and the resonant capacitor 63 that bypasses the rectification circuitry 22 and the load 30 of the remote device 14—in other words, the resonant circuit formed by the secondary 62 and the resonant capacitor 63 is shunted. In this way, the secondary 62 and resonant capacitor 63 may form a high-Q resonator capable of accumulating energy and increased energy transfer (in comparison to a low-Q mode) from the transmitter 56. For purposes of disclosure, the present invention is described in connection with two switches 64a-b capable of selectively configuring the adaptive power receiver, but it should be understood that a single switch or more than two switches may be used to achieve the same or similar results. Further, in an alternative embodiment, the switches 64a-b may be used, as described in connection with rectification circuitry 22, to perform synchronous rectification.

In order to configure the adaptive power receiver 20 from a high-Q mode to a low-Q mode, the controller 28 may open the switches 64a-b based on sensed output from a sensor, such as a voltage sensor 34 or a current sensor 32, or both. The voltage sensor 34, current sensor 32, or both may be coupled to the adaptive power receiver 20 or the load 30 in order to monitor one or more characteristics of power in the remote device 14. It should be understood that although shown connected to the adaptive power receiver 20 or the load 30, the sensors may be connected to any node within the remote device 14. Further, the present invention is not limited to current or voltage sensors; one or more sensors capable of monitoring any characteristic in the remote device 14 may be incorporated so that the sensor output may be used to determine the configuration of the adaptive power receiver 20.

With the switches 64a-b open, circuitry in the remote device 14 that is bypassed in the high-Q mode (such as the rectification circuitry 22 and the load 30) becomes coupled to the adaptive power receiver 20 so that the load 30 may be powered from the adaptive power receiver 20, potentially increasing the ESR of the adaptive power receiver 20 and transitioning it to a low-Q mode. Put differently, if energy is coupled to the load 30 directly from the adaptive power receiver 20 by opening the switches 64a-b, the stored energy is discharged into the load 30 transitioning the adaptive power receiver 20 to a low-Q mode.

By cycling between a low-Q mode and a high-Q mode, the effective Q of the adaptive power receiver 20 may be controlled over time. For example, by varying the duty cycle of the switches 64a-b to switch between the two modes, the effective Q of the adaptive power receiver 20 may be increased or decreased. The high-Q mode may be maintained long enough to store sufficient energy to build enough voltage or current at a given coupling, but not so long as to build more voltage or current than needed by the load 30. This can enable wireless power transfer over a very wide coupling range without voltage regulation in the remote device 14. For example, if the remote device 14 is very loosely coupled, the duty cycle may be increased to increase the duration of the high-Q mode, allowing the adaptive power receiver 20 to store additional energy. Alternatively, in an increased coupled state, because energy may be more easily transferred to the adaptive power receiver 20 in a low-Q mode and energy may be more easily stored in the high-Q mode, the duty cycle may be reduced to lessen the duration of the high-Q mode. This reduction in duty cycle may compensate for the increased energy transfer in low-Q mode and storage in high-Q mode. By increasing or decreasing the duty cycle between the high-Q mode and the low-Q mode, the adaptive power receiver 20 may control the amount of power received, including for example control over the bridge voltage of the receiver.

Figure 12A:
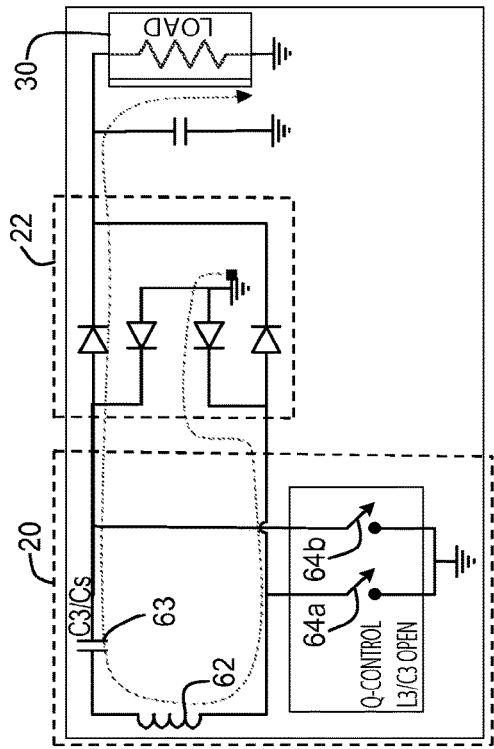
FIG. 12A shows a circuit schematic of the adaptive resonance building phase.
Figure 12B:
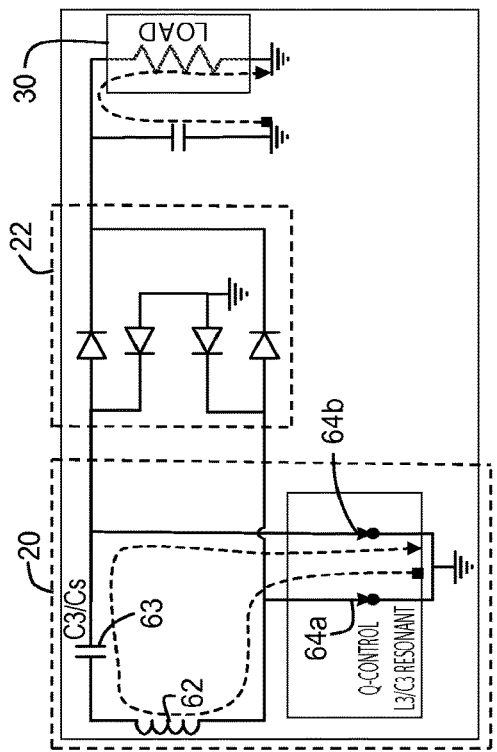
FIG. 12B shows a circuit schematic during part of the power harvesting phase.
Figure 12D:
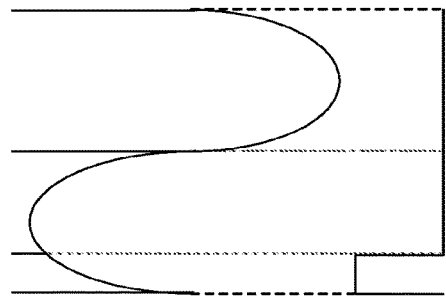
FIG. 12D shows the adaptive resonance building phase and the power harvesting phases relative to a power receiving cycle where there is one adaptive resonance phase per cycle.
Figure 12C:
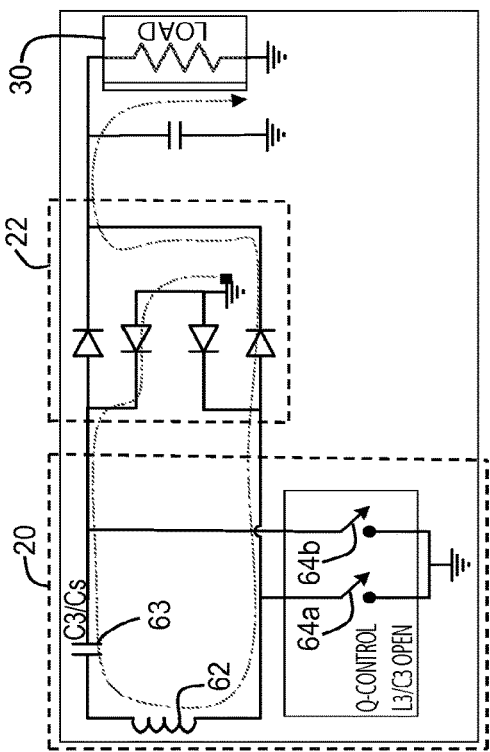
FIG. 12C shows a circuit schematic during part of the power harvesting phase.
Figure 22:
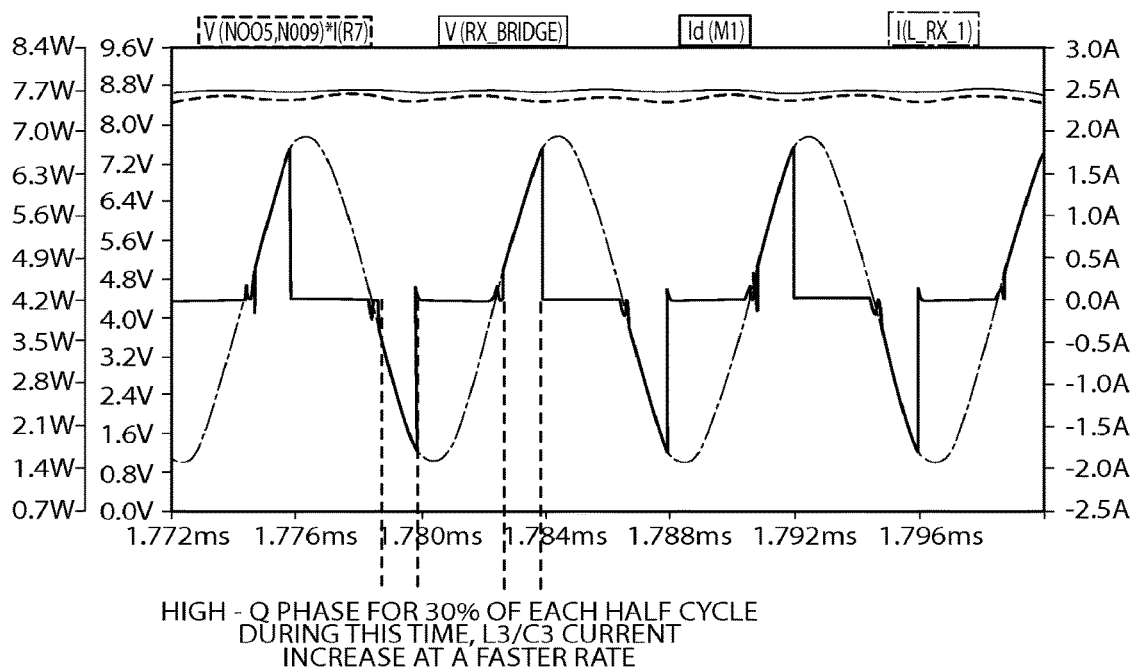
FIG. 22 shows a graph of Rx voltage, Rx power, L3 current, and Q-FET current where there is switching twice per power receiving cycle at 30% duty cycle per half cycle.

FIGS. 12A, 12B, and 12C show a circuit schematic of a half cycle adaptive resonance control circuit. FIG. 12D shows a graph of the adaptive receiver current waveform during a power receiving cycle. The first portion of the waveform where the Q-control FETs are on in a high-Q building phase is illustrated by the current path shown in FIG. 12A, the second portion of the waveform where the Q-control FETs are switched off in a low-Q power harvesting phase is illustrated by the current path shown in FIG. 12B, and the final portion of the waveform where the Q-control FETs are still off is illustrated by the current path shown in FIG. 12C. Ripple voltage at the rectifier output is decreased by closing the Q control switches on a cycle by cycle basis. Ripple voltage and bulk capacitance can be further reduced by closing the Q control switches on a twice (or more) per cycle basis, which is shown in FIG. 22. This gives the Rx the ability to have its own power control mechanism. By timing the switching appropriately, the dynamic voltage range, power range, and efficiency of the Rx can be increased. In some embodiments, switching at L3 current zero cross allows for the most efficient operation.

Figure 19E:
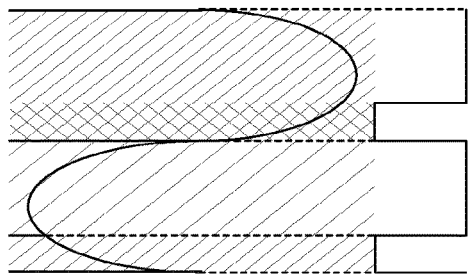
FIG. 19E shows the adaptive resonance building phases and the power harvesting phases relative to a power receiving cycle where there are two adaptive resonance phases per cycle.
Figure 19A:
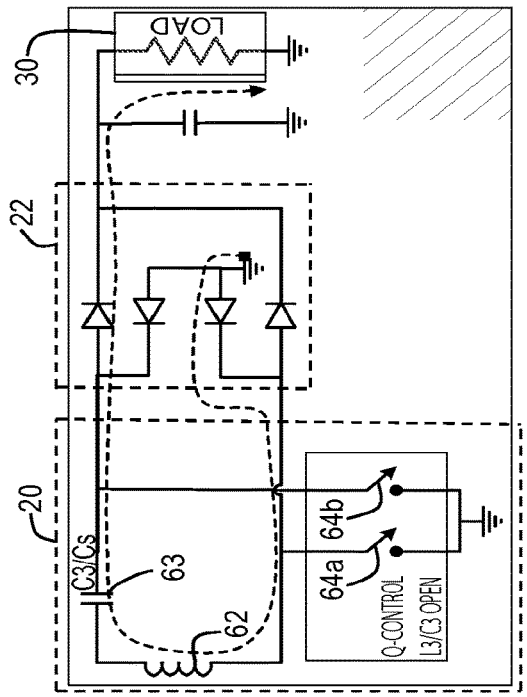
FIG. 19A shows a circuit schematic during a portion of the adaptive resonance phase.
Figure 19B:
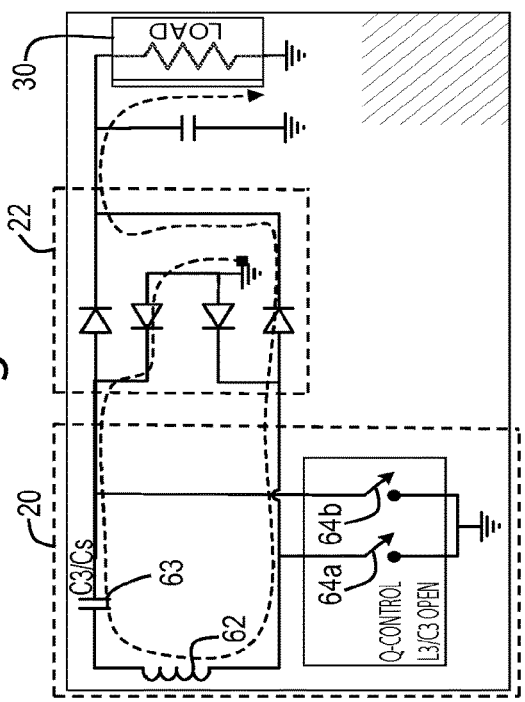
FIG. 19B shows a circuit schematic during a portion of the power harvesting phase.
Figure 19C:
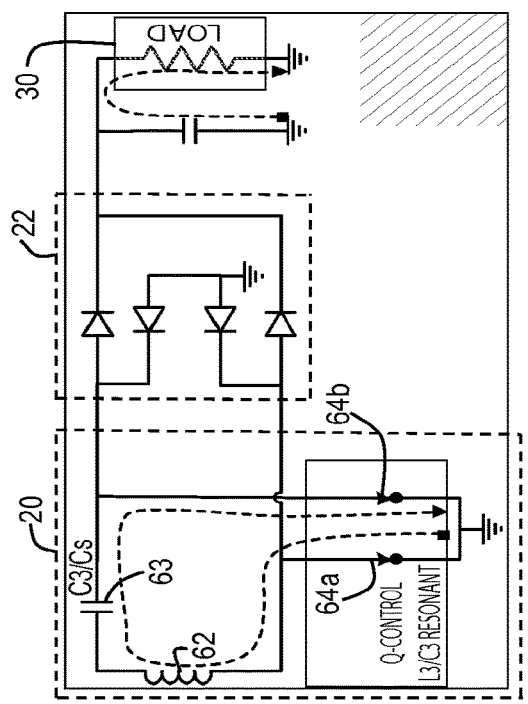
FIG. 19C shows a circuit schematic during a portion of the adaptive resonance phase.
Figure 19D:
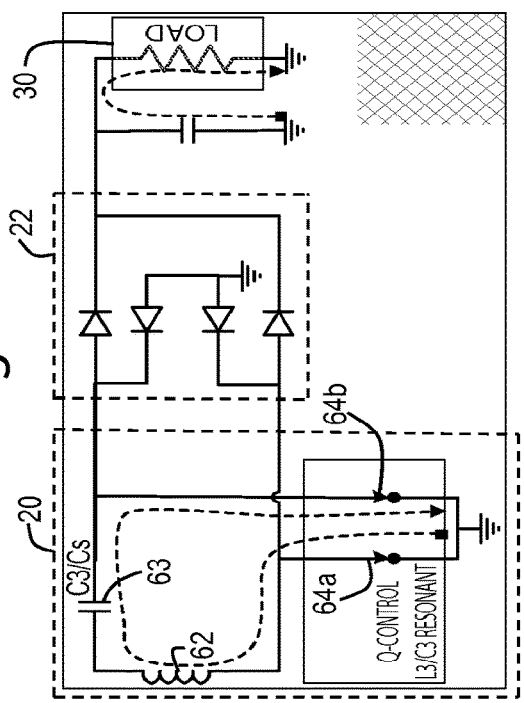
FIG. 19D shows a circuit schematic during a portion of the power harvesting phase.

FIGS. 19A, 19B, 19C, 19D, and 19E show a circuit schematic of an adaptive resonance control circuit being controlled twice per cycle. FIG. 19E shows a graph of the adaptive receiver current waveform during a power receiving cycle. The first portion of the waveform where the Q-control FETs are on in a high-Q phase is illustrated by the current path shown in FIG. 19A, and the second portion of the waveform where the Q-control FETs are switched off in a low-Q power harvesting phase is illustrated by the current path shown in FIG. 19B. The third portion of the waveform where the Q-control FETs are switched on in a high-Q phase is illustrated by the current path shown in FIG. 19C, and the final portion of the waveform where the Q-control FETs are switched off in a low-Q power harvesting phase is illustrated by the current path shown in FIG. 19D.

Figure 14:
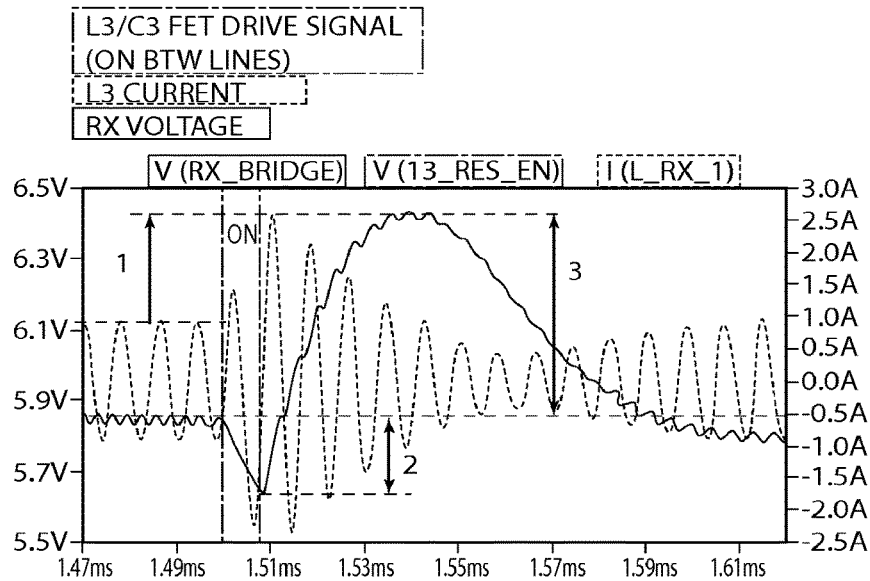
FIG. 14 shows an expanded analysis of the adaptive resonance waveform shown in FIG. 13D.

FIGS. 13A, 13B, 13C, and 13D show how the bridge voltage reacts over multiple power receiving cycles to turning on the Q-control FETs for a single pulse during one power receive cycle for a certain duty cycle. FIG. 13A illustrates bridge voltage increases after the Q-control FETs are turned on for 15% of a single power receive cycle. FIG. 13B illustrates bridge voltage increases after the Q-control FETs are turned on for 25% of a single cycle. FIG. 13C illustrates bridge voltage increases after the Q-control FETs are turned on for 50% of a single cycle. FIG. 13D and FIG. 14 illustrate bridge voltage increases after the Q-control FETs are turned on for 100% of a single cycle. As can be seen in FIG. 14, closing the Q-control FETs, or transitioning to a high-Q mode, can result in an increased coil current or a build-up of energy as indicated by the marker labeled 1. While in the high-Q mode, the receiver voltage may sag as the load draws energy from the bulk capacitance, as indicated by the marker labeled 2. And, as indicated by the marker labeled 3, once the Q-control FETs are opened, or a transition to a low-Q mode occurs, the build-up of energy may dissipate into the load and replenish the bulk capacitance with energy. In each scenario, the bridge voltage dips while the Q-control FETs are turned on, and then rises once the Q-control FETs are turned off. By synchronizing the timing of the Q-control FETs with the received current over multiple cycles, the voltage and/or power received can be controlled.

In the illustrated embodiment, the adaptive power receiver 20 includes a single secondary 62 capable of being used in high-Q and low-Q modes of operation. As a result, a single coil receiver may be able to efficiently receive power over a wide range of coupling states and loads 30 without using additional coils or costly DC/DC converters for power regulation. That is, in some embodiments, the regulator 72 illustrated in FIGS. 6 and 7 may be optional and can be removed from the circuit. In one embodiment, this ability may enable the remote device 14 to control the amount of power received over a range of field levels provided by the transmitter 56 without using complex communication and control systems. In other words, the remote device 14 may simply receive as much power from the wireless power supply 12 that it desires without having to communicate a request or information to the wireless power supply 12, and without using additional power regulation circuitry.

An alternative embodiment of the present invention is shown in FIG. 6 in which the remote device 14 includes a supplemental receiver 26, similar to the supplemental receiver 26 described with respect to FIG. 4. The supplemental receiver 26 is capable of receiving wireless power from the wireless power transmitter 56, and the supplemental receiver 26 is coupled to the load 30. In the illustrated embodiment, the supplemental receiver 26 is coupled to the load 30 through rectification circuitry 22 and a 5V switching regulator 72. The supplemental receiver 26 may be similar to the adaptive power receiver 20 but with several exceptions. For example, the supplemental receiver 26 may not be configurable between various modes; rather, it may be directly coupled to the rectification circuitry 22 and the load 30. It should be understood, however, that the supplemental receiver 26 may be configured similar to the adaptive power receiver 20 in an alternative embodiment such that, for example, the supplemental receiver 26 may be configured in a high-Q mode while the adaptive power receiver 20 is in a low-Q mode, and conversely, in a low-Q mode while the adaptive power receiver 20 is in a high-Q mode.

The supplemental receiver 26 in this embodiment includes a supplemental secondary 67 and supplemental resonant capacitor 68 similar to the secondary 62 and resonant capacitor 63 of the adaptive power receiver 20. Although shown in a parallel tank circuit configuration, the supplemental secondary 67 and supplemental resonant capacitor 68 of this embodiment are not limited to this configuration. Like the secondary 62 and resonant capacitor 63, these components may be arranged in any manner capable of receiving power inductively. Further, the supplemental resonant capacitor 68 is an optional component such that the supplemental secondary 67 may inductively receive power without it.

Figure 3:
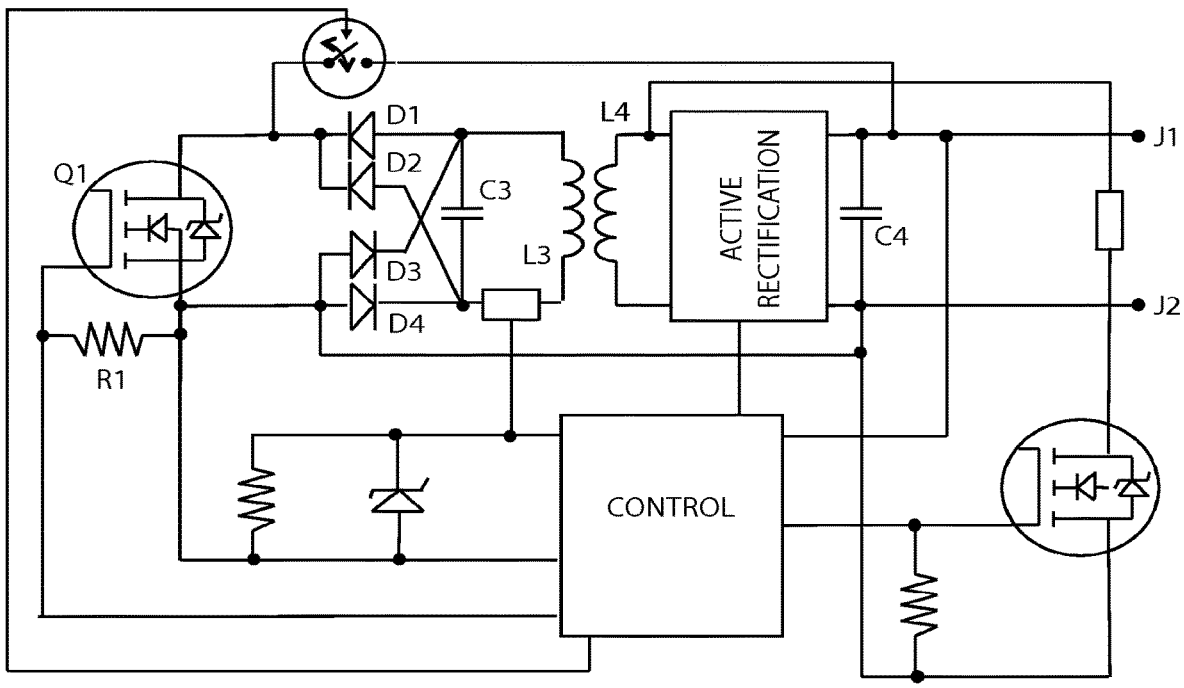
FIG. 3 shows a schematic for a remote device with a switch capable of selecting dual-coils for power receiving.

The remote device 14 in the illustrated embodiment of FIG. 6 also includes additional communication circuitry 124 and additional rectification circuitry 122 coupled to the supplemental receiver 26. The additional communication circuitry 124 may be similar to the communication circuitry 24 described above with respect to FIGS. 4 and 6, but may enable modulation of the power signal via the supplemental receiver 26. Further, the additional rectification circuitry 122 may be similar to the rectification circuitry 22 described with respect to FIGS. 3 and 5, but may rectify power received in the supplemental receiver 26 rather than the adaptive power receiver 20.

In the illustrated embodiment of FIG. 6, if the energy received in the remote device 14 is coupled into a low Q receiver, the remote device 14 may close the switches 64a-b to shunt the secondary 62 and resonant capacitor 63 to create a high Q resonator. When shunted, the adaptive power receiver in the high-Q mode may extend the magnetic field into the supplemental receiver 26, but little energy may be lost in the shunt due to the low impedance of the shunt. The shunting of the adaptive power receiver 20 can be held for several power receive cycles of the recirculation current in the adaptive power receiver, or can be performed on a cycle-by-cycle basis where the shunt switches according to a duty cycle, or applied for a percentage of each period. If the shunt is controlled on a cycle-by-cycle basis, the voltage received by the supplemental receiver 26 may cycle at a higher frequency. This can allow for a smaller bulk capacitor to filter out ripple voltage. By adjusting the duty cycle of the adaptive power receiver 20 between high-Q and low-Q modes, the adaptive power receiver 20 can adjust the amount of current in the secondary 62, thereby adjusting the amount of power received in the supplemental receiver 26. For example, when the remote device 14 is placed in proximity to a transmitter 56 with a higher degree of coupling, the current in the secondary 62 of the adaptive power receiver may increase during the high-Q mode. To compensate for this increase and prevent over-voltaging the remote device 14, the duty cycle of the shunt may be decreased to reduce the overall power received by the remote device 14. In other words, decreasing the duty cycle of the high-Q mode may reduce the overall power received by the remote device. In one embodiment, as described above, the adaptive power receiver 20 may optionally be coupled to the load 30 along with the supplemental receiver 26 through rectification circuitry 22. By doing so, power may be taken from either the adaptive power receiver or the supplemental receiver during the low-Q mode, or both coils in alternative embodiments. The energy received may depend on the coupling of the transmitter to each of the secondary 62 and the supplemental secondary 62, along with the inductance of each.

If the energy received by the remote device 14 is coupled into the load 30 directly from the adaptive power receiver 20 in a high-Q mode, or through a DC to DC converter, the stored energy in the adaptive power receiver 20 may be discharged into the load 30, creating a low-Q receiver. The duty cycle that the load 30 is switched in controls the effective Q of the adaptive power receiver 20 over time. In the high-Q mode, the adaptive power receiver 20 may build current at a given coupling, but is maintained long enough to build as much voltage as desired by the load 30. This may allow use over a very wide range of coupling without secondary voltage regulation. For example, if the remote device is very loosely coupled, the duty cycle may be increased to allow the adaptive power receiver 20 in high-Q mode to store additional energy. Alternatively, in an increased coupled state, because energy may be more easily transferred to the adaptive power receiver 20 in a low-Q mode and energy may be more easily stored in the high-Q mode, the duty cycle may be reduced to lessen the duration of the high-Q mode. This reduction in duty cycle may compensate for the increased energy transfer in low-Q mode and storage in high-Q mode.

In the illustrated embodiment of FIG. 6, the remote device 14 may include a DC to DC converter 72 to regulate power output from the rectification circuitry 22, 122 to the load 30. With the use of the DC to DC converter 72, the remote device 14 may compensate for additional and sudden changes in coupling and in the load 30 by allowing the DC to DC converter 72 to use the energy provided to the rectification circuitry 22, 122 regardless of the voltage across the rectification circuitry 22, 122. Accordingly, the controller 28 may decrease the frequency of adjustment updates to the cycling of the adaptive power receiver 20 in response to changes in coupling and in the load 30, allowing the controller 28 to be a lower cost controller.

A model of a system that changes between high-Q and low-Q modes of operation is now described with reference to FIGS. 52-58. Specifically, an analysis and simulation of a switched series-resonant receiver circuit for wireless power transfer applications is described.

Figure 52:
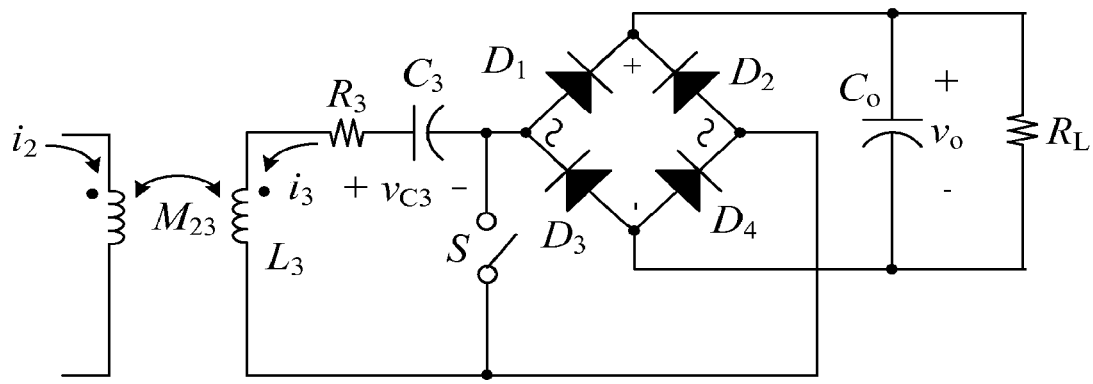
FIG. 52 shows a circuit topology of a series-resonant receiver-side wireless power transfer network.

Referring to FIG. 52, part of a wireless power transmitter circuit and a remote device circuit in accordance with one embodiment of the present invention are illustrated. The remote device circuit includes a resonant tank circuit composed of inductor $L_3$, capacitor $C_3$, and resistance $R_3$ (the equivalent series resistance of $L_3$), a bridge rectifier consisting of $D_1$-$D_4$, a bulk storage capacitor $C_o$, load resistance $R_L$, an inductor $L_2$, linked to inductor $L_3$ by mutual inductance $M_{23}$, carrying a sinusoidal current $i_2$ whose fixed angular frequency, $\omega_o$, is near or equal to the resonant frequency of $L_3$ and $C_3$, and a switch S whose state (open or closed) causes reconfiguration of the network topology.

Figure 53:
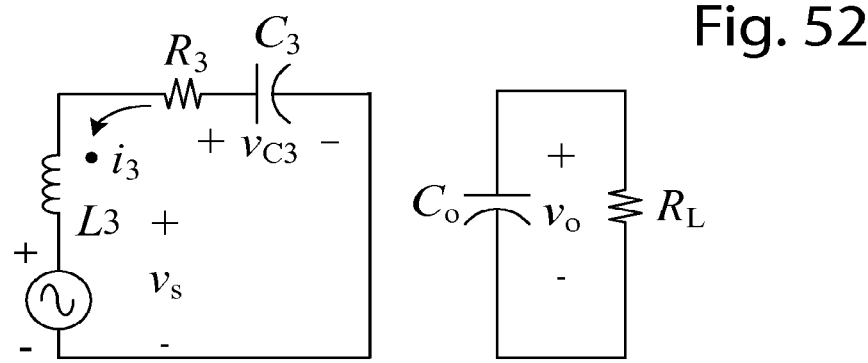
FIG. 53 shows an equivalent circuit topology of the remote device in FIG. 52 with a switched resonant network where the switch is closed.

FIG. 53 illustrates a simplified circuit diagram when switch S is closed. For ease of explanation, the voltage induced in inductor $L_3$ by the time-varying flux created by $L_2$ has been replaced with sinusoidal voltage source $v_s$ with amplitude $\omega_o M_{23} I_2$, where $I_2$ is the amplitude of sinusoidal current $i_2$. For the sake of discussion, the diodes are considered to be ideal; similarly, switch S will be considered ideal.

Closing the switch separates the $L_3 C_3$ tank circuit from the load. FIG. 53 shows the network in this configuration. Closing of the switch short-circuits the input voltage to the bridge rectifier, isolating the $L_3 C_3$ tank circuit from output capacitance $C_o$ and load resistance $R_L$. During this time, source $v_s$ causes energy to be stored in tank circuit $L_3$-$C_3$ while stored charge in output capacitor $C_o$ provides current to load resistance $R_L$.

The state equations of the network of FIG. 53 are as follows:

$$\begin{bmatrix} \frac{di_3}{dt} \\ \frac{dv_{c3}}{dt} \\ \frac{dv_o}{dt} \end{bmatrix} = \begin{bmatrix} \frac{-R_3}{L_3} & \frac{1}{L_3} & 0 \\ \frac{-1}{C_3} & 0 & 0 \\ 0 & 0 & \frac{-1}{R_L C_o} \end{bmatrix} \times \begin{bmatrix} i_3 \\ v_{c3} \\ v_o \end{bmatrix} + \begin{bmatrix} \frac{-1}{L_3} \\ 0 \\ 0 \end{bmatrix} v_s$$

The state equations are expressed in the form (dX/dt)=AX+BU where X is a column vector of system states, A is the state-transition matrix, and B is a weighting matrix for the input vector U. In this case, there is only one stimulus that drives the system, and U is a scalar $v_s$. The system states are inductor current $i_3$, capacitor voltage $v_{C3}$, and capacitor voltage $v_o$.

Figure 30:
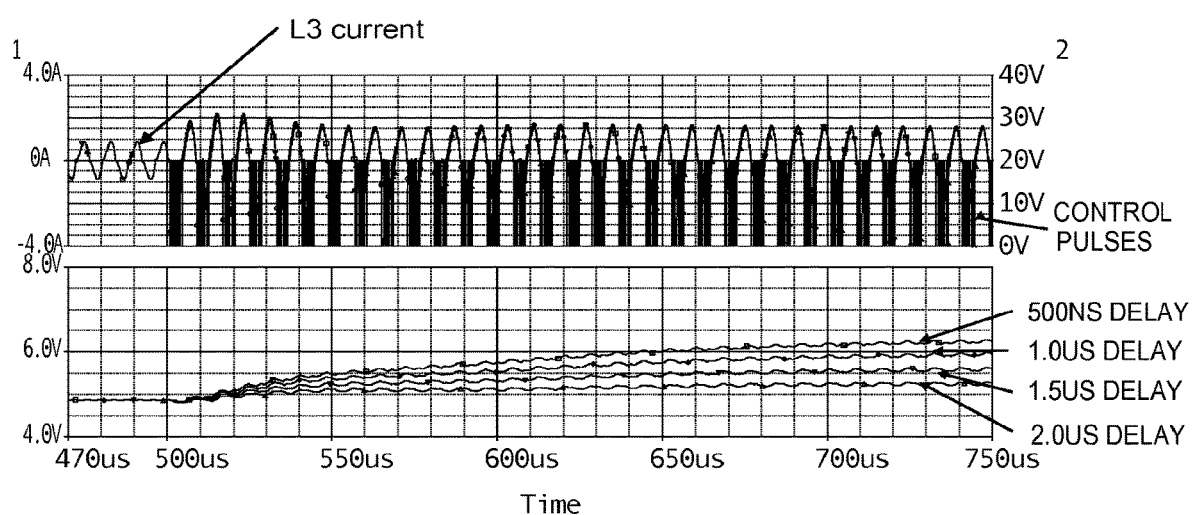
FIG. 30 shows a graph of bridge voltage and L3 current where the Q-control FETs are operated at non-zero crosses.

The network can be re-configured by opening of the switch; the bias (forward or reverse) of the diodes of the bridge rectifier will determine the topology after opening of the switch. All openings or closings of switch S are assumed in this explanation to take place at zero-crossing of $i_3$, however, in alternative embodiments, openings and closings of the switch S may take place at non-zero crossings. FIG. 30 shows the duty cycle of the Q control FETs and the impact on output voltage when switched at non-zero crossings of the coil current through L3, indicating that switching at non-zero crossings may be less effective.

If $v_{C3} \geq v_o + v_s$ at zero-crossing of $i_3$, diodes $D_2$ and $D_3$ permit conduction and a net positive voltage across $L_3$ will cause $di_3/dt$ to be positive. Diodes $D_2$ and $D_3$ will remain in conduction as long as $i_3$ is positive. The network as it appears with $D_2$ and $D_3$ in conduction is shown in FIG. 54.

Figure 54:
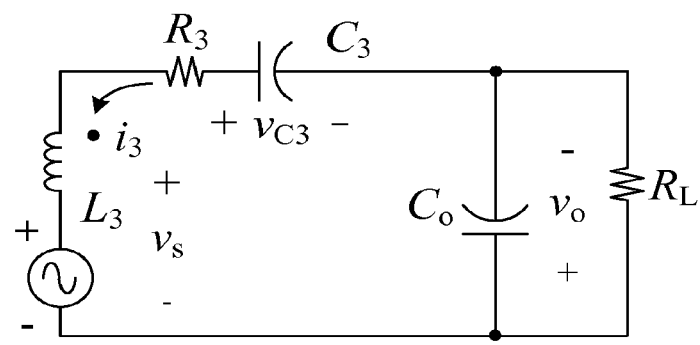
FIG. 54 shows an equivalent circuit topology of a remote device in FIG. 52 with a switched resonant network where the switch is open and diodes $D_2$ and $D_3$ in conduction.

The state equations for the network of FIG. 54 are as follows:

$$\begin{bmatrix} \frac{di_3}{dt} \\ \frac{dv_{c3}}{dt} \\ \frac{dv_o}{dt} \end{bmatrix} = \begin{bmatrix} \frac{-R_3}{L_3} & \frac{1}{L_3} & \frac{-1}{L_3} \\ \frac{-1}{C_3} & 0 & 0 \\ \frac{1}{C_o} & 0 & \frac{-1}{R_L C_o} \end{bmatrix} \times \begin{bmatrix} i_3 \\ v_{c3} \\ v_o \end{bmatrix} + \begin{bmatrix} \frac{-1}{L_3} \\ 0 \\ 0 \end{bmatrix} v_s$$

If $v_{C3} \leq v_s - v_o$ at zero-crossing of $i_3$, diodes $D_1$ and $D_4$ permit conduction and a net negative voltage across $L_3$ will cause $di_3/dt$ to be negative. Diodes $D_1$ and $D_4$ will remain in conduction as long as $i_3$ is negative. The network as it appears with $D_1$ and $D_4$ in conduction is shown in FIG. 55.

Figure 55:
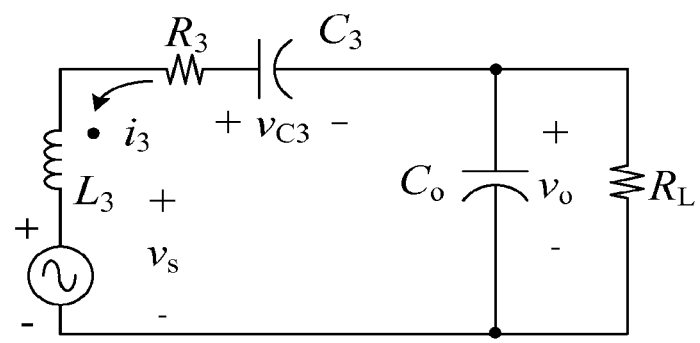
FIG. 55 shows an equivalent circuit topology of a remote device in FIG. 52 with a switched resonant network where the switch is open and diodes $D_1$ and $D_4$ in conduction.

The state equations for the network of FIG. 55 are as follows:

$$\begin{bmatrix} \frac{di_3}{dt} \\ \frac{dv_{c3}}{dt} \\ \frac{dv_o}{dt} \end{bmatrix} = \begin{bmatrix} \frac{-R_3}{L_3} & \frac{1}{L_3} & \frac{1}{L_3} \\ \frac{-1}{C_3} & 0 & 0 \\ \frac{-1}{C_o} & 0 & \frac{-1}{R_L C_o} \end{bmatrix} \times \begin{bmatrix} i_3 \\ v_{c3} \\ v_o \end{bmatrix} + \begin{bmatrix} -1 \\ \frac{L_3}{0} \\ 0 \end{bmatrix} v_s$$

In the event that $v_s - v_o < v_{C3} < v_s + v_o$ at zero-crossing of $i_3$, none of the diodes of the bridge rectifier will permit conduction; neither the inductor current $i_3$ nor the capacitor voltage $v_{c3}$ can change. The state equations for this circumstance are:

$$\begin{bmatrix} \frac{di_3}{dt} \\ \frac{dv_{c2}}{dt} \\ \frac{dv_o}{dt} \end{bmatrix} = \begin{bmatrix} 0 & 0 & 0 \\ 0 & 0 & 0 \\ 0 & 0 & \frac{-1}{R_L C_o} \end{bmatrix} \times \begin{bmatrix} i_3 \\ v_{c3} \\ v_o \end{bmatrix} + \begin{bmatrix} 0 \\ 0 \\ 0 \end{bmatrix} v_s$$

Figure 57:
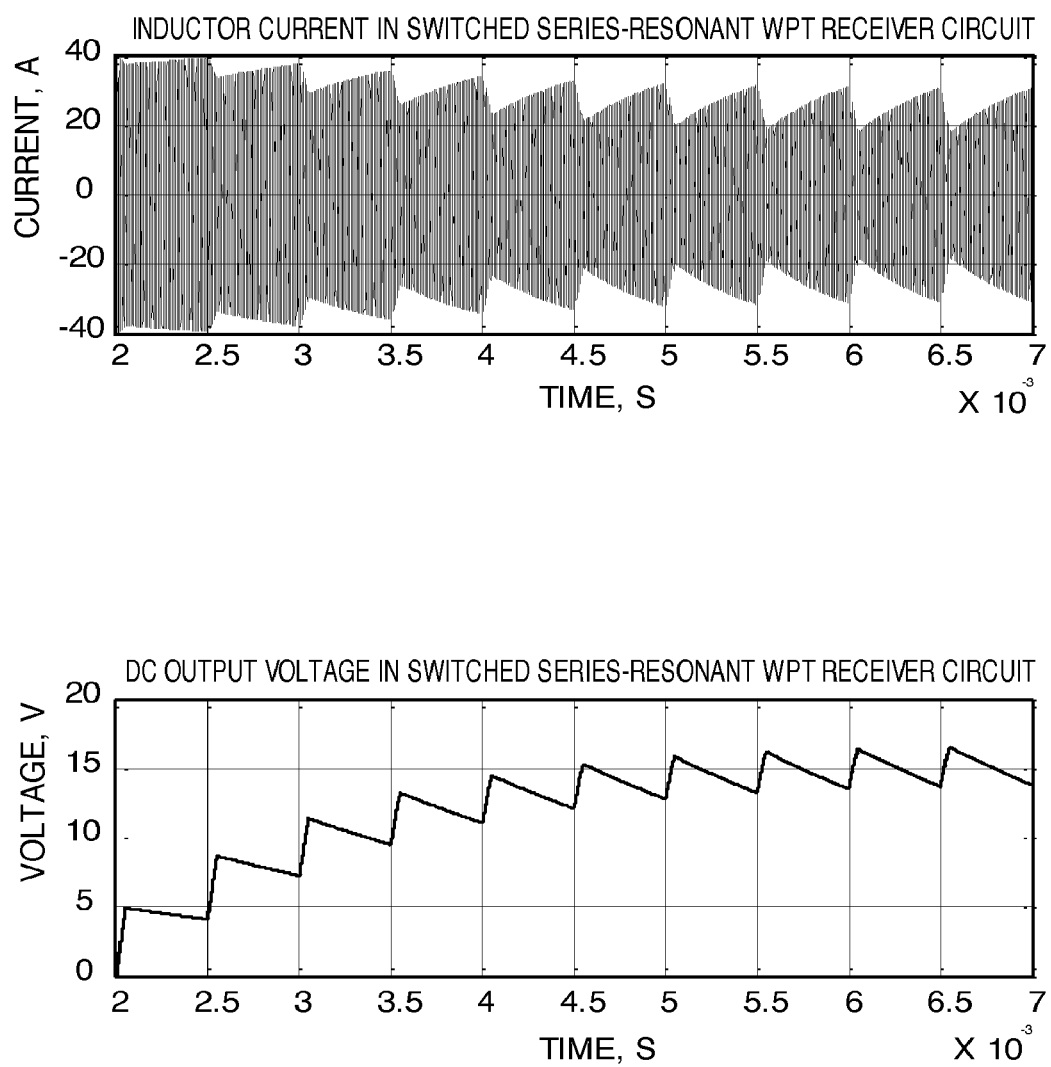
FIG. 57 shows graphs of inductor current and output voltage for the switched series-resonant wireless power transfer network with a switch cycle of 50 µs closed followed by 450 µs open.

FIGS. 56-58 illustrate solutions of the network state equations using Matlab ode23 numerical-integration function. The parameters of the network used in these simulations were as follows: $L_3=33.3$ μH; $C_3=76.07$ nF; $R_3=0.1\Omega$; amplitude of $v_s=5$V; $C_o=250$ μF; $R_L=10\Omega$; operating frequency=100.0 kHz.

FIG. 56 shows the start-up transients of the series-resonant network with the switch closed. It is assumed that all state variables were zero at t=0. The output voltage is not shown since it remains at zero as long as the switch remains closed.

FIG. 57 shows the inductor current and DC output voltage after the start-up transient. The switch cycle commenced at t=2.00 ms, with each cycle consisting of a closure of 50 μs followed by an opening of 450 μs. For this embodiment, power dissipation in the load is approximately 22 W.

FIG. 58 shows the inductor current and DC output voltage after the start-up transient. The switch cycle commenced t=2.00 ms, with each cycle consisting of a closure of 20 μs followed by an opening of 480 μs. For this embodiment, power dissipation in the load is approximately 8 W.

Cycling between the high-Q and low-Q modes of operation will now be described in further detail with respect to FIG. 7. However, it should be understood that this cycling methodology may be used in conjunction with any of the other embodiments described herein.

Shunting of the secondary 62 and resonant capacitor 63 (or holding the adaptive power receiver 20 in a high-Q mode) over multiple power receiving cycles during power transfer may affect the stability of the power transfer, resulting in large variations in the rectified voltage output from the rectification circuitry 22. These variations may appear as overshoot and undershoot due to the fact that while the adaptive power receiver 20 is maintained in a high-Q mode, the induced voltage across the rectification circuitry may be greatly reduced. Additional bulk capacitance and power conditioning circuitry may be used to minimize this undershoot and overshoot so that power delivered to the load 30 is substantially stabilized. However, the present invention may achieve stability without such additional circuitry or additional bulk capacitance by cycling between the high-Q mode and the low-Q mode.

In one embodiment, switching between high-Q and low-Q modes may be performed on a cycle-by-cycle basis and according to a specified duty cycle. That is, the switching may be aligned with the cycles of the power being received in the adaptive power receiver 20 so that for each period of the power waveform, the adaptive power receiver 20 is configured in a high-Q mode for a portion of that period. By switching between modes on a cycle-by-cycle basis for a certain duty cycle, it may be possible to reduce the duration of time for which the voltage across the rectification circuitry 22 is allowed to drop. This means that the bulk capacitance on the output of the rectification circuitry 22 may be decreased, thereby reducing the overall size and cost of the remote device 14.

Figure 17:
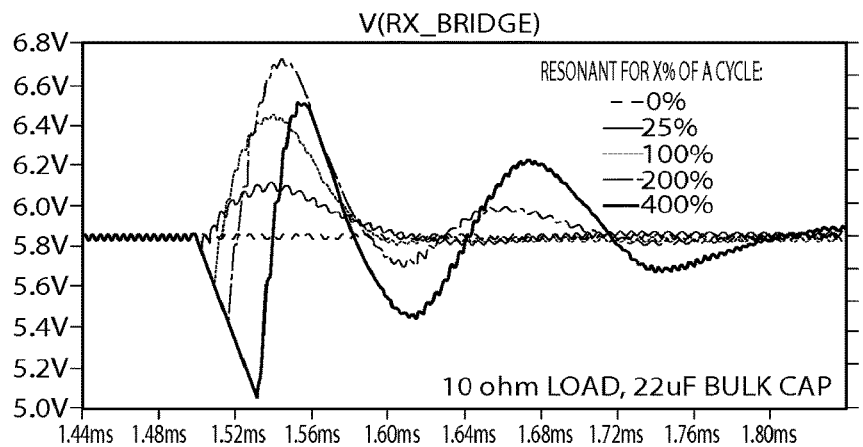
FIG. 17 shows a graph of bridge voltage after switching the Q-control FETs for various percentages of a power receiving cycle.

The drop in voltage that may result from leaving the adaptive power receiver 20 in a high-Q mode for a variety of different durations is shown, for example, in FIG. 17 in which various duty cycles of single cycle switching are depicted. The adaptive power receiver 20 is configured in a high-Q mode for a range of duty cycles, from 25% of a single cycle to 400% of a single cycle (4 total cycles). As shown, there is a non-linear relationship between (a) the time (or duty cycle) the adaptive power receiver 20 is kept in a high-Q mode and (b) the amount of voltage increase achieved after reconnecting the adaptive power receiver 20 to the load. Several factors may be affected by a change in duty cycle, including for example, peak voltage, minimum voltage, and ripple or settling time. As shown, the peak voltage increases as the duty cycle is increased, but the voltage drop as the adaptive power receiver transitions to a high-Q mode is also increased, along with the settling time of the resulting waveform. This voltage drop explains why a larger bulk capacitor may be used to maintain stability when high-Q mode is held for multiple power receive cycles.

In the current embodiment, the method for switching to high-Q mode is performed on a cycle-by-cycle basis, where a high-Q mode transition occurs as the current in the adaptive power receiver 20 approaches zero, such as when the current switches directions within the secondary 62. These zero crossing transitions may be detected, for example, by the one or more sensors 32, 34 coupled to the controller 28. Output from one or more of these sensors 32, 34 may be fed to a comparator to detect a zero crossing of the coil current.

Figure 50:
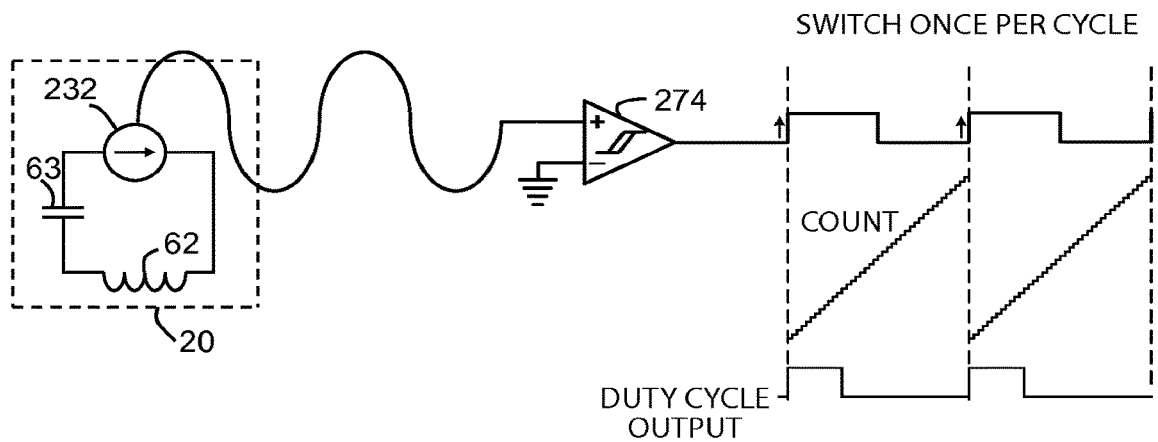
FIG. 50 shows one embodiment of a zero-cross detection method for a single switch per power receiving cycle adaptive resonance control.

As shown in FIG. 50, one embodiment of the present invention includes a current sensor 232 similar to the sensor 32 described with respect to FIG. 4. Output from the current sensor 232 is converted to a voltage representative of the current in the adaptive power receiver 20, which in turn is provided to a comparator 274. The point at which the current in the adaptive power receiver 20 is approximately zero may produce a near zero volt signal to the comparator 274. This signal is then compared to a reference signal, in this case ground. By comparing the signal to ground, the comparator 274 switches its output from low to high in response to the current transitioning from negative to positive, switches in reverse, high to low, in response to the current transitioning from positive to negative. If the voltage representative of the current is biased in any direction—that is, if when the current is zero, the voltage is not zero—this bias may be used as the reference voltage for the comparator 274.

The output of the comparator 274 may be provided to the controller 28. In the embodiment described with respect to FIG. 4, a rising edge signal may trigger the controller 28 to take two actions: to transition to a high-Q mode by closing the switches 64a-b, and to start a counter. The controller may then compare the value of the counter to a predetermined count value, and once the value is reached, the switches are opened, thereby transitioning to a low-Q mode. The controller may then wait for the next rising edge to restart the process.

To determine the counter value at which to transition from a high-Q mode to a low-Q mode, the controller 28 may obtain output from the sensor 232 to measure the power transfer signal over several cycles. This measurement may be used to determine the frequency of the power transfer signal. The controller 28 may then calculate the counter value using the formula shown:

$$\frac{D}{f} \times cs = counts$$

The controller 28 may divide the desired duty cycle (D) of the high to low Q transition by the frequency (f) of the power transfer signal, and then multiply the resulting value by the speed of the counter in counts per second (cs), resulting in the number of counts.

Figure 51:
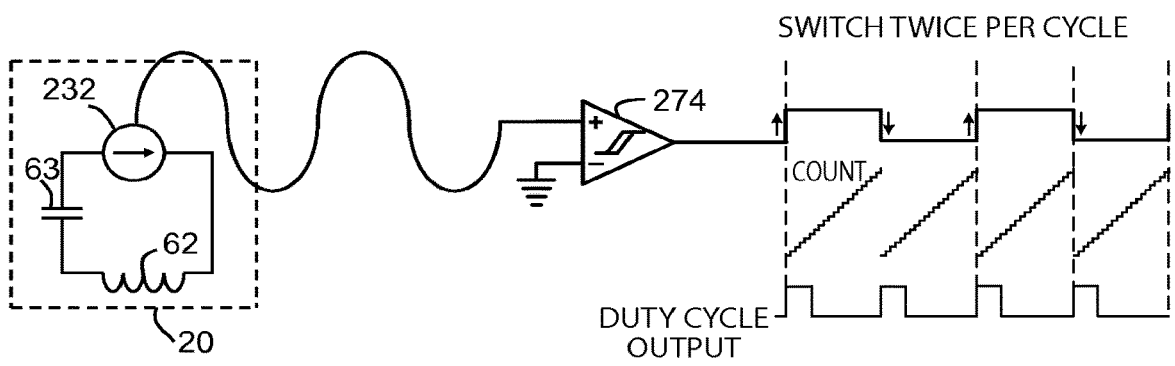
FIG. 51 shows one embodiment of a zero-cross detection method for a double switch per power receiving cycle adaptive resonance control.

In alternative embodiments in which the remote device 14 uses a twice-per-cycle switching methodology, the controller 28 may determine the counts differently. This is shown, for example, in FIG. 51, where the controller restarts the counter for both the rising and falling edge of the current, and is reflected in the following formula:

$$\frac{D}{2f} \times cs = counts$$

While the current embodiment may implement this construction and method of zero crossing detection, it should be understood that the present invention is not limited to this configuration. Other types of zero cross circuits may be coupled to the controller 28. Additionally, analog circuits based off of threshold voltages or currents, FPGAs, DSPs, or any other type of controlling circuitry may be used to determine the pulse width and high to low Q transition.

Figure 15:
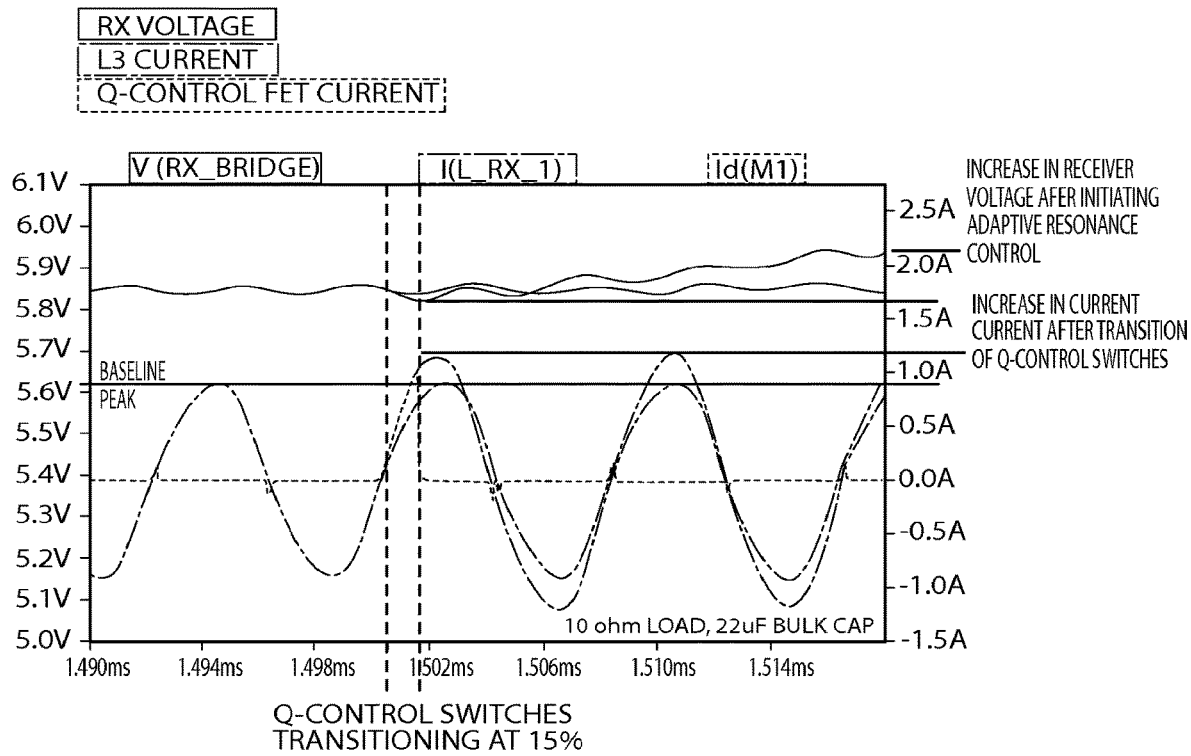
FIG. 15 shows a graph of Rx voltage, L3 current, and Q-control field effect transistor (FET) current in one embodiment.
Figure 48:
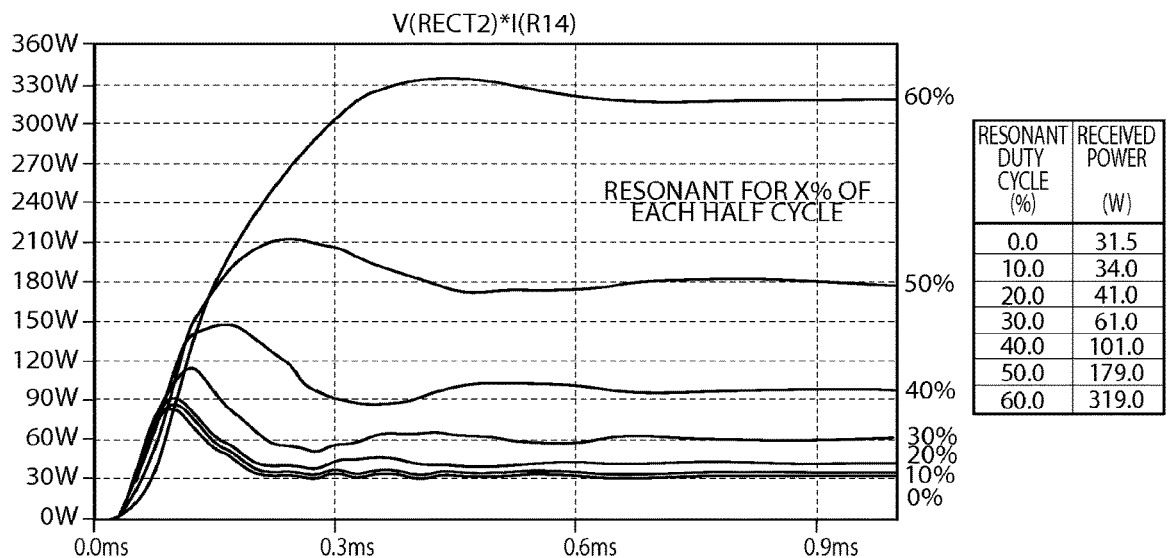
FIG. 48 shows one embodiment where 60% duty cycle produces higher output power than 50% duty cycle.
Figure 49:
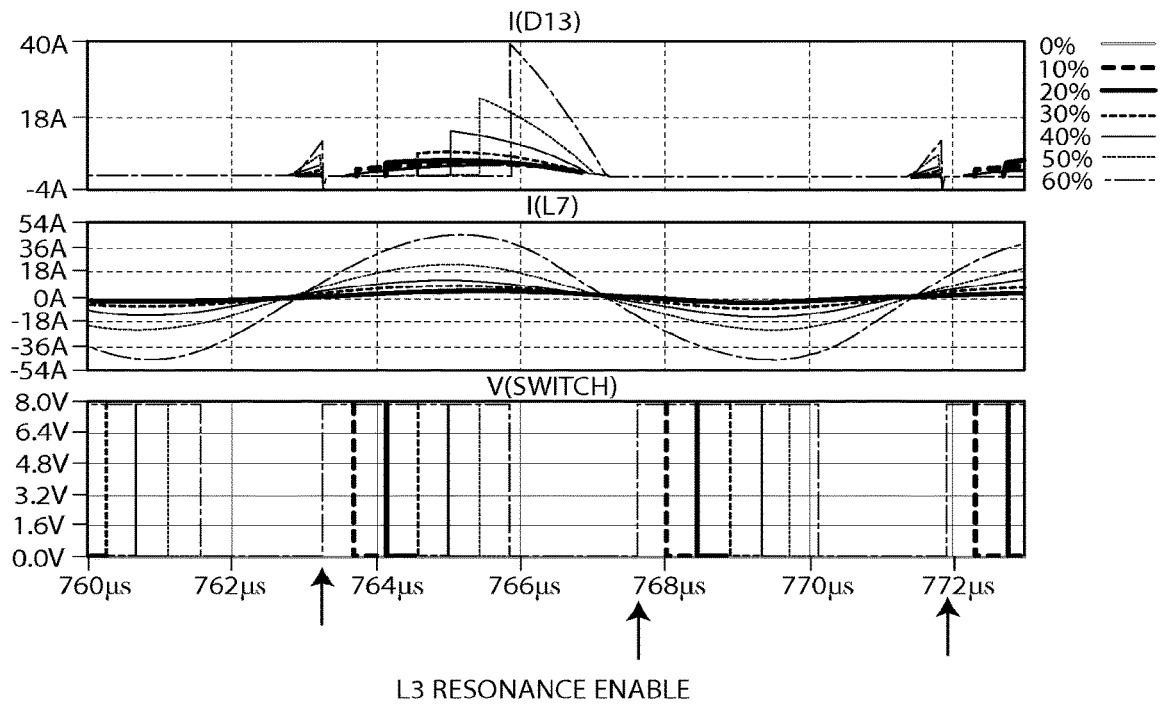
FIG. 49 shows graphs of waveforms corresponding to the FIG. 48 embodiment.

Returning to the current embodiment, when high-Q mode transition occurs at the zero-cross of the current waveform, the rising slope of the current may increase, resulting in a higher peak value of current, and increasing the overall RMS value of the current. This can be seen, for example, in FIG. 15 which depicts a comparison between (a) a baseline system not controlling Q and (b) a system with adaptive resonance control at a 15% duty cycle in accordance with one embodiment. In FIG. 15, when compared against the baseline system, the transition to high-Q mode increases the rising slope of the current cycle, increasing both the peak and RMS value of the waveform. As the duty cycle of the high-Q mode is increased, the RMS value of current continues to increase. However, since the voltage induced across the rectification circuitry 22 goes to zero while the high-Q mode is used, the power delivered while in the high-Q mode is also zero, meaning that, at some point, an increase in duty cycle will no longer increase the amount of power delivered. For the current embodiment using this control methodology, maximum power may be delivered at less than 100% duty cycle. This can be seen, for example, in FIG. 21, where the table on the right shows the power delivered to a fixed load resistance for varying duty cycles. In this example, peak power is achieved at approximately 50% duty cycle. In this case, if the adaptive power receiver 20 requires additional power, the remote device 14 may either request additional power from the transmitter 56 or reduce its power consumption. However, under certain circumstances, such as those in the example shown in FIG. 48, more power can be delivered at 60% duty cycle than at 50% duty cycle. The waveforms of each cycle can be seen in FIG. 49, where it can be seen that the peak current for a 60% duty cycle increases to 40 Å. It can also be seen that the increase in magnitude in L3 current may overcome the corresponding reduction in time that L3 is feeding the rectifier, potentially resulting in more power transferred.

Figure 16:
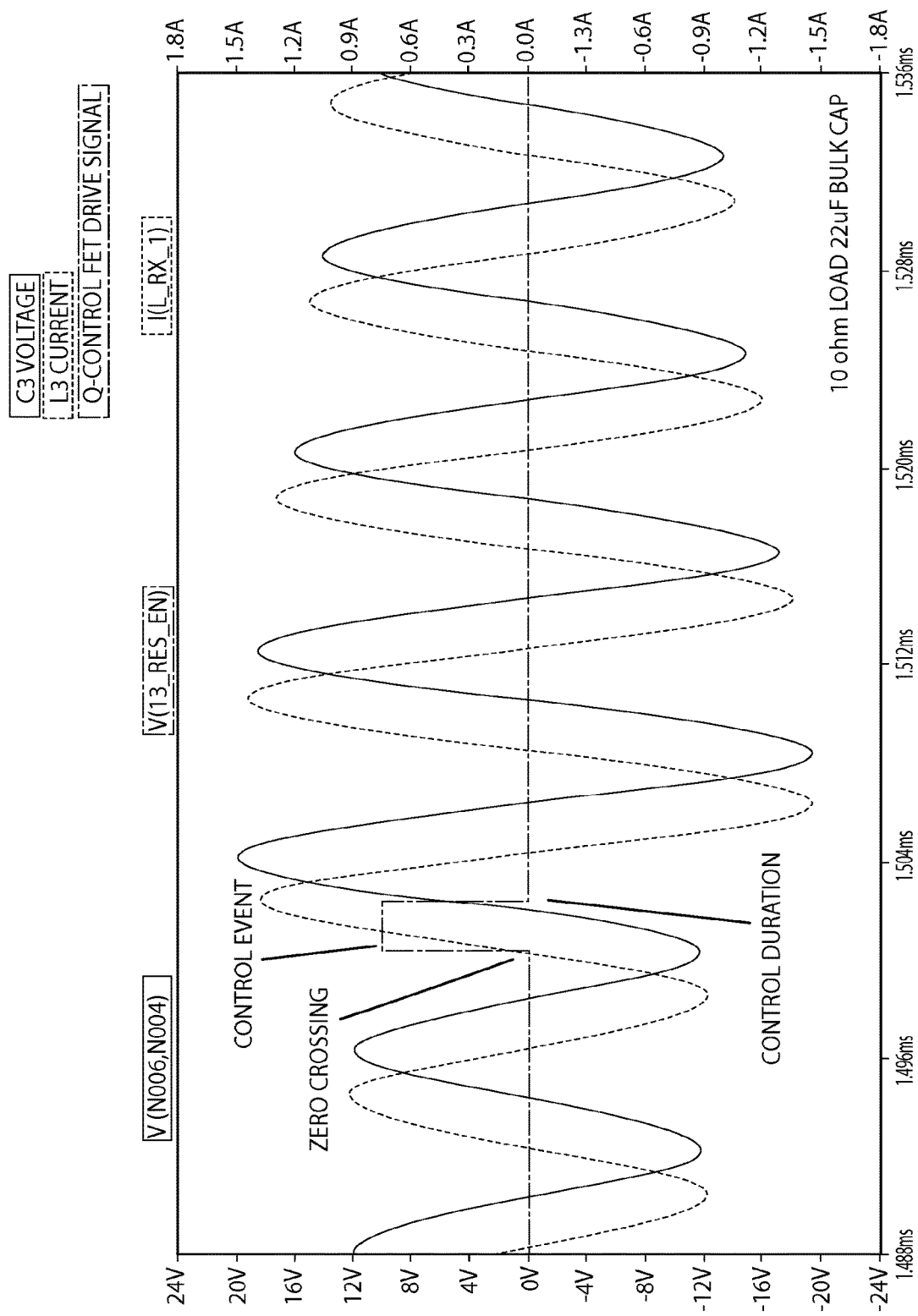
FIG. 16 shows a graph of C3 voltage, L3 current, and the Q-control FET drive signal in one embodiment of a remote device.
Figure 18A:
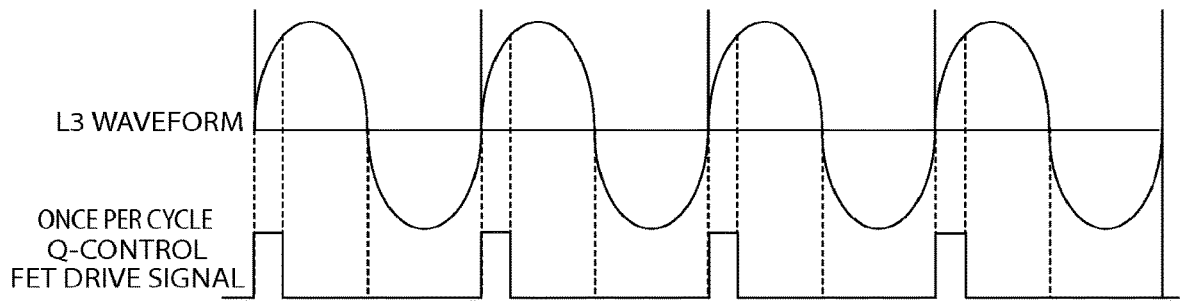
FIG. 18A shows a graph of the L3 waveform where adaptive resonance control is executed once per power receiving cycle.
Figure 18B:
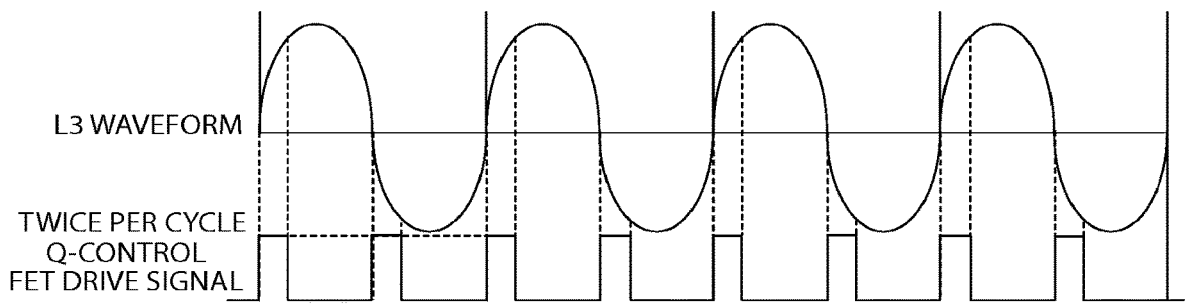
FIG. 18B shows a graph of the L3 waveform where adaptive resonance control is executed twice per power receiving cycle.

FIG. 16 shows the control pulse shorting L3/C3 enabling Q-control which in turn tunes the system and builds the power available within the system. In the depicted embodiment, the Q-control FETS are turned on at the zero crossing of the L3 current. This may allow for greater control since the controller 28 can make smaller changes in the duty cycle of the shunt. For example, by switching the shunt in at zero crossing, the instantaneous currents induced in the switching elements are also reduced, prolonging the lifespan and improving reliability of the switches 64a-b and the remote device 14. FIG. 18A shows the adaptive resonance control sequence and harvesting sequence at once per power receiving cycle while FIG. 18B shows it at twice per cycle. The adaptive resonance control sequence allows the circuit to be designed with lower bulk capacitance, smaller coil sizes and with cheaper components because of lower ripple voltage.

To improve the effectiveness of the high-Q mode transition, the duty cycle of its application may be broken into two portions of each conduction cycle such that high-Q mode begins at both zero-cross points of each waveform. That is, the high-Q mode transition occurs every time the current in the secondary 62 switches direction. Two transition per cycle methodology is shown for example in FIG. 18B, where the overall duty cycle is doubled. It can be seen in FIGS. 20B and 20D that the power may remain nearly the same when switching once per cycle versus twice per cycle. The use of switching twice per cycle, however, may reduce the ripple voltage of the output of the rectification circuitry 22, since the voltage across the rectification circuitry 22 is reduced to zero for shorter periods of time. This may further reduce the need for bulk capacitance on the output of the rectification circuitry 22, further enhancing the reliability and size/cost of the remote device 14.

For purposes of disclosure the wireless power supply system 10 will now be described in connection with wireless power supply 12. It should be understood that the wireless power supply system 10 is not limited to a wireless power supply configured according to the wireless power supply 12 and that a conventional wireless power supply may be used in alternative embodiments. The wireless power supply 12 in the illustrated embodiment of FIG. 4 may be configured to control transmission of power wirelessly to one or more remote devices 14.

The wireless power supply 12 according to the illustrated embodiments of FIG. 4 may include a transmitter 56, a control system 55, a driver 54, a power supply 53, and a mains input 52. The power supply 53 of the current embodiment may be a conventional converter that transforms an AC input (e.g., wall power) from the mains input 52 into an appropriate DC output suitable for driving the transmitter 42. As an alternative, mains input 52 may be a DC source, which the power supply 53 may pass through or transform into an appropriate DC output for driving the transmitter 56. In this embodiment, the power supply 53 is an AC/DC converter generally having a rectifier and a DC/DC converter. The rectifier and DC/DC converter provide the appropriate DC output. The power supply 53 may alternatively include essentially any circuitry capable of transforming input power to a form used by the driver 54. In this embodiment, the control system 55 is configured to adjust operating parameters, including for example rail voltage, to energize the transmitter 56 for power transfer. Alternatively, the power supply 53 may have a fixed rail voltage. The control system 55 may additionally or alternatively have the ability to adjust any other operating parameter, including for example operating frequency of the drive signal, resonant frequency of the tank circuit, switching circuit phase and duty cycle of the drive signal. In an alternative embodiment where it is desirable to adjust operating parameters by varying the rail voltage of the drive signal, the power supply 53 may have a variable output. As shown in FIG. 4, the control system 55 may be coupled to the power supply 53 to allow the control system 55 to control the output of the power supply 53.

In this embodiment, the driver 54 includes switching circuitry that is configured to generate and apply an input signal to the transmitter 56. The driver 54 may form an inverter that transforms the DC output from the power supply 53 into an AC output to drive the transmitter 56. The driver 54 may vary from application to application. For example, the driver 54 may include a plurality of switches, such as MOSFETs or other switching circuitry, such as BJTs or IGBTs, arranged in a half-bridge topology or in a full-bridge topology.

In this embodiment, the transmitter 56 includes a primary 44 and a resonant capacitor 42 to form a tank circuit arranged in a series configuration. The present invention is not limited to use with series resonant tank circuits and may instead be used with other types of resonant tank circuits and even with non-resonant tank circuits, such as a simple inductor without matching capacitance, or parallel resonant tank circuits. And, although the illustrated embodiment includes coils, the wireless power supply 10 may include alternative inductors or transmitters capable of generating a suitable electromagnetic field. The transmitter 56 in the illustrated embodiment also includes a resonator circuit 46 having a resonator coil (or inductor) 47 and a resonator capacitor 48, enabling the primary 44 to transmit power in conjunction with the resonator circuit 46. In alternative embodiments, the resonator circuit 46 may be absent so that the primary 44 transmits wireless power with the aid of a resonator circuit 46.

The wireless power supply 12 may also include a sensor 57 capable of sensing a characteristic of power in the primary 44. For example, the sensor 57 may be a current sensor that provides information to the control system 55, which may adjust operating parameters based on the sensed information. Other characteristics of power capable of being sensed include, but are not limited to, real power, apparent power, phase, and voltage.

The control system 55 includes portions configured, among other things, to operate the driver 54 to produce the desired power supply signal to the transmitter 56. For example, the control system 55 may control the driver 54 or adjust operating parameters based on communications received from the remote device 14. Alternatively or in addition to control based on communications, the control system 55 may adjust operating parameters based on a characteristic of power sensed in the sensor 57. The present invention may be implemented using essentially any systems and methods capable of transferring wireless power. Suitable wireless power transfer systems and various alternatives are described in U.S. Pat. No. 7,212,414, which is entitled ADAPTIVE INDUCTIVE POWER SUPPLY, and was issued May 1, 2007, to Baarman; and in U.S. Pat. No. 7,522,878, which is entitled ADAPTIVE INDUCTIVE POWER SUPPLY WITH COMMUNICATION, and was issued Apr. 21, 2009, to Baarman—all of which are incorporated herein by reference in their entirety.

Figure 8:
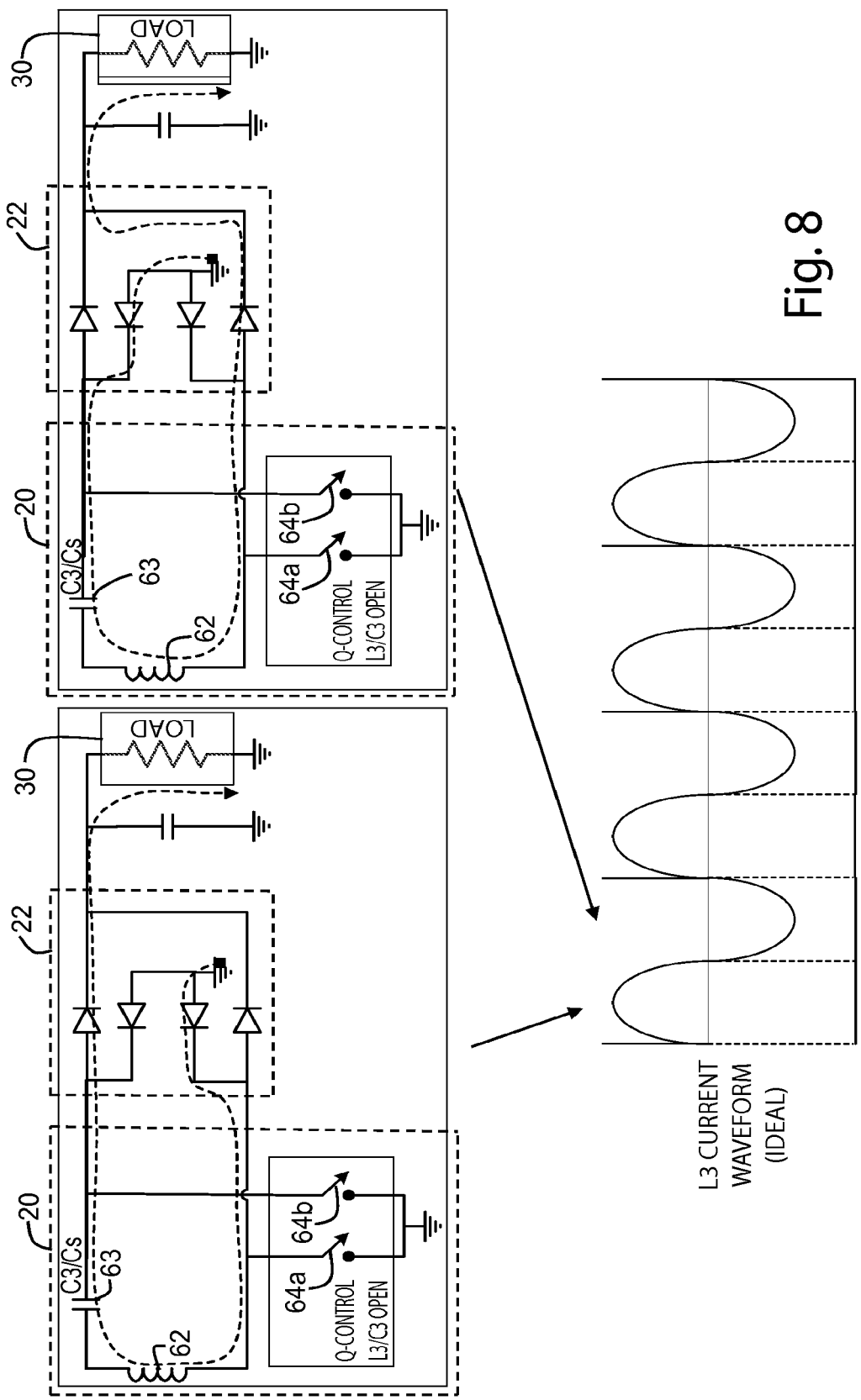
FIG. 8 shows the current path when receiving power and adaptive resonance is not enabled.
Figure 21:
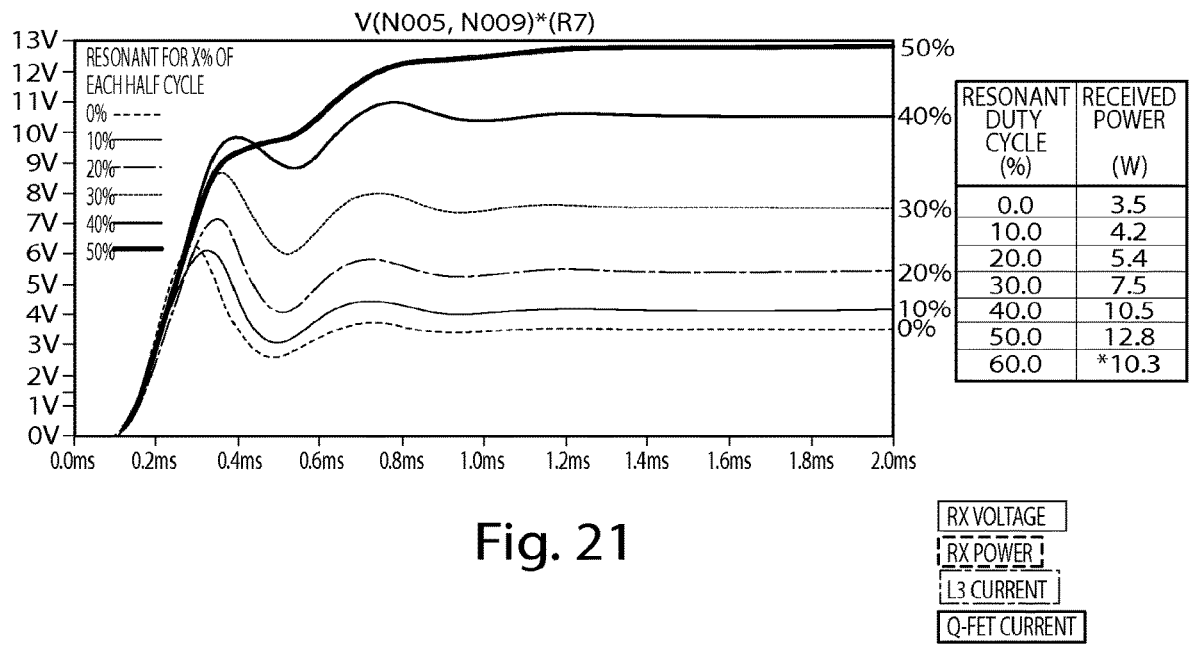
FIG. 21 shows a graph of output power resulting from varying the duty cycle of the Q-control FET drive signal.

FIG. 8 shows how an adaptive power receiver can be operated when the adaptive resonance control is not enabled or at initialization. Essentially, the adaptive power receiver operates in the same way as a conventional wireless power transfer receiver. L3/C3 are in series with the Rx load/control circuitry. Although L4 is not illustrated, in embodiments that include a supplemental receiver, it may also contribute some energy if it is present. In many of the control algorithms associated with the present invention, an initialization phase may be included where the adaptive resonance control is disabled. FIG. 21 shows the difference in available power as adaptive resonance control is enabled.

Figure 10:
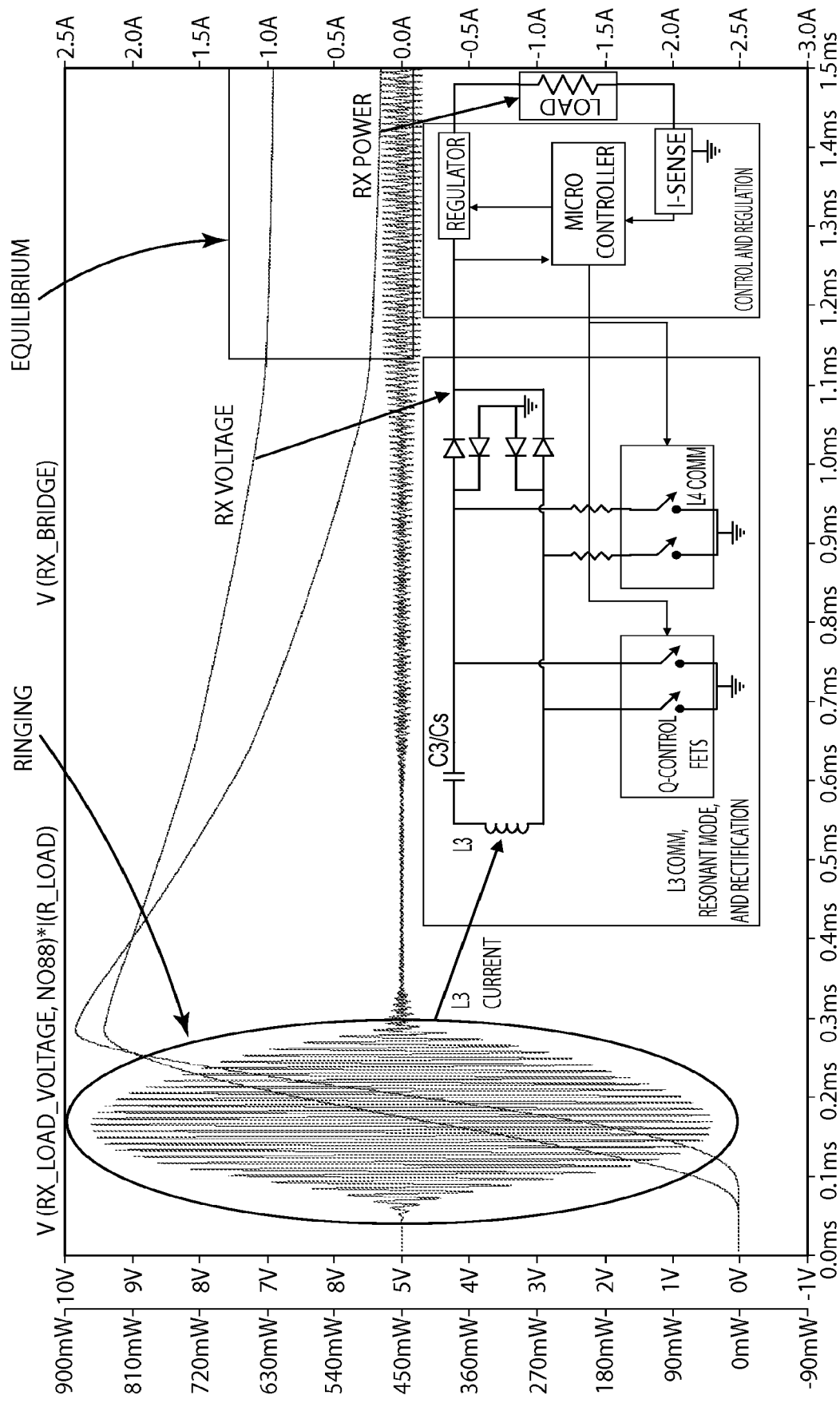
FIG. 10 shows an example start-up sequence for a remote device with an adaptive receiver.

FIG. 10 shows an initialization or start-up sequence for an Adaptive Resonance system. The initialization sequence can have a delay before the system stabilizes. This initial characterization and monitoring of the field can be used for foreign object detection, identification and determining/communicating power requirements of the device to the wireless power supply.

FIG. 10 shows the adaptive receiver current, output voltage, and output power during one embodiment of an initialization phase for an adaptive receiver placed on a loosely coupled transmitter. In the initialization phase, the Q-control FETs are both open. Since the initial rectified voltage is zero, the current induced in the receiver charges up the bulk capacitance, which acts as a low impedance element while charging. The circuitry coupled to the bulk capacitor is a high impedance so that it does not drain the voltage being stored in the bulk capacitor. As the bulk capacitor becomes charged, the resulting impedance of the capacitor increases, reducing the current induced until it nearly approaches zero. This period of rapid charging occurs in a very short period of time, after which the microcontroller is able to startup and use the energy stored in the capacitor to initialize the receiver. During this period the current may ring-up, indicating the system may be underdamped to start. As this current nears zero, the voltage stored in the bulk capacitor begins to drain into the receiver, even though the load may be of high impedance. As this voltage reduces, the current in the coil begins to increase again, eventually reaching a steady state mode (around 1.5 ms after start-up in the depicted embodiment) where the voltage on the output of the capacitor and the current in the coil are in equilibrium. At this point, the adaptive receiver may begin to control the Q-control FETS to control power. This initialization phase may be unnecessary or less involved where there is a power storage element on the remote device for powering the microprocessor.

Once the microcontroller powers up, it determines the type of transmitter it is being placed on, determines whether to communicate back to the transmitter, apply the adaptive resonance control to vary the power received, do other initialization steps, or any combination of said initialization steps. Typically, the rectified voltage has reached equilibrium by the time the microcontroller is powered up, however the microcontroller may wait to take any actions until the receiver has settled into its steady state mode.

Figure 11:
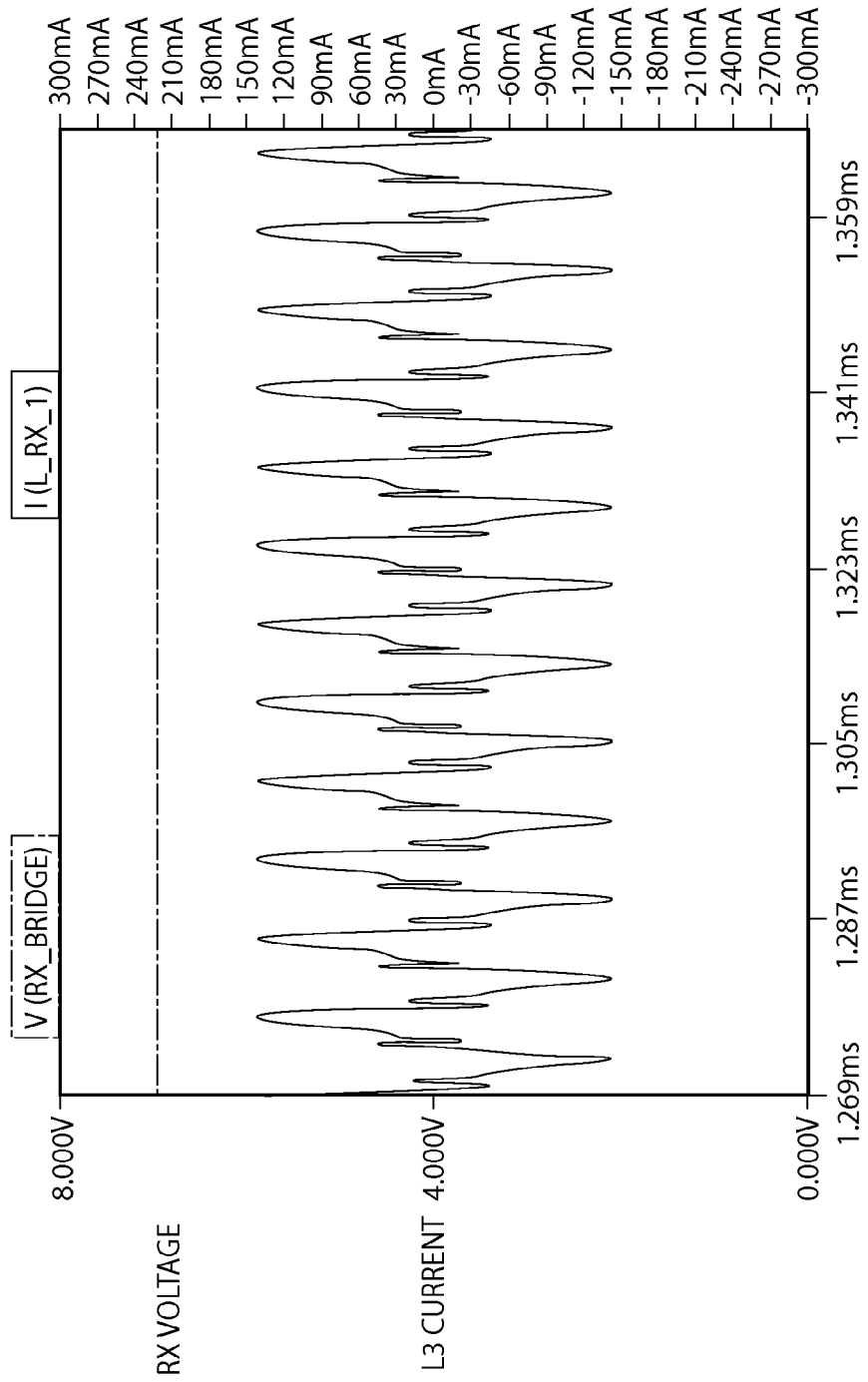
FIG. 11 shows an example of current and voltage at steady state after the start-up sequence.

FIG. 11 shows a higher resolution of the steady state portion of the initialization waveform. The steady state Rx voltage is sufficient to initialize the microprocessor to wake up and communicate the ID and power data (i.e., power requirements or power measurements). In the depicted embodiment, the field is coupled from L1 and L2 initially (without L3/C3 electrically decoupled from the load), the circuit is designed to generate about 7V on the Rx bridge with a 100 ohm load, and the field strength is sufficient to enable the controller and control the Q-Control FETs and start digital communications.

Figure 9:
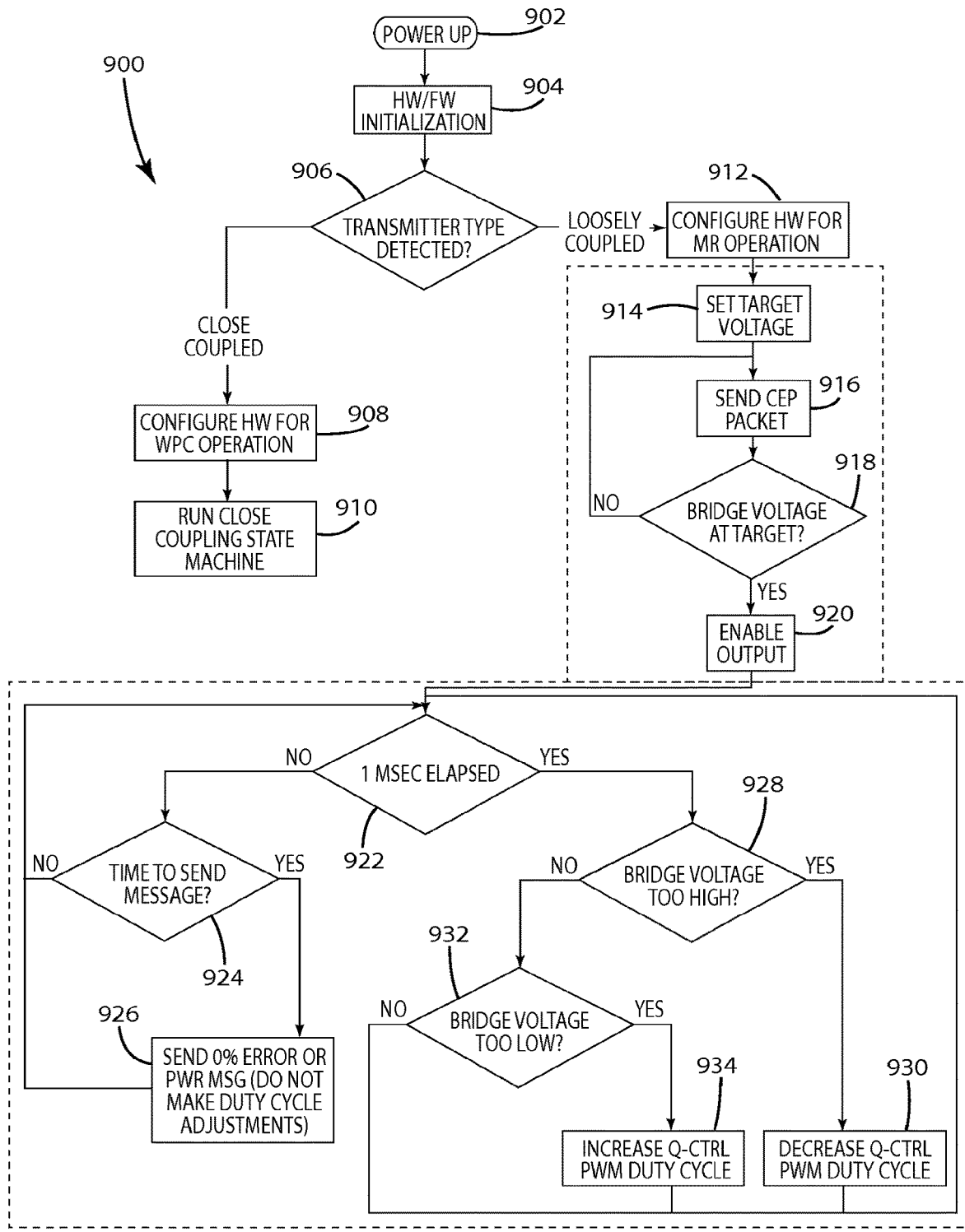
FIG. 9 shows a flow chart of one embodiment of wireless power transfer operation using an adaptive receiver.

FIG. 9 shows one embodiment of a flow chart of an adaptive resonance control algorithm 900 for a wireless power system with an adaptive power receiver. The illustrated embodiment can account for multiple devices coupled to a single transmitter since each receiver is able to adjust the power received if a transmitter is trying to power two remote devices with dissimilar power requirements. The flow chart includes a microcontroller startup sequence for a remote device with an adaptive power receiver. Step 902. Once the microcontroller turns on and the hardware and firmware have been initialized, it determines the type of transmitter that has been placed by detecting a change in the power transfer frequency. Steps 904, 906. This can be accomplished a number of different ways. For example, the wireless power supply and the remote device may communicate. Alternatively, the remote device may determine the type of wireless transmitter by looking for a predetermined signature in the power signal that is indicative of the type of wireless transmitter. The signature may be inherent in the type of wireless power supply (passive identification), or alternatively the signature may be purposely included in the drive signal (active identification) for the purpose of allowing remote devices to identify the wireless power supply.

In one embodiment, the wireless power supply changes the drive signal operating frequency in order to indicate that the transmitter is a loosely coupled transmitter. If no change is detected, the receiver assumes the transmitter is a tightly coupled transmitter and adapts its control methodology to fit the tightly coupled mode, for example by configuring the hardware in the remote device to the wireless power consortium standard or some other standard. Steps 908, 910.

If the receiver detects that it has been placed on a loosely coupled transmitter, it configures the device to receiver power via a loosely coupled configuration. Step 912. It then selects a target rectified voltage and communicates to the transmitter to vary the power being delivered until the target voltage has been reached. This communication may use a control error packet, or CEP, to communicate the target power or voltage needs. Steps 914, 916, 918. Once reached, the receiver connects the load to the rectifier by enabling the output and then measures the new rectified voltage. Step 920. For example, as shown in FIG. 7, the regulator can enable to provide output to the load. Alternatively, some embodiments may have the regulator replaced by a switch, or eliminated altogether. Where there is no regulator or switch, an unswitched connection between the rectifier and the load may be maintained. Steps 914, 916, 918, and 920 may be described as the initial regulation phase that in some embodiments may allow the wireless transmitter to set its rail voltage for 0-5 W transmission (or a higher or lower power range) at a variety of wireless receiver locations. The wireless transmitter in this initial regulation phase may assume a various factors such as the transmitter coil configuration, transmitter ping voltage, and that the wireless receiver has not moved before the initial regulation phase has completed.

The receiver waits to send a power control message for a specified period of time. Steps 922, 924, 926. The power control message can be used in connection with a variety of different adaptive power control algorithms. For example, the power control message can be sent to the wireless power supply in order to allow the wireless power supply to adjust its wireless power output. The timing between messages may be sufficient to allow the system to implement a receiver side adaptive resonance control before requesting adjustments from the wireless power supply. Once a change in supplied power is requested, the receiver can wait to vary its adaptive resonance control until after the transmitter has changed its power output in response to the receiver request. Step 922.

If the period of time to send a power control message has elapsed, the receiver can send a power control message. Steps 924, 926. In one embodiment, the microcontroller sends any changes desired, the current amount of power being received, and the current state of the adaptive resonance control. The transmitter then can calculate a new target for the power being transmitted and adjusts the power.

The remote device may utilize adaptive resonance control of the adaptive power receiver to attempt to achieve or maintain a target voltage or voltage range. That is, in the current embodiment, every millisecond a sensor reads the bridge voltage and compares it to a minimum threshold and a maximum threshold. Step 928. If the bridge voltage is above the maximum threshold, then the controller decreases the duty cycle of the signal controlling the Q-control FETs. Step 930. This can be done with pulse width modulation of the control signal. If the bridge voltage is below the minimum threshold, then the controller increases the duty cycle of the signal controlling the Q-control FETs. Steps 932, 934. This can be done with pulse width modulation of the control signal. These steps may be described as the Q-control regulation phase in which control of the Q-control FETs, such as by adjusting duty cycle, enables control over the receiver bridge voltage. In one embodiment, the duty cycle of the Q-control FETs may be in the range of 0-50%, and duty cycle changes may not be permitted while the wireless receiver or the wireless transmitter are communicating.

The adaptive resonance algorithm may include additional steps. For example, the controller may be programmed to control the power using a different technique if the bridge voltage is outside the thresholds, but the duty cycle is either too high or too low. For example, if the bridge voltage is too low, and increasing the duty cycle of the Q-control FETs does not increase the bridge voltage, then the system may pass control to a different state machine. For example, the controller may send a message to the wireless power transmitter to indicate that there is not enough power. Alternatively, the remote device may communicate with a power management circuit on the remote device to indicate that there is not enough power available and that power consumption should be reduced.

If multiple receivers are placed on the loosely coupled transmitter, the transmitter and receivers adjust their adaptive resonance control to allow each device to receive power. This method is described in U.S. Application No. 61/649,561 entitled "System and Method for Communication in Wireless Power Supply Systems" to Taylor et al, which is herein incorporated by reference in its entirety. Suffice it to say, the controller in each remote device can implement the algorithm illustrated in FIG. 10 or some variation thereof in order to dynamically adjust its individual bridge voltage by changing the duty cycle of its Q-control FETs. The algorithms that change the duty cycles of the Q-control FETs of each of the remote devices can be independent of one another. However, the algorithms may affect one another because the bridge voltage in one remote device may change as the duty cycle of the Q-control FETs control signal changes in the other remote device. The algorithm described in connection with FIG. 10 can handle this interaction.

In one alternative embodiment, the algorithm for controlling the Q-control FETs based on the bridge voltage may include reconfiguring between switching the Q-control FETs once per cycle of power waveform or twice per cycle of power waveform. Switching once per cycle and switching twice per cycle even where the total duty cycle and the operating frequency are the same for each can result in different effects on the output bridge voltage. In some circumstances, it may be desired to switch once per cycle and in other situations it may be desirable to switch twice per cycle. For example, FIGS. 20A and 20B illustrate that switching once per cycle at 50% duty cycle per half cycle provides about 8V at the bridge. FIGS. 20C and 20D in contrast illustrate that switching twice per cycle at 25% duty cycle per half cycle provides about 7.25V, but has a more stable signal. That is, there is less overshoot and undershoot before reaching the steady state bridge voltage in when the Q-control FETs are switched twice per cycle at both zero crossings as opposed to switching once per cycle at one of the zero crossings. This difference can be used in the adaptive resonance control algorithm. In some circumstances, more power for the duty cycle may be appropriate. In other circumstances, less power with more stability may be appropriate. Additionally, in the depicted embodiment, the recirculating current of the receiver becomes more balanced between the positive and negative periods when using a dual switch per cycle control algorithm, resulting in lower overall current. This means that the overall efficiency of the dual switch power cycle control algorithm may be more efficient.

Backscatter modulation is one way to enable communication between an inductive power supply and a remote device. Backscatter modulation can be implemented by connecting and disconnecting a circuit element to the power receiving or power transmitting element.

Figure 25:
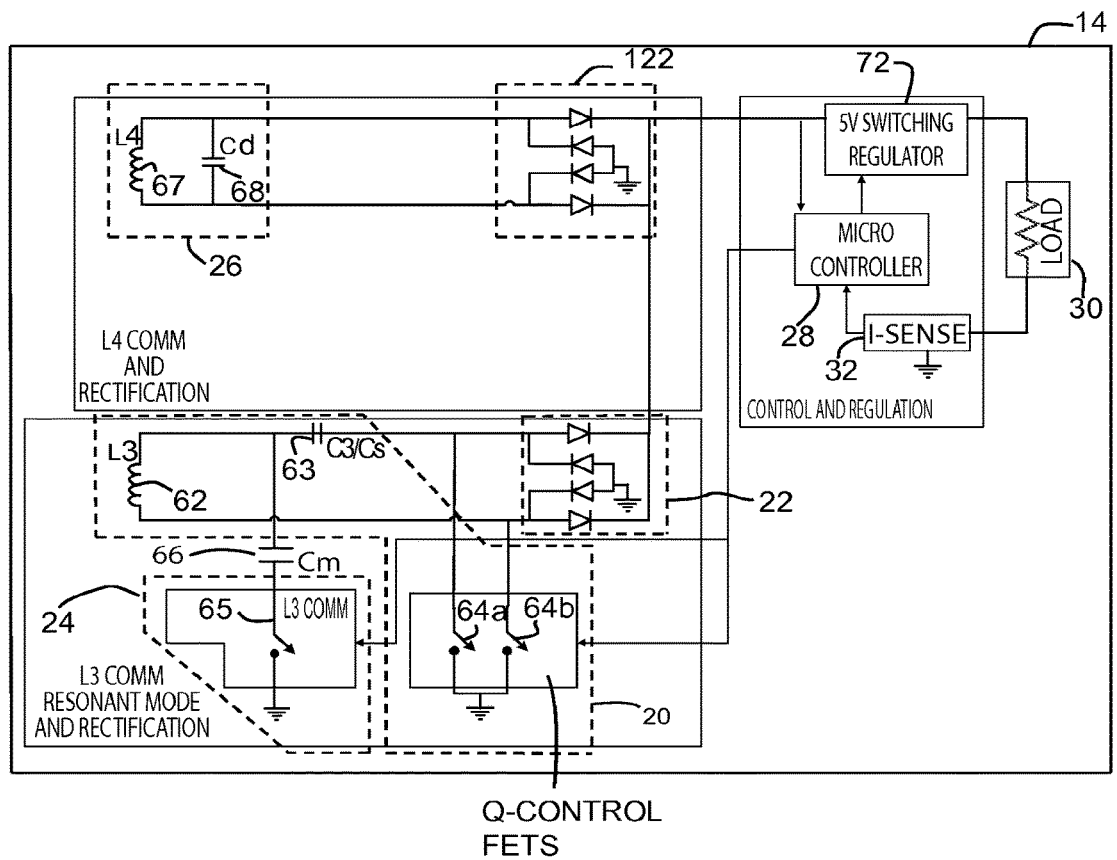
FIG. 25 shows a schematic of a remote device with an adaptive receiver, a supplemental receiver, and a communication element.
Figure 26:
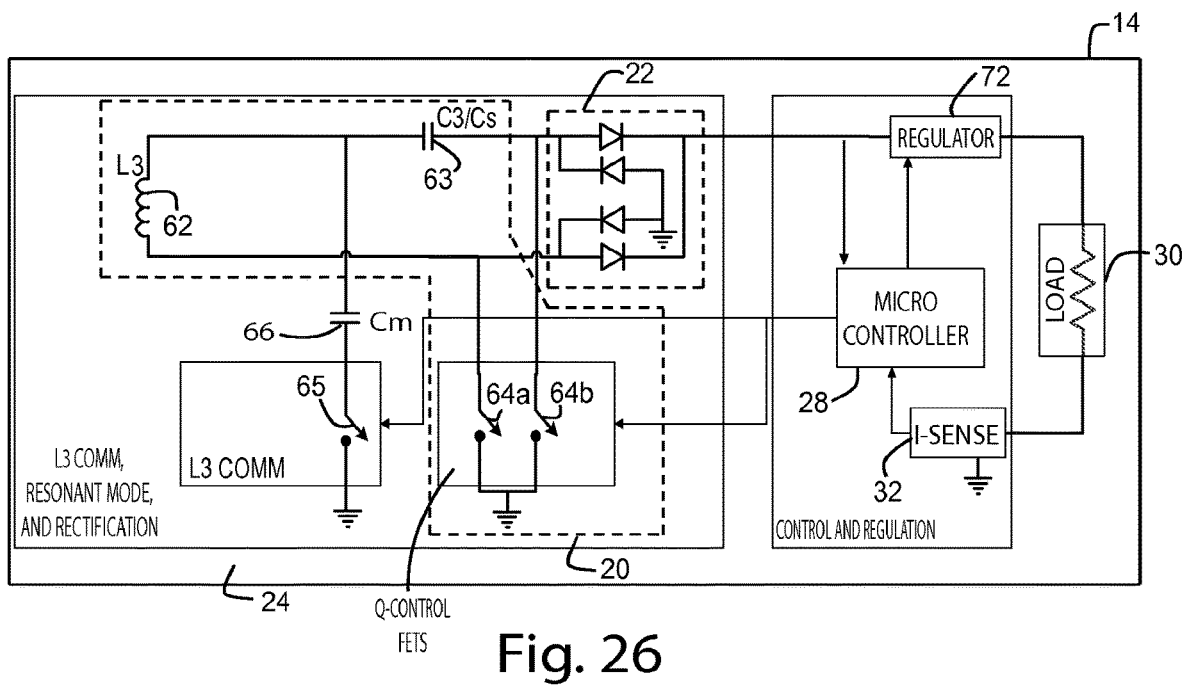
FIG. 26 shows a schematic of a remote device with an adaptive receiver capable of communication.

Referring to FIGS. 25 and 26, a communication capacitor can be systematically connected to and disconnected from a secondary receiving element using a communication switch to vary the resonant frequency of the receiver. This shift in resonant frequency can be detected by the transmitter 56 as a shift in impedance. The illustrated embodiments allow backscatter modulation for both resonant and non-resonant modes of operation.

FIG. 25 shows a circuit configuration where resonant node modulation can enhance communication with a receiver containing both L3 and L4 coils. FIG. 26 shows a circuit configuration where resonant node modulation can enhance communication with a receiver containing an L3 coil. The communication capacitor and communication switch are implemented in the adaptive power receiver 20. In alternative embodiments, the communication capacitor and communication switch may be implemented in the supplemental receiver 26. Further, in alternative embodiments, a communication capacitor and communication switch may be implemented in an isolated communication circuitry separate from the power transfer circuitry.

In one embodiment, the communication switch 65a-b is configured to be closed when there is no communication. When there is communication, the switch is systematically opened and closed to communicate. When the switch is opened, the voltage at the rectifier rises due to the shift in resonant frequency to implement the communication. This configuration allows the receiver to continue powering the load normally and avoid a voltage dip during communication, potentially causing a temporary loss of power to the load. Since the voltage seen at the rectifier rises during communication, the target rectified voltage can be lowered, increasing the efficiency of the DC/DC converter.

The resonant frequency of the receiver can be influenced by the communication capacitor. In some embodiments, the receiver may determine that the shift in rectified voltage is unacceptable, and compensate for the shift in resonant frequency by using the adaptive resonance control algorithm to maintain a constant rectified voltage. In certain circumstances, this dual shift in impedance may mask the communication signal in the transmitter. It may in some applications be desirable to adjust for the dual shift in some embodiments.

In an alternative embodiment, the adaptive power receiver 20 may use the Q-control FETs 64a-b instead of a modulating element to shift the impedance and produce a communication signal. The illustrated embodiments allow backscatter modulation for both resonant and non-resonant modes of operation.

Figure 27:
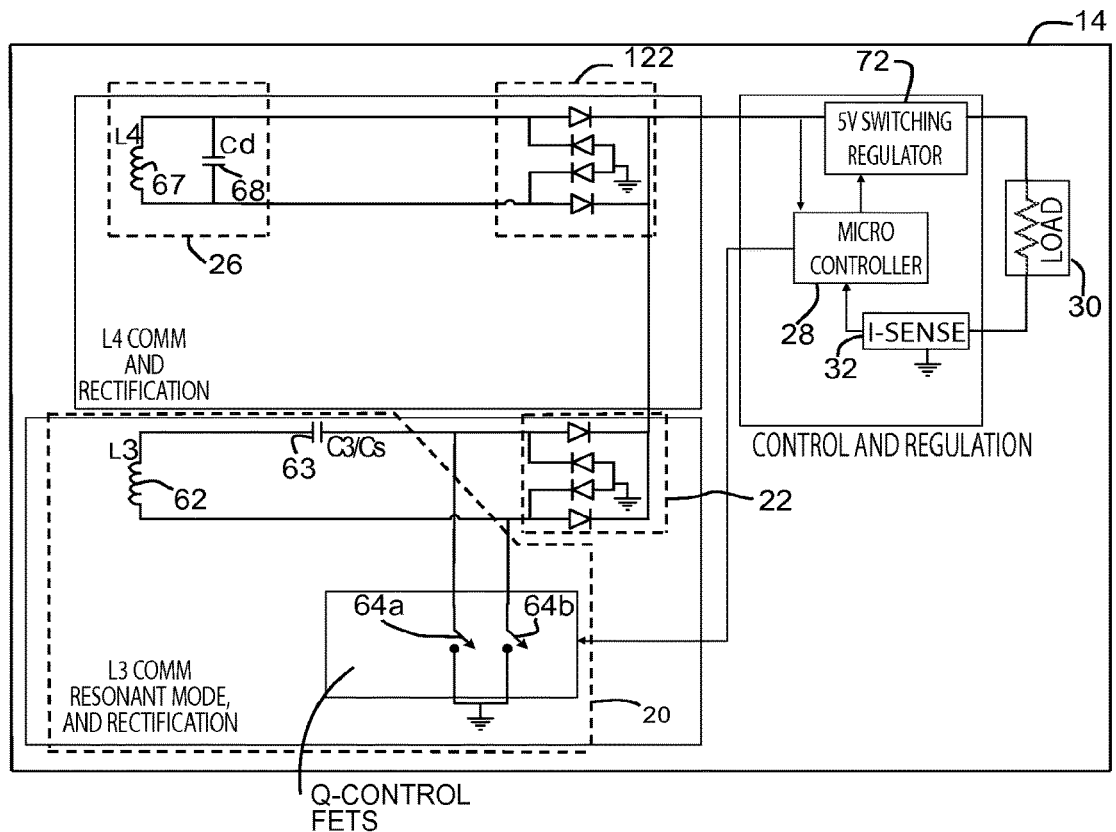
FIG. 27 shows a remote device schematic with an adaptive receiver and a supplemental receiver, where the adaptive receiver Q-control FETs can be used for communication.
Figure 28:
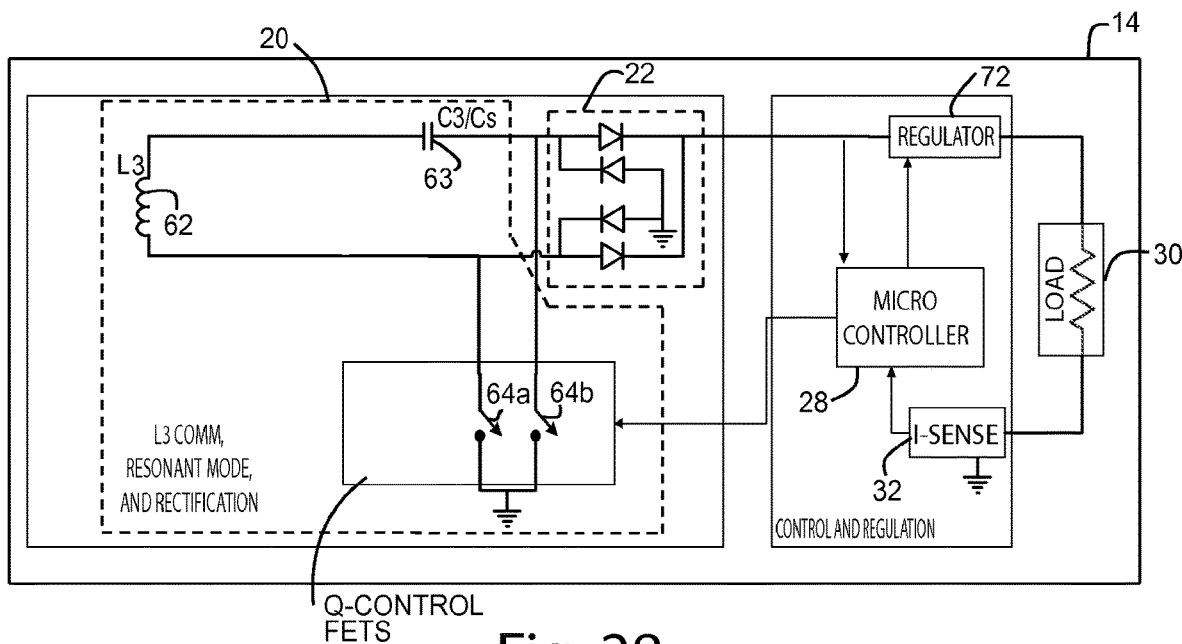
FIG. 28 shows a remote device schematic with an adaptive receiver where the adaptive receiver Q-control FETs can be used for communication.
Figure 29:
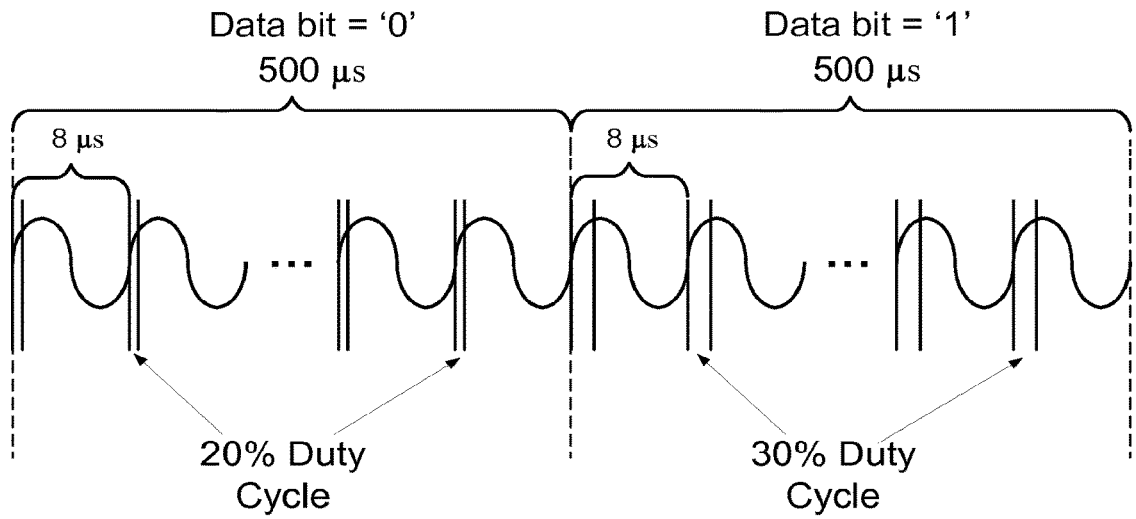
FIG. 29 shows a graph of two bits in one embodiment of a Q-control communication signal

Referring to FIGS. 27 and 28, an adjustment in the duty cycle of the signal controlling the Q-control FETs 64a-b can cause an impedance shift. Unlike the cycle-by-cycle adaptive resonant operation, effective communication may involve periodic adjustment of the duty cycle after a number of power receive cycles. The shift in impedance caused by the duty cycle change will result in a change in rectified voltage in the receiver sufficient to effectively communicate. An example of such a communication methodology is show in FIG. 29 where bits or bit transitions are represented by a change in duty cycle from 20% to 30%.

In operation, this scheme results in the Q-control FETs 64a-b being driven for power/voltage control and for communication modulation. The transmitter can detect the communication independent of the amount of power being transmitted. In other words, the modulations of the backscatter signal may be generated and detected independent of whether there is a large or small amount of power being transmitted. For example, the relative size of the modulations may be proportional to the amplitude of the carrier signal—in this case, the power transfer signal.

The parallel capacitor Cd is used to form a resonant frequency identification signature. Resonant frequency identification signatures are discussed in detail in U.S. Pat. No. 7,355,150 entitled "Food Preparation System with Inductive Power" to Baarman et al and U.S. Pat. No. 8,097,984 entitled "Inductive Power Supply with Device Identification" to Baarman et al., which are both herein incorporated by reference in their entirety. Suffice it to say, the capacitor Cd is tuned at a different resonant frequency than the power transfer, and has little effect on the overall efficiency. However, the capacitor allows the inductive power supply to identify the remote device without direct communication between the remote device and the inductive power supply. This can be useful in embodiments that do not have capability to communicate. It can also be useful in embodiments that can communicate, but where the communication link is not yet established, is busy, or is otherwise unavailable. For example, the battery in the remote device may be drained delaying communication until the microprocessor has enough energy to control the communication switch.

Backscatter modulation is just one communication technique enabled by adaptive resonance. Adaptive resonance may be utilized in other ways to provide communication. For example, by switching from a twice-per-cycle to a once-per-cycle switching methodology, the receiver may create a phase shift key (PSK) communication topology. A PSK technique is described in U.S. patent application Ser. No. 13/366,605, to Norconk et al., and filed Feb. 6, 2012, which is herein incorporated by reference. More specifically, the receiver may encode communications on the power transmission signal by a using plurality of modulations to represent a single communication bit. Data may be accomplished by modulating at a rate that is a fraction or a multiple of the power transfer frequency. In one embodiment, data may be encoded by varying whether modulation takes place on every even waveform or every odd waveform. And in another embodiment, the data may be encoded by varying the modulation applied to the positive and negative halves of each cycle of the power transmission signal.

Figure 59:
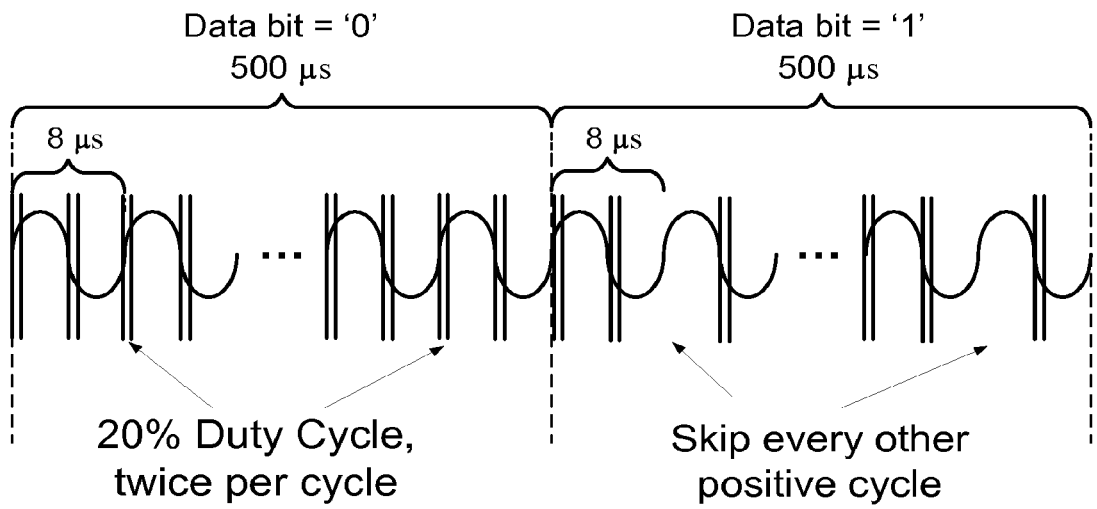
FIG. 59 is a waveform diagram representative of a communication method according to one embodiment of the present invention.
Figure 60:
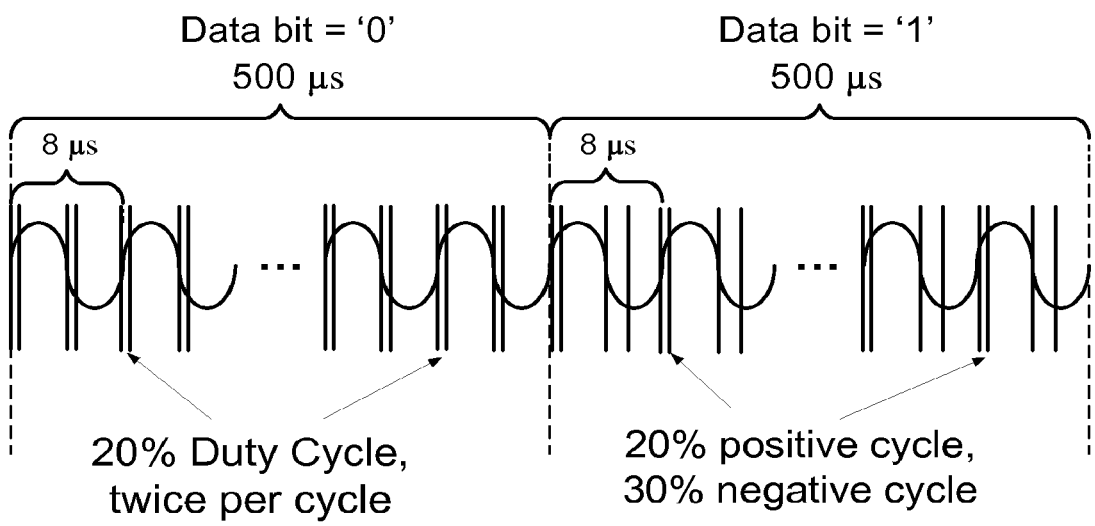
FIG. 60 is a waveform diagram representative of a communication method according to one embodiment of the present invention.

Adaptive resonance PSK communication may be accomplished by switching from a twice-per-cycle to a once-per-cycle switching methodology for multiple cycles to modulate data over the power signal. Alternatively, adaptive resonance PSK can be accomplished by skipping some pulses on either half of each cycle as shown for example in FIG. 59, or by simply adjusting the duty cycle of one half of the waveform versus the other half as shown for example in FIG. 60. Specifically, in a communication method according to FIG. 59, a data 0 bit may be represented by a plurality of modulations at 20%, twice per cycle—during both positive and negative cycles. A data 1 bit may be represented by a plurality of modulations in which every other positive cycle is skipped. In a communication method according to FIG. 60, a data 0 bit may be represented by a plurality of modulations at 20% duty cycle, twice per cycle. But a data 1 bit may be represented by a plurality of modulations in which the duty cycle is 20% during the positive half-cycles and 30% during the negative half-cycles.

Figure 61:
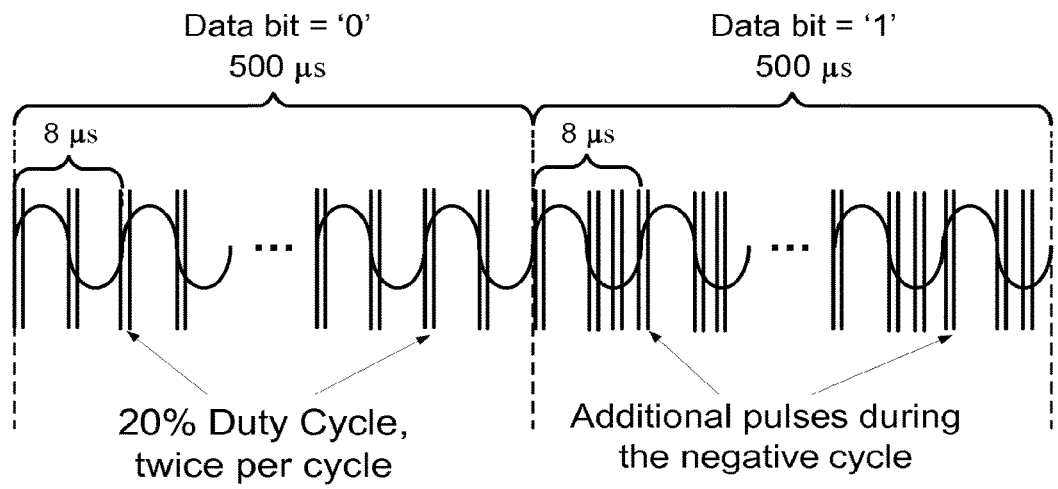
FIG. 61 is a waveform diagram representative of a communication method according to one embodiment of the present invention.

In yet another alternative, adaptive resonance PSK can be accomplished by adding additional pulses to either the positive or negative current waveform in the receiver. For example, as shown in FIG. 61, a data 0 bit may be represented by a plurality of modulations in which there are two pulses, forming a duty cycle of 20% at twice per cycle, and a 1 bit is represented by a plurality of modulations in which there are two pulses during the negative half of the cycle and one during the positive half.

As noted above, adaptive resonance control of the adaptive power receiver can be performed independently by the receiver, without input from a wireless power supply. Alternatively, adaptive resonance control of the adaptive power receiver can be performed based on input from a wireless power supply or according to instructions from the wireless power supply.

Further, adaptive resonance control of the adaptive power receiver can be performed as the sole form of power control in a wireless power supply system or as one form of power control among other types of power control in the overall system. For example, in some embodiments, the wireless power supply outputs a fixed amount of power and each remote device that is present can use adaptive resonance control to control how much power it receives. In another embodiment, the wireless power supply communicates with any remote devices that are present and provides instructions to the remote devices about how to execute the adaptive resonance control. The wireless power supply may collect information from the remote devices in order to determine the adaptive resonance control settings for each of the devices, and instruct each of the remote devices accordingly. The instructions may be based on the total amount of power being supplied by the inductive power supply, the individual remote device power needs, or a combination of the two. In alternative embodiments, the instructions may be based on additional or different factors.

In some embodiments, there are additional types of power control included in the wireless power system. For example, the wireless power system may adapt the amount of power being transmitted based on the needs of the remote devices. This can be done in a variety of different ways, such as adjusting the operating frequency of the inductive power supply, adjusting the resonant frequency of the inductive power supply, adjusting the duty cycle of the inductive power supply, or adjusting any other inductive power supply setting either alone or in combination.

Using the adaptive resonance control, the wireless power transfer system can allow power to be controlled at multiple points. For example, the system may utilize receiver only control where the receiver is responsible for using adaptive resonance control (in addition to or instead of other ways of power control such as resonant frequency control) to ensure that the appropriate power is being received. The system may additionally utilize transmitter control to adjust the amount of power available to the receiver or receivers. This system may or may not use communication to control the adjustment of power. For example, a receiver may be placed on a transmitter that transmits energy regardless of the detected load, in which case the receiver can adjust the adaptive resonance control to ensure it receives the correct amount of power. Alternatively, the transmitter may measure the impedance reflected back to the transmitter and adjust the amount of power transmitted based on the reflected impedance. The system may additionally combine all of these so that each device is receiving the power it desires regardless of the differences in power desires of multiple devices that may be placed on the transmitter.

A variety of different types of rectification circuitry can be used by the remote device. For example, the rectification circuitry may be a full diode bridge rectifier, a semi-synchronous rectifier where two MOSFETs are used to reduce the voltage drop across half of the bridge, or a full-synchronous rectifier where four (or more) MOSFETs are used.

In some embodiments, the Q Control circuitry can also be used as rectification circuitry. For example, referring to FIGS. 44A-44D, one embodiment of a remote device 14 is configurable to use semi-synchronous rectification. Semi-synchronous rectification can be enabled by using the adaptive resonance control switches 64a-b, sometimes referred to as Q-control FETs. FIGS. 44A-44D show one embodiment of a sequence of how switching can work within a power receiving cycle of control providing control of adaptive resonance. This gives the Rx the ability to have its own power control mechanism. By timing appropriately, the dynamic voltage range, power range, and efficiency of the Rx can be increased. In some embodiments, switching at L3 current zero cross allows for the most efficient operation. In some embodiments, the dynamic range can be increased by switching on L3/C3 in both half cycles.

Figure 44A:
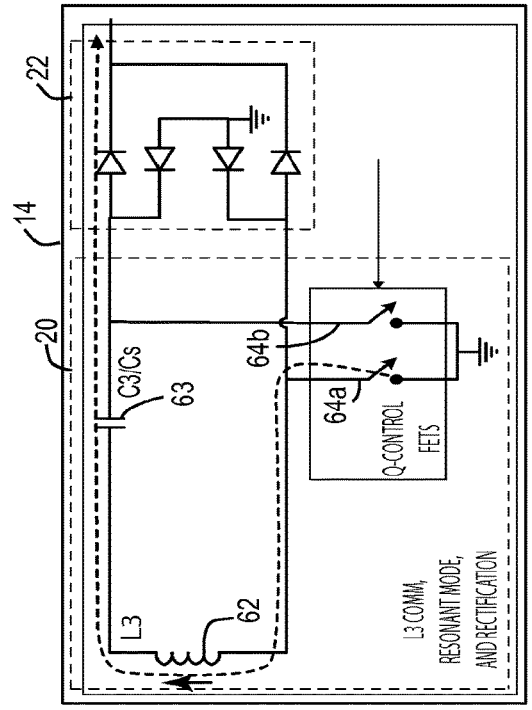
FIGS. 44A-D show one embodiment of a method of using adaptive resonance control (Q-control) FETs to create a semi-synchronous rectifier.
Figure 44B:
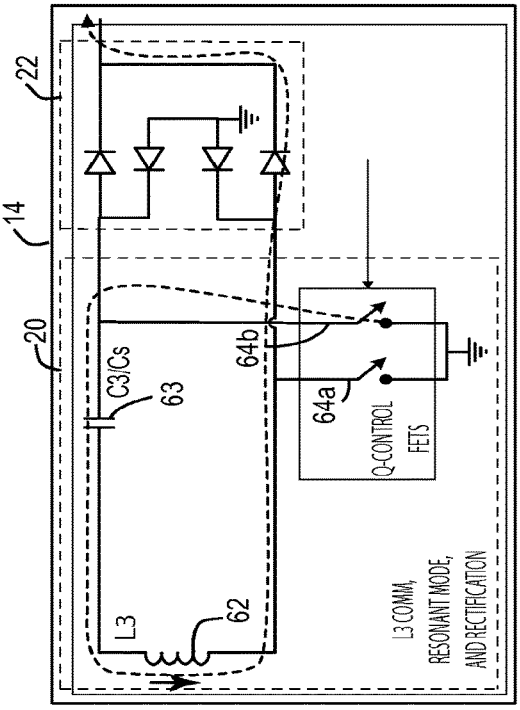
Figure 44C:
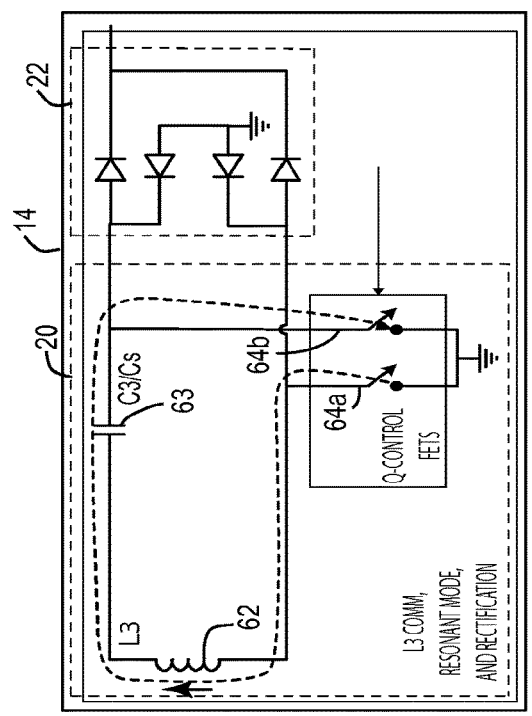
Figure 44D:
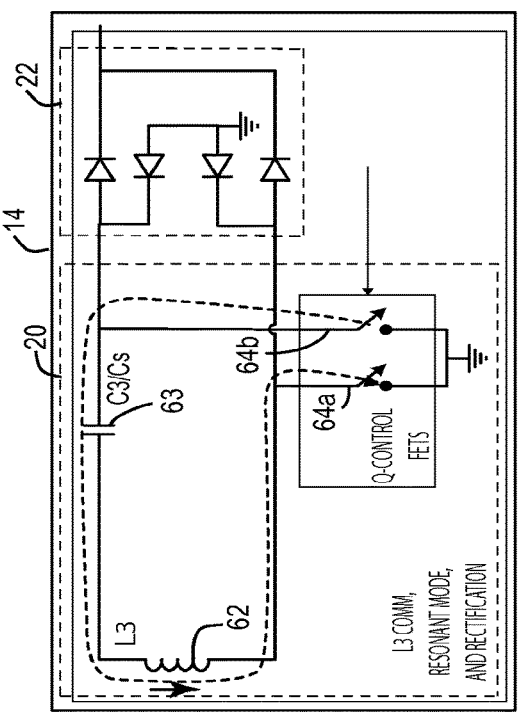

By leaving one of the Q-control FETs 64a-b on for a current conduction cycle as shown in FIGS. 44B and 44D, the secondary tank circuit, including the secondary 62 and resonant capacitor 63, forms a low voltage-drop path to ground, creating a semi-synchronous rectifier.

An example of how the Q-control FETs 64a-b can be used for adaptive resonance control and semi-synchronous rectification, both Q-control FETs 64a-b are turned on at the beginning of the current cycle creating a high Q resonator (see FIGS. 44A and 44C). Then one of the Q-control FETs 64a-b are turned off, allowing current to flow from the ground reference, through the Q-control FET that is left on, through the secondary tank circuit, and through a rectification diode into the load 30 (see FIGS. 44B and 44D). This FET is left on until the current reaches zero, then the other Q-control FET is turned back on. This FET then becomes the FET that is left on for the remainder of the second half of the current waveform.

In order to utilize this method, the FET that is drawing current from the node connected to the ground reference is the FET that is left on to form the semi-synchronous rectifier. In the depicted embodiment, a full diode bridge network is included to provide power to the microcontroller for operation of the semi-synchronous rectification. In this embodiment, the full bridge provides rectification at startup, before the microcontroller is turned on, or if the battery is drained. In alternative embodiments, a half bridge may replace the depicted full bridge.

Figure 45A:
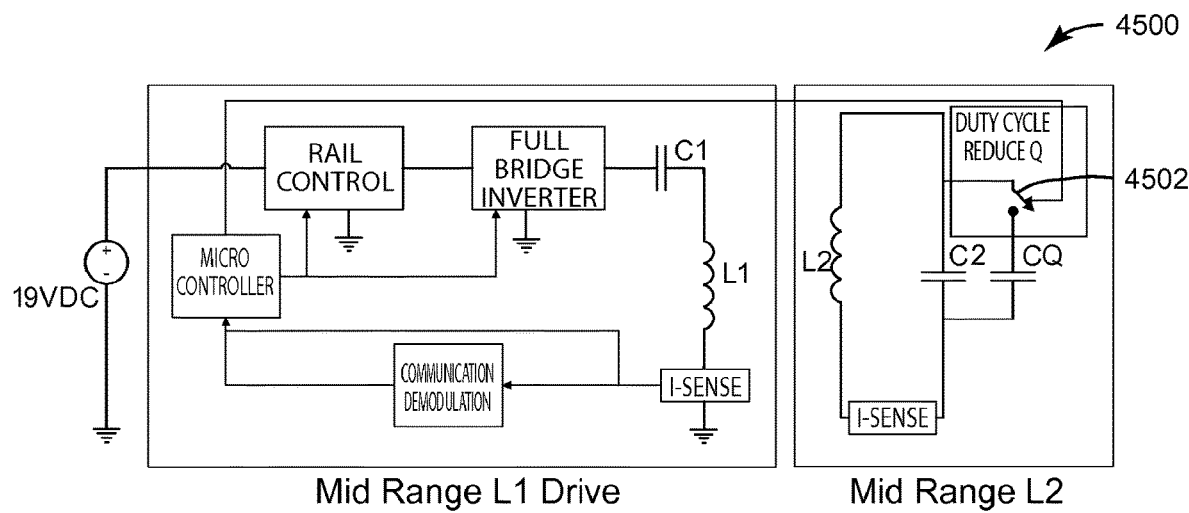
FIG. 45A shows one embodiment of a method of using adaptive resonance control (Q-control) on the TX.

The transmitter may use adaptive resonance control to adjust the amount of power being transmitted to the devices coupled to the transmitter. An example of this is shown in FIG. 45A, where the transmitter 4500 may use a resonant frequency shift of the resonator L2/C2 by switching in a different capacitor CQ for a portion of the cycle. By shifting the resonant frequency of the resonator for a portion of the cycle, the current flowing through the resonator L2/C2 may be reduced or increased depending on the tuning of the system. It may also depend on whether the switch 4502 is normally closed or open. The shift in resonant frequency may also enable power transmission control without adjusting other operating parameters, such as operating frequency. It should, however, be understood that in some embodiments operating parameters may be adjusted in conjunction with the shift in resonant frequency to control power transmission.

Figure 46:
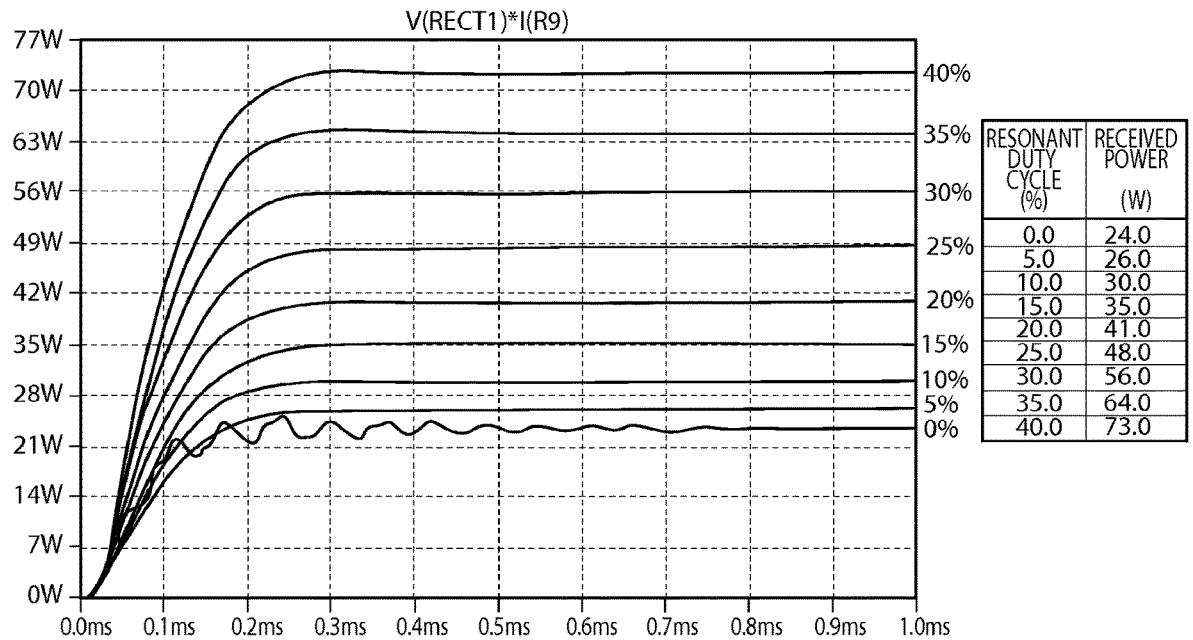
FIG. 46 shows a graph of power transmitted varying based on duty cycle of the adaptive resonance control method of FIG. 45A.

In one embodiment, the capacitor value of CQ is ⅕ of the value of the nominal capacitor C2. The switch 4502 is normally open and is closed for a portion of each switching cycle, wherein the duty cycle of the switching represents the portion of the cycle for which the switch is on. FIG. 46 shows the resulting change in power delivered to an example receiver for various duty cycles. It can be seen that the addition of the capacitor CQ in parallel causes a rise in received power, although alternative embodiments may reduce the amount of power delivered. The advantage of using a capacitive impedance is that power is not dissipated in the capacitor CQ.

Figure 45B:
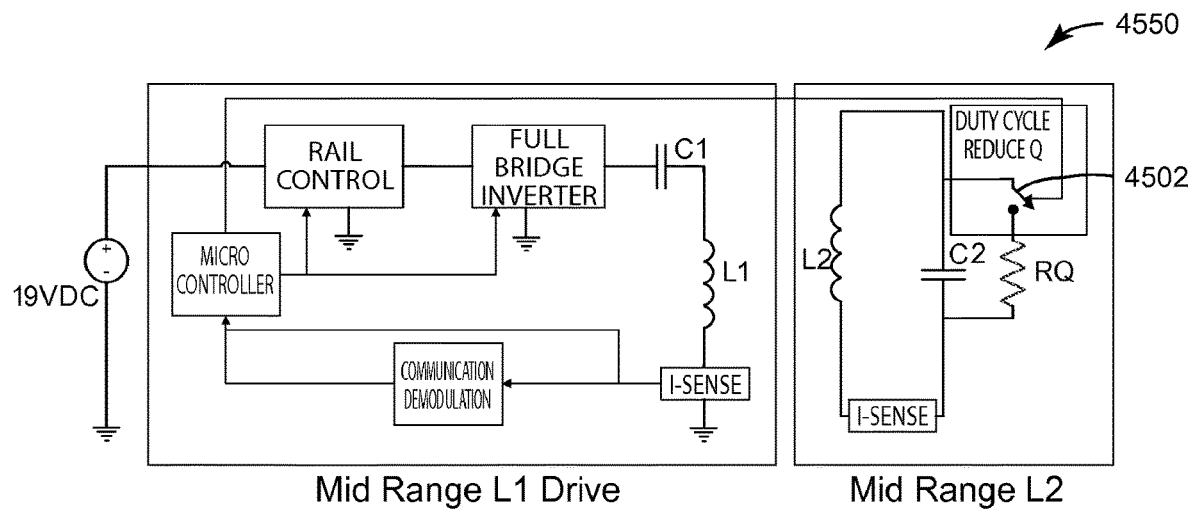
FIG. 45B shows another embodiment of a method of using adaptive resonance control (Q-control) on the TX.

The transmitter may alternatively shunt the resonant capacitor C2 with an impedance such as a resistor RQ, or by a very low resistance switch, as shown in FIG. 45B, and designated 4550. By shunting the resonant capacitor C2, the Q of the resonator L2/C2 is reduced while the capacitor C2 is shunted, reducing the amount of power transferred to the receiver(s). Some power is dissipated in the resistor RQ, but the resonant frequency of the system is not changed.

Figure 47:
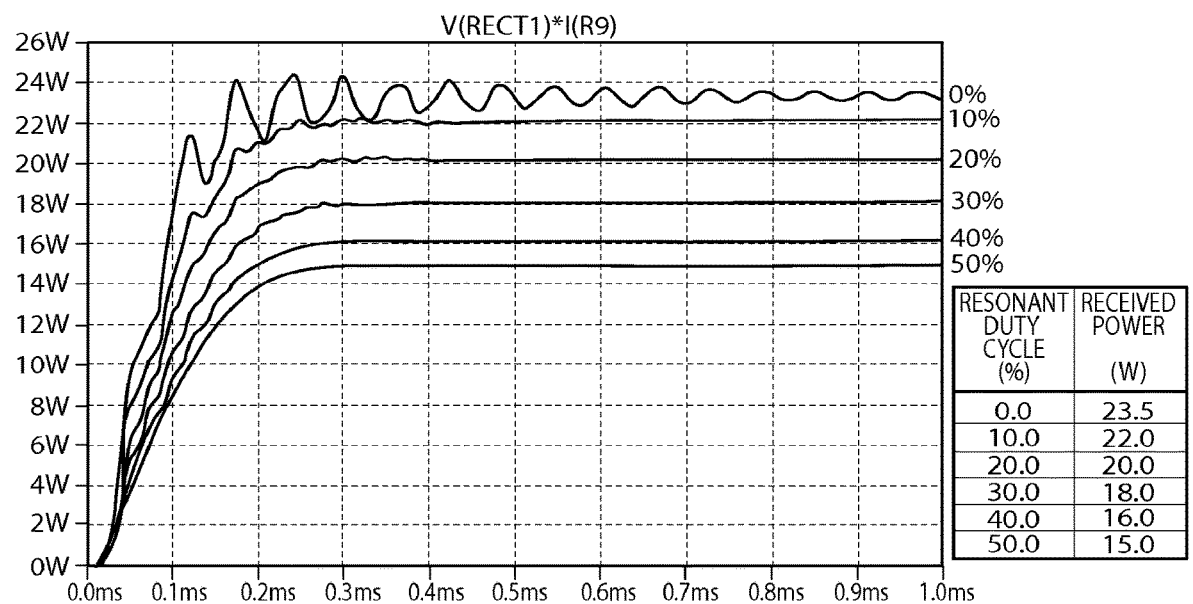
FIG. 47 shows a graph of power transmitted varying based on duty cycle of the adaptive resonance control method of FIG. 45B.

In one embodiment, the impedance is a 100 ohm resistor RQ that is switched in parallel with C2 for a portion of each power receive cycle, wherein the portion of each cycle that the switch is closed is the duty cycle of the adaptive resonance control. FIG. 47 shows the resulting change in power transferred to an example receiver for various duty cycles, and the damping effect of the resistor on power in the resonator.

The transmitter 4550 may also use a rectifier connected to the resonator L2/C2 that is coupled to the rail through a switch (not shown). By closing the switch, power may be shunted back to the transmitter DC supply through the rectifier, reducing the Q of the resonator. However, since the energy is shunted back to the DC supply of the transmitter, the energy may be captured and reused, rather than dissipated in a resistor.

The transmitter 4500, 4550 may use either of both of these methods to adjust the amount of power being delivered to a receiver or set of receivers. Additionally, the transmitter may also vary any of the operating frequency, rail voltage, duty cycle of the driver, or phase of the driver to further control the amount of power delivered.

Adaptive Power Field Extender

Figure 23:
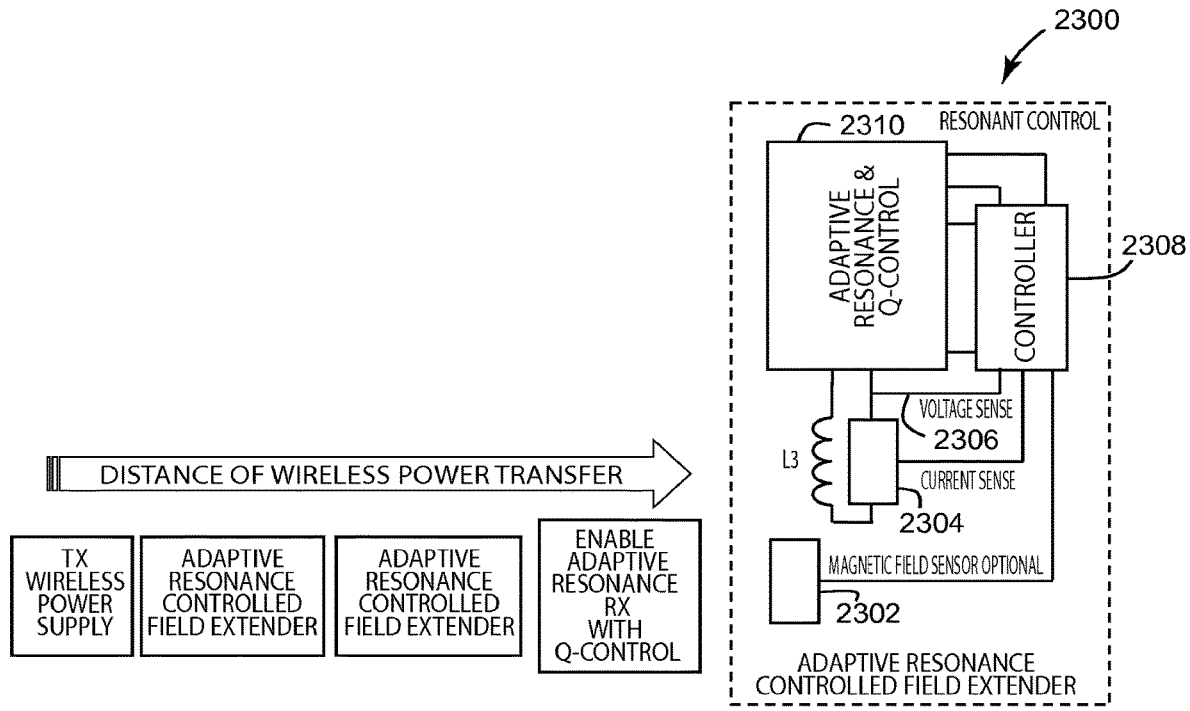
FIG. 23 shows an embodiment of a wireless power supply system with adaptive resonance controlled field extenders.

FIG. 23 shows how the field can be extended using one or more adaptive resonance controlled field extenders 2300, depending, for example, on distance from the wireless transmitter. Each adaptive resonance controlled field extender 2300 is a wireless power transmitter and a wireless power receiver that can effectively extend the range of the field by relaying power from a wireless power transmitter to another wireless power receiver. The amount of power relayed can be controlled using adaptive resonance control circuitry 2308, 2310, which may include analog or digital circuitry, or a combination thereof. For example, the amount of power can be limited to threshold values to increase EMI/EMC compatibility. A magnetic sensor 2302 may be added for additional resolution of actual field distribution and power reconciliation. Voltage thresholds can be utilized to protect circuit voltages downstream. Current and voltage thresholds can be utilized for foreign object detection and reconciliation. Thresholds can be set to assure proper field exposure for each stage of wireless power transfer. The term adaptive power receiver may refer to an adaptive power extender.

Figure 24:
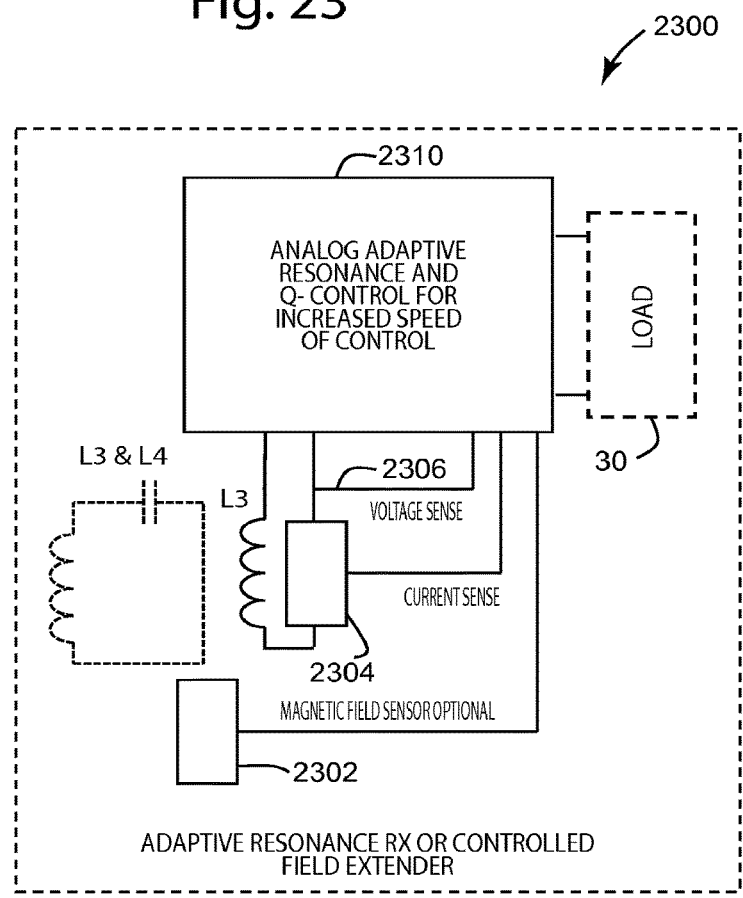
FIG. 24 shows an analog adaptive resonance receiver or field extender.

FIG. 24 shows a threshold based analog control circuit 2310 for increased speed of control implemented in an adaptive resonance controlled field extender 2300. In an alternative embodiment, the analog circuit control 2310 may be implemented in a wireless receiver having a principal load 30 shown in dashed lines as optional. In the illustrated embodiment of FIG. 24, current sensor 2304, voltage sensor 2036, and magnetic field sensor 2302 can be used to drive the Q-control FETs without the use of a controller 2308. For example, one or more sensors along with other analog circuitry 2310 can be implemented to automatically adjust the duty cycle of the Q-control FETs. Analog control of an adaptive power receiver can help to assure local voltages and field levels are below preset limits. For example, by controlling the Q-control FETs based on sensor output and threshold levels, the duty cycle of the control signals for the Q-control FETs may be changed more quickly than by use of digital signals from a controller. This can allow the adaptive power receiver to adapt quickly to changes in field, current, or voltage so that adjustments in the adaptive power receiver (or adaptive power field extender) can be made quickly. For example, in one embodiment, the analog circuitry 2310 may include a current sensor 2304 for detecting the zero-crossings and for providing input to a voltage controlled oscillator. In this example, the Q-control FETs may be closed at the zero crossings of the current waveform of the power receiving cycle based on output from the current sensor and opened based on output from the voltage controlled oscillator.

In one embodiment, the analog control circuit 2310 may include circuitry capable of performing a duty cycle hold function as to purposely not respond to the input signals during key moments in the power transfer mode (i.e., when the Rx is attempting to communicate, it may cause a change in Rx voltage. Analog Q-control may attempt to negate this change in impedance by adjusting duty cycle resulting in less communication signal strength).

Foreign Object Detection (FOD)

Figure 31:
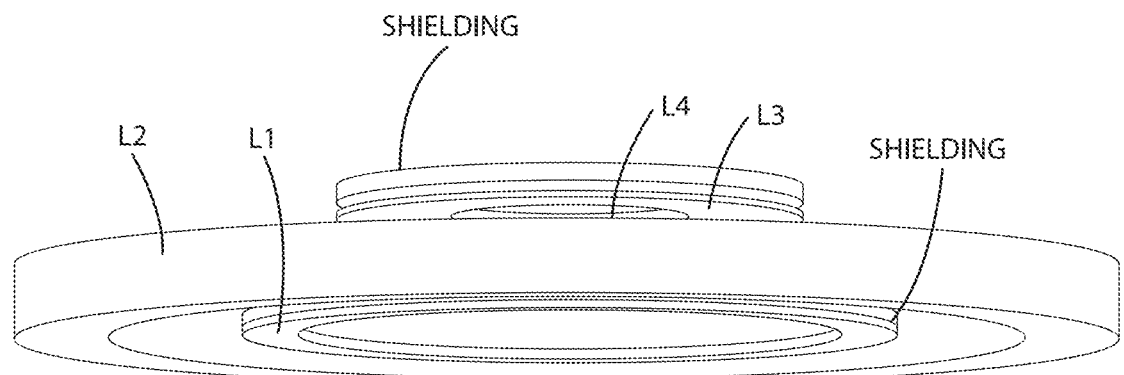
FIG. 31 shows a perspective view of a finite element analysis (FEA) of one embodiment of a four coil system with a remote device having an adaptive receiver and a supplemental receiver.
Figure 32:
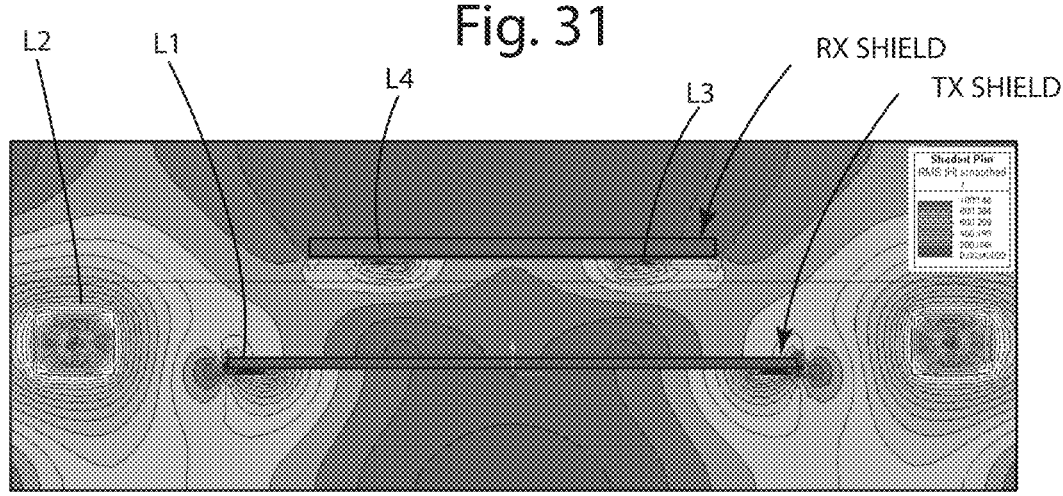
FIG. 32 shows a cross-section view of a FEA of the four coil system of FIG. 31.

FIG. 31 shows the setup of a finite element analysis (FEA) of a 4 coil solution, including shielding above L1 and above the receiver L3 and L4. In this simulation, the receiver (L3 and L4) are centered above the transmitter. FIG. 32 shows the cross sectional view of the magnetic flux density when operating at the resonant frequency of the system (in this embodiment, it is 121 kHz).

Figure 33:
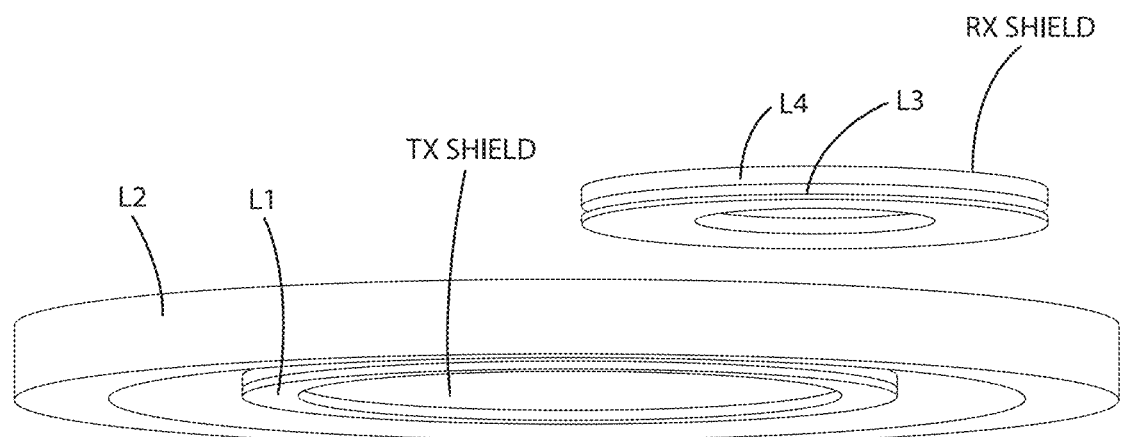
FIG. 33 shows a perspective view of a finite element analysis (FEA) of one embodiment of a four coil system with a remote device having an adaptive receiver and a supplemental receiver where the remote device is positioned off center.
Figure 34:
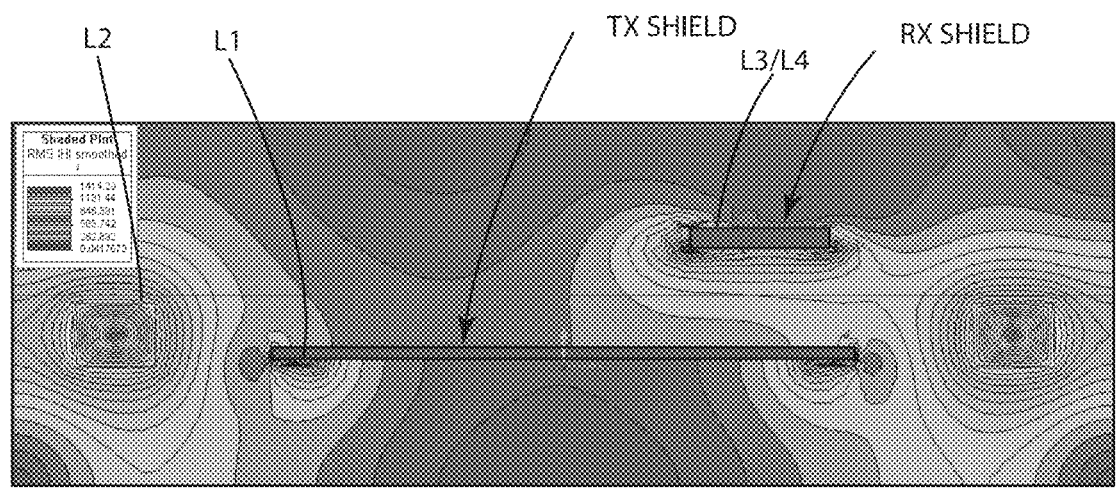
FIG. 34 shows a cross-section view of the FEA of the four coil system of FIG. 33.
Figure 35:
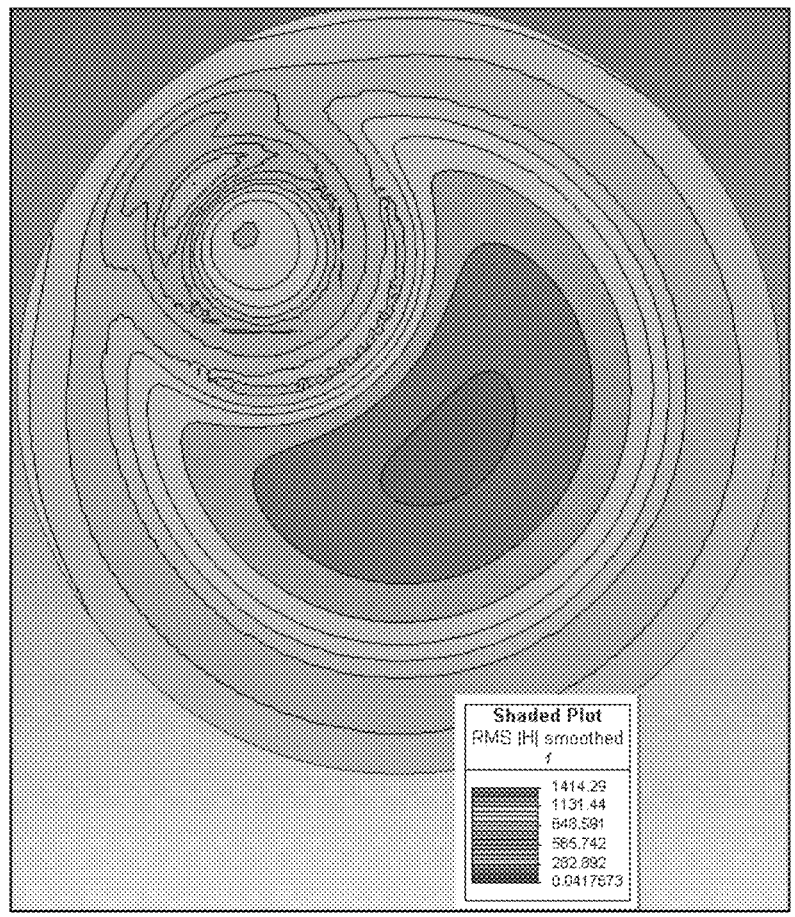
FIG. 35 shows a top-down view of the FEA of the four coil system of FIG. 33.

FIG. 33 shows the setup of a second FEA simulation, showing the receiver placed off center of the transmitter. FIG. 34 shows the cross sectional view of the magnetic flux density of the second simulation. It can be seen that the flux density follows the receiver due to the high Q of the L3 resonator. FIG. 35 shows the vertical view of the magnetic flux density of the second simulation. It can be seen that flux density follows the receiver.

Figure 36:
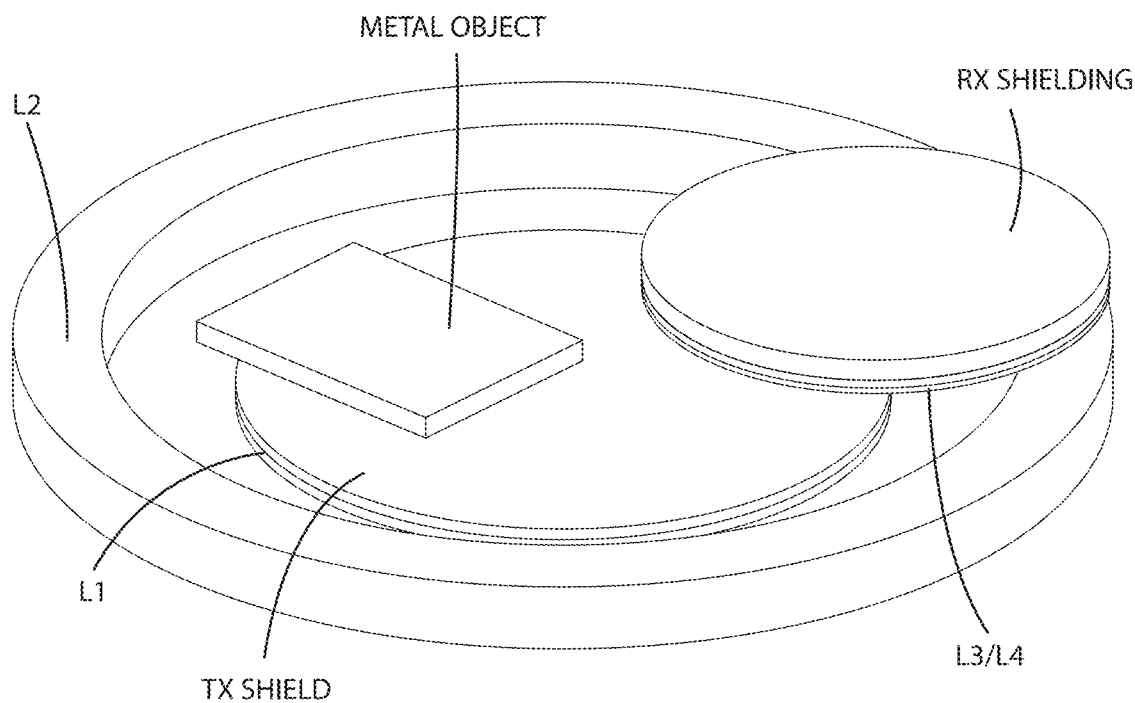
FIG. 36 shows a perspective view of a finite element analysis (FEA) of one embodiment of a four coil system with a remote device having an adaptive receiver and a supplemental receiver where the remote device is positioned off center, and a piece of metal is placed opposite of the remote device.
Figure 37:
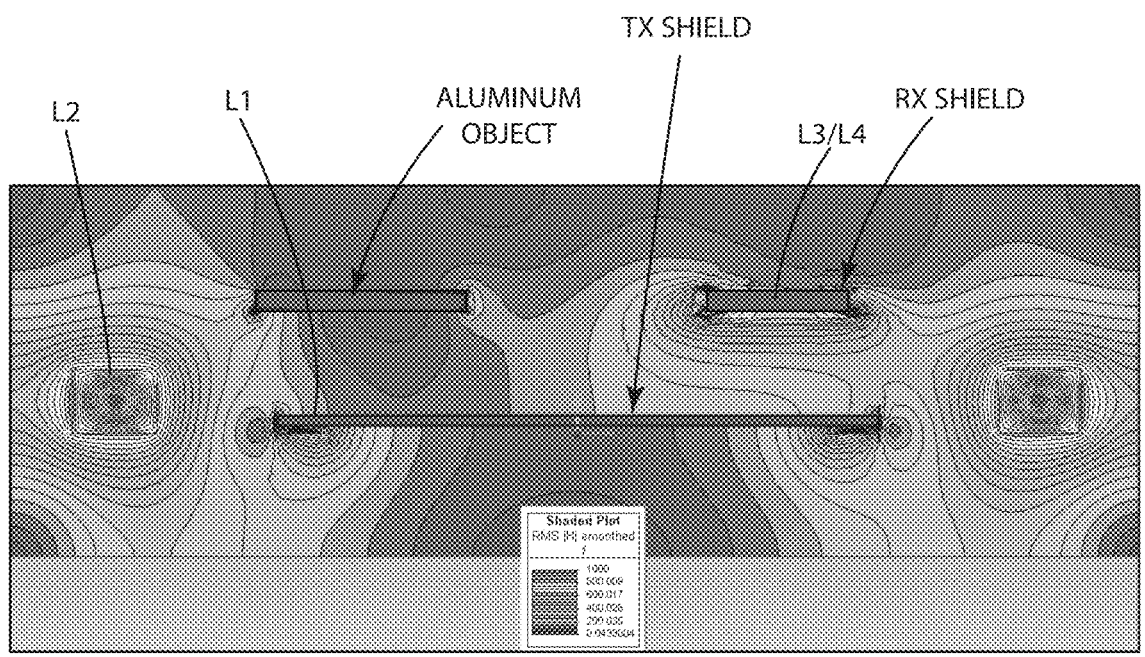
FIG. 37 shows a cross-section view of the FEA of the four coil system of FIG. 36 where the metal is aluminum.
Figure 38:
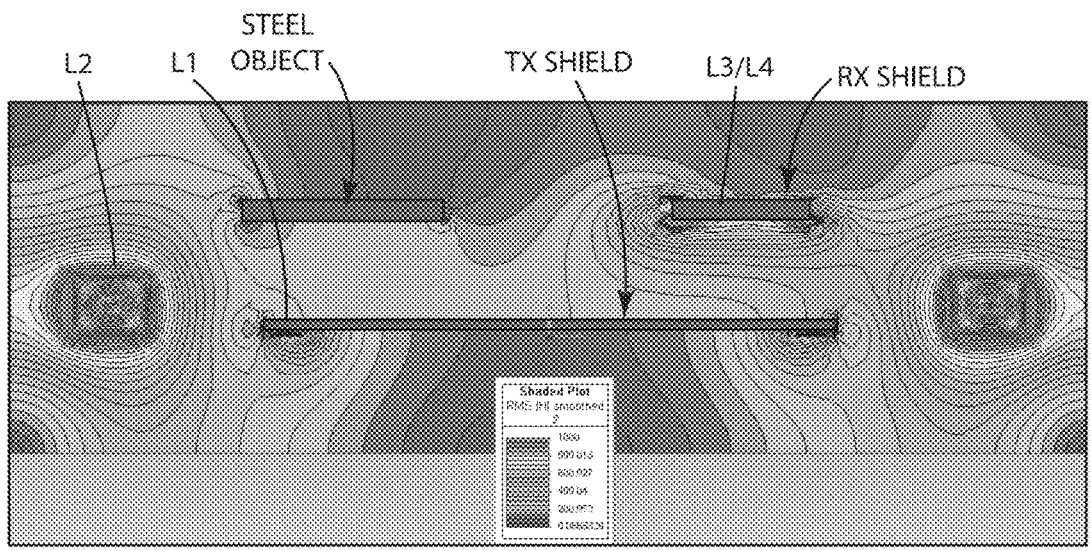
FIG. 38 shows a cross-section view of the FEA of the four coil system of FIG. 36 where the metal is steel.
Figure 39A:
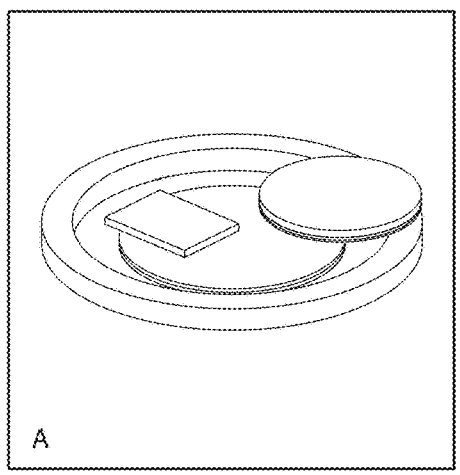
FIG. 39A shows a perspective view of the four coil system of FIG. 36 where the metal is aluminum and steel respectively.
Figure 39B:
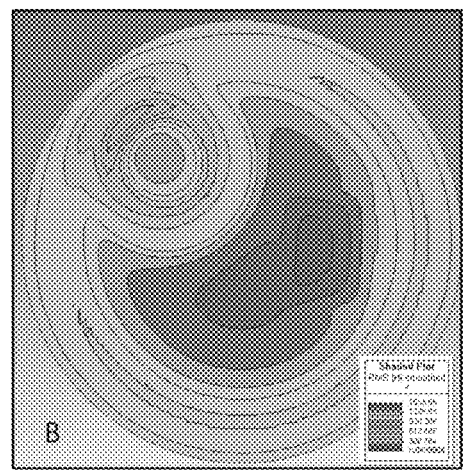
FIG. 39B shows a top down view of the four coil system of FIG. 36 where the metal is aluminum.
Figure 39C:
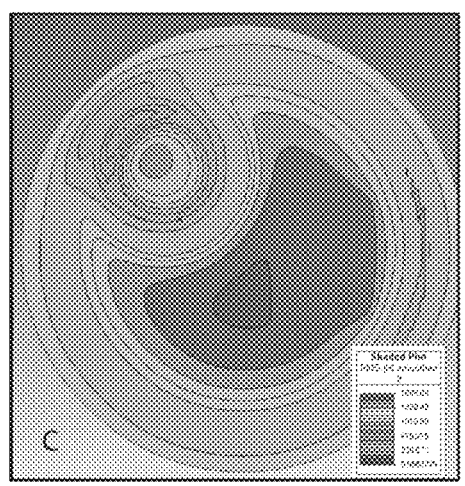
FIG. 39C shows a top down view of the four coil system of FIG. 36 where the metal is steel.

FIG. 36 shows the setup of a third simulation wherein the receiver is off-centered of the transmitter, and a piece of metal is placed opposite of the receiver. FIG. 37 shows the cross sectional view of the third simulation wherein the metal used in the simulation is aluminum. It can be seen that the flux density around the metal object is low in comparison to the density around the receiver, showing that the low-Q metal object does not receive much power when placed away from the receiver. FIG. 38 shows the cross sectional view of the third simulation wherein the metal used is a typical grade steel. It can be seen that the flux density around the metal object is higher than the aluminum sample, although it is still much lower than the flux density around the receiver. FIGS. 39A-C shows the top down views of the magnetic flux densities of the third simulation, where the field can be seen being directed away from the foreign object. FIG. 39B is a top down view of the third simulation with an aluminum foreign object, and FIG. 39C is a top down view of the third simulation with a steel foreign object.

Figure 40:
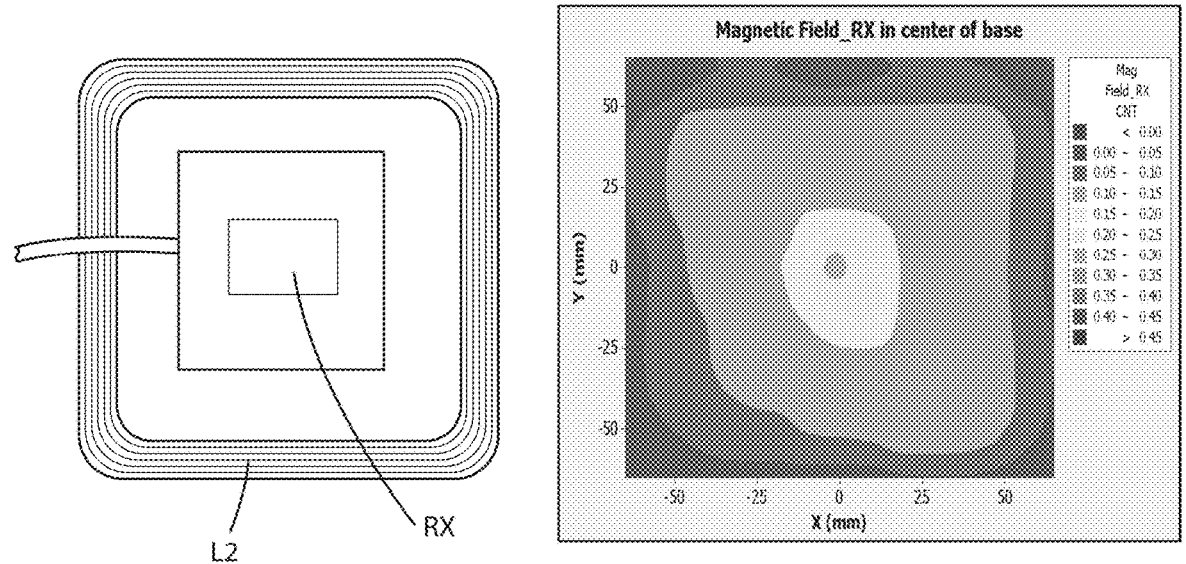
FIG. 40 shows a graph of the magnetic field where a remote device with an adaptive receiver is placed on the center of the wireless power supply.

FIG. 40 shows that when the RX is placed in the center of the TX with a fixed 2.5 W load, the magnetic field spans the whole TX, but the largest amount of magnetic field is located directly under the RX. Depending on how well the RX is coupled to the system, will depend on how focused the field is under the RX. The better the coupling the more magnetic flux under the RX.

Figure 41:
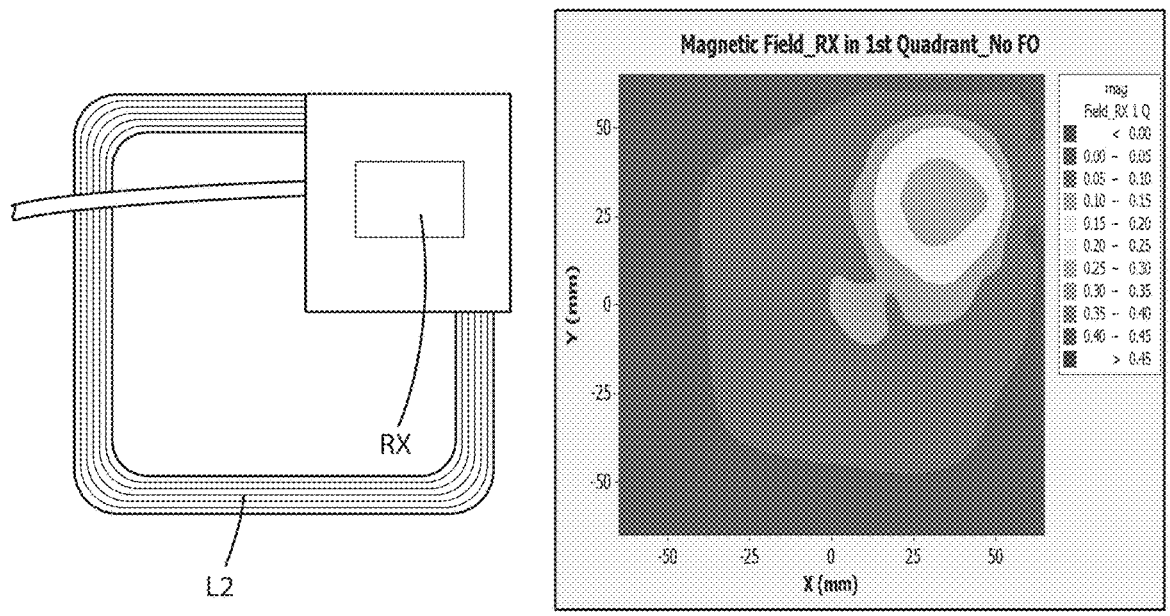
FIG. 41 shows a graph of the magnetic field where the remote device of FIG. 40 is positioned off center from the wireless power supply transmitter.

FIG. 41 shows that when the RX is placed in the 1st Quadrant of the TX with a fixed 2.5 W load, the magnetic field spans the whole TX, but the highest field strength is located directly under the RX. Comparing this with FIGS. 39A-C it can be seen the majority of the field strength moves with the placement of the RX and the magnitude of the field strength increases with how well the RX is coupled.

Figure 42:
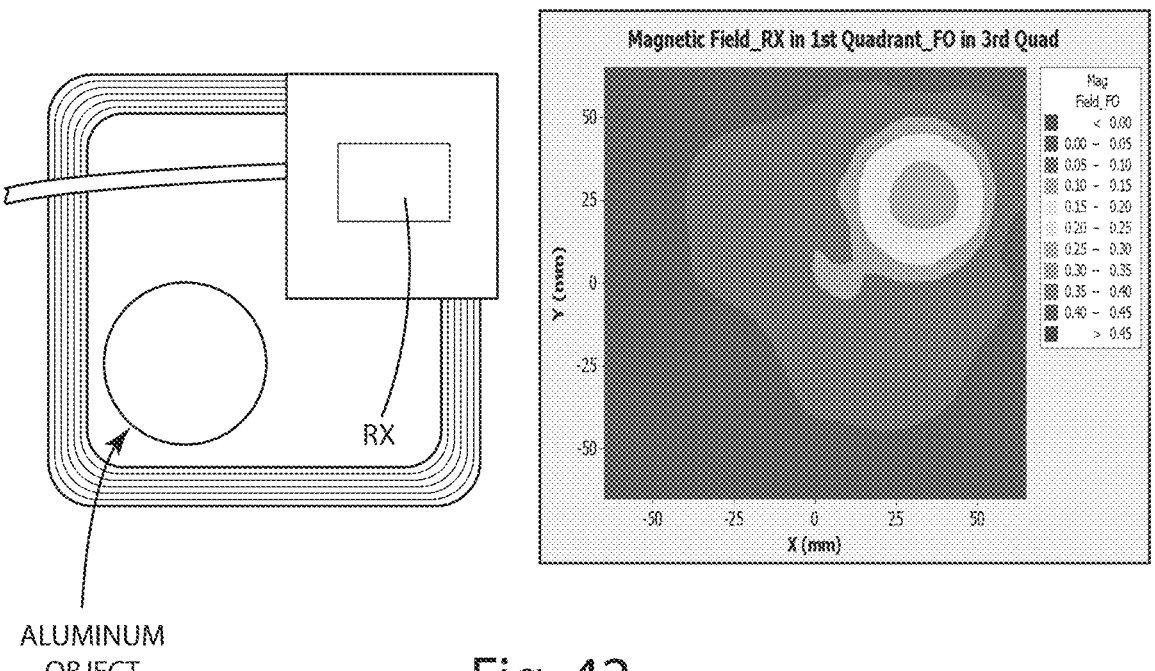
FIG. 42 shows a graph of the magnetic field where the remote device is positioned similarly as in FIG. 41, but an aluminum foreign object is placed on the transmitter.

FIG. 42 shows how the field does not change from FIG. 40 when a parasitic metal is introduced onto the 3rd Quadrant. The RX has a fixed 2.5 W load, and is pulling the magnetic field towards itself without heating or inducing eddy currents on the parasitic metal.

Figure 43:
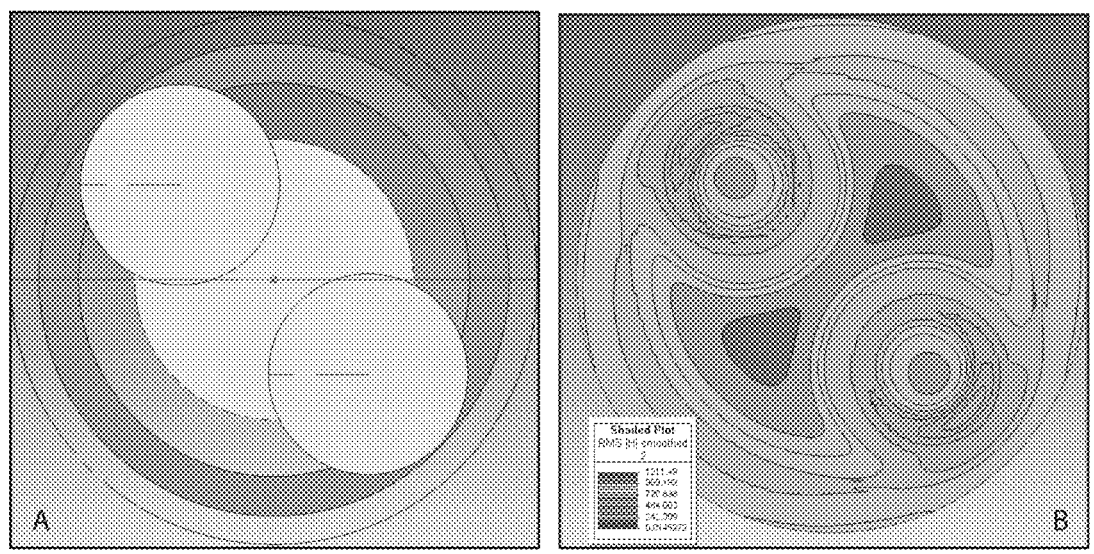
FIG. 43 shows top down views of a FEA where two receivers (each with an adaptive receiver and a supplemental receiver) are both placed on the transmitter.

FIG. 43 shows top down views of a fourth simulation wherein two receivers (each with an L3/L4 combination) are both placed on the transmitter.

Some of the advantages of an adaptive power receiver include:

- the ability to adapt to various coupling configurations with a single or dual coil receiver;
- the ability to use field extenders and adaptive resonance with a controlled field threshold;
- control of adaptive resonance over loosely and tightly coupled systems;
- utilization of the initialization power curve for characterization of a device;
- increasing or maximizing cycle-by-cycle control of resonance for minimized bulk capacitance and ripple;
- a process and control sequence that enables adaptive resonant control;
- multi device control within an adaptive resonant system;
- a system to address all receivers that are within a certain range;
- reduction of need for auxiliary regulation via a DC to DC converter;
- reduced ripple by regulating multiple times per cycle;
- reduced requirements for clock timing by adapting resonance over multiple cycles;
- and
- increased stability by ensuring Q is not too high.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power transmitter for wirelessly transmitting power to a remote device, said wireless power transmitter comprising:
   an adaptive power transmitter configured to transmit wireless power to the remote device, said adaptive power transmitter being configurable to a first mode and to a second mode, wherein in said first mode, said adaptive power transmitter has a first resonant frequency, wherein in said second mode, said adaptive power transmitter has a second resonant frequency which is different from the first resonant frequency; and
   a controller operably coupled to the adaptive power transmitter, said controller being configured to control the power transmitted to the remote device by a wireless power supply by selectively configuring the adaptive power transmitter between said first mode and said second mode,
   wherein said controller changes an effective resonant frequency for said wireless power transmitter by changing a duration of time over which the adaptive power transmitter is in the first mode relative to a duration of time over which the adaptive power transmitter is in the second mode, and
   wherein said controller is configured to control the power transmitted to the remote device by selectively configuring the adaptive power transmitter between the first mode and the second mode by selectively configuring the adaptive power transmitter from the first mode to the second mode at least once per wavelength of the power transmitter.

2. The wireless power transmitter of claim 1, wherein said adaptive power transmitter includes an impedance element and a switch, wherein in said first mode said switch is closed and said impedance element is electrically connected to said adaptive power transmitter, wherein in said second mode said switch is open and said impedance element is electrically disconnected from said adaptive power transmitter.

3. The wireless power transmitter of claim 2, wherein said controller is configured to control the power transmitted to the remote device by selectively configuring the adaptive power transmitter between the first mode and the second mode by selectively configuring the adaptive power transmitter from the first mode to the second mode at least twice per wavelength of the power transmitted.

4. A wireless power transmitter for wirelessly transmitting power to a remote device, said wireless power transmitter comprising:
   an adaptive power transmitter configured to transmit wireless power to the remote device, said adaptive power transmitter being configurable to a first mode and to a second mode; and
   a controller operably coupled to the adaptive power transmitter, said controller being configured to control the power transmitted by a wireless power supply by selectively configuring the adaptive power transmitter between said first mode and said second mode at a duty cycle at least once per wavelength of the power transmitted,
   wherein said controller changes an effective resonant frequency for said wireless power transmitter by changing a duration of time over which the adaptive power transmitter is in the first mode relative to a duration of time over which the adaptive power transmitter is in the second mode,
   wherein increasing the duty cycle increases the duration of time over which the adaptive power transmitter is in the first mode for each wavelength of the power transmitted, and
   wherein decreasing the duty cycle decreases the duration of time over which the adaptive power transmitter is in the first mode for each wavelength of the power transmitted.

5. The wireless power transmitter of claim 4, wherein in said first mode, said adaptive power transmitter has a lower Q factor, wherein in said second mode, said adaptive power transmitter has a higher Q factor which is higher than the lower Q factor.

6. The wireless power transmitter of claim 4, wherein said controller changes an effective Q factor for said wireless power transmitter by changing the duration of time over which the adaptive power transmitter is in the first mode relative to the duration of time over which the adaptive power transmitter is in the second mode.

7. The wireless power transmitter of claim 4, wherein in said first mode, said adaptive power transmitter has a first resonant frequency, wherein in said second mode, said adaptive power transmitter has a second resonant frequency which is different from the first resonant frequency.

8. The wireless power transmitter of claim 4, wherein said adaptive power transmitter includes an impedance element and a switch, wherein in said first mode said switch is closed and said impedance element is electrically connected to said adaptive power transmitter, wherein in said second mode said switch is open and said impedance element is electrically disconnected from said adaptive power transmitter.

9. The wireless power transmitter of claim 4, wherein said adaptive power transmitter includes a resistor and a switch, wherein in said first mode said switch is closed and said resistor is electrically connected to said adaptive power transmitter, wherein in said second mode said switch is open and said resistor is electrically disconnected from said adaptive power transmitter.

10. The wireless power transmitter of claim 4, wherein said controller is configured to control the power transmitted to the remote device by selectively configuring the adaptive power transmitter between the first mode and the second mode by selectively configuring the adaptive power transmitter from the first mode to the second mode at least twice per wavelength of the power transmitted.

11. The wireless power transmitter of claim 4, wherein said controller changes a drive signal operating frequency to indicate the wireless power transmitter is a loosely coupled transmitter.

12. The wireless power transmitter of claim 4, wherein said controller controls an amount of the power transmitted by varying one or more of operating frequency, rail voltage, duty cycle of a driver, and phase of the driver.

13. A wireless power transmitter for wirelessly transmitting power to a remote device, said wireless power transmitter comprising:
- an adaptive power transmitter configured to transmit wireless power to the remote device, said adaptive power transmitter being configurable to a first mode and to a second mode, wherein in said first mode, said adaptive power transmitter has a first resonant frequency, wherein in said second mode, said adaptive power transmitter has a second resonant frequency which is different from the first resonant frequency; and
- a controller operably coupled to the adaptive power transmitter, said controller being configured to control the power transmitted to the remote device by a wireless power supply by selectively configuring the adaptive power transmitter between said first mode and said second mode,
- wherein said controller changes an effective resonant frequency for said wireless power transmitter based on an average of a duration of time over which the adaptive power transmitter is in the first mode and a duration of time over which the adaptive power transmitter is in the second mode.

* * * * *